US012755613B2

(12) United States Patent
Merati

(10) Patent No.: US 12,755,613 B2

(45) Date of Patent: Oct. 6, 2026

(54) PREDICTION MARKET EXCHANGE TRADABLE BETTING SYSTEM AND METHODS

(71) Applicant: UPLAY1, San Diego, CA (US)

(72) Inventor: Bruce Merati, San Diego, CA (US)

(73) Assignee: BETEX, San Diego, CA (US)

( * ) Notice: Subject to any disclaimer, the term of this patent is extended or adjusted under 35 U.S.C. 154(b) by 0 days.

(21) Appl. No.: 19/385,798

(22) Filed: Nov. 11, 2025

(65) Prior Publication Data

US 2026/0073774 A1 Mar. 12, 2026

Related U.S. Application Data

(60) Division of application No. 19/241,743, filed on Jun. 18, 2025, now Pat. No. 12,499,739, which is a division of application No. 17/531,949, filed on Nov. 22, 2021, now Pat. No. 12,347,278, which is a continuation-in-part of application No. 16/896,047, filed on Jun. 8, 2020, now Pat. No. 11,183,016, which is a continuation-in-part of application No. 16/278,820, filed on Feb. 19, 2019, now Pat. No. 10,846,984, which is a continuation-in-part of application No. 15/436,600, filed on Feb. 17, 2017, now Pat. No. 10,210,703.

(60) Provisional application No. 62/859,093, filed on Jun. 8, 2019, provisional application No. 62/726,317, filed on Sep. 3, 2018, provisional application No. 62/299,299, filed on Feb. 24, 2016.

(51) Int. Cl.
*G07F 17/32* (2006.01)
*G06Q 50/34* (2012.01)

(52) U.S. Cl.
CPC ......... *G07F 17/3288* (2013.01); *G06Q 50/34* (2013.01); *G07F 17/3223* (2013.01)

(58) Field of Classification Search
None
See application file for complete search history.

(56) References Cited

U.S. PATENT DOCUMENTS

| | | | | |
|---|---|---|---|---|
| 2017/0098293 A1* | 4/2017 | Madison | ................ | G06Q 10/08 |
| 2023/0128000 A1* | 4/2023 | Roberts | ................ | G07F 17/3272 463/25 |
| 2024/0135783 A1* | 4/2024 | Corlett | ................ | G07F 17/3211 |
| 2024/0290179 A1* | 8/2024 | Cullen | ................ | G06Q 40/04 |
| 2025/0316145 A1* | 10/2025 | Merati | ................ | G07F 17/3227 |

* cited by examiner

*Primary Examiner* — Ronald Laneau

(74) *Attorney, Agent, or Firm* — Thibault Patent Group

(57) ABSTRACT

Various aspects of a prediction market ecosystem are described for punters and market makers to speculate on occurrence and non-occurrence of future events by placing bets on operators that take bets within their jurisdictions and can buy other punters bets that are placed with other operators through an exchange server that matches and executes trade orders that also allows operators to participate on the exchange to manage their risks and records inter-operator transactions generated as the result of executing the trade orders.

23 Claims, 24 Drawing Sheets

900

| 902 Database | 904 Permission Rights: Player | Operator | Regulator | Merchant |
|---|---|---|---|---|
| User Profile | Y | Y | Y | Y |
| Deposits & Withdrawals | Y | Y | Y | N |
| C3 Balance | Y | Y | Y | Y |
| Gaming | Y | Y | Y | N |
| Wagering | Y | Y | Y | N |
| Non-Gaming | Y | Y | Y | Y |
| Loyalty Rewards | Y | Y | Y | Y |

FIG. 9

PREDICTION MARKET EXCHANGE TRADABLE BETTING SYSTEM AND METHODS

CLAIM OF PRIORITY

This application is a divisional of U.S. patent application Ser. No. 19/241,743 filed on Jun. 18, 2025, which is a divisional of U.S. patent application Ser. No. 17/531,949 filed on Nov. 22, 2021, which is a continuation-in-part of U.S. patent application Ser. No. 16/896,047 filed on Jun. 8, 2020 which claims the benefit of provisional patent application 62/859,093, filed on Jun. 8, 2019, and is a continuation-in-part of U.S. patent application Ser. No. 16/278,820, filed on Feb. 19, 2019, now U.S. Pat. No. 10,846,984, which is a continuation-in-part of U.S. application Ser. No. 15/436,600 filed on Feb. 17, 2017, now U.S. Pat. No. 10,210,703, which claims the benefit of U.S. provisional patent application No. 62/299,299, filed on Feb. 24, 2016. U.S. application Ser. No. 16/278,820 also claims the benefit of U.S. provisional patent application No. 62/726,317, filed on Sep. 3, 2018. Each of the foregoing is hereby incorporated by reference herein.

BACKGROUND

I. Field of Use

The present application relates to gaming systems and more specifically to sports and esports wagering, casino industry and gaming systems.

II. Description of the Related Art

Sports wagering is a growing industry throughout the world and, in most jurisdictions, is subject to strict laws. In the case of the United States, both state and federal law govern all aspects of gambling and wagering activities. In the last twenty years, placing wagers on the outcome of sporting activities has been on a steady rise in both the U.S. and other parts of the world. Most European countries historically have been more liberal towards wagering and have allowed bookmakers legally to take wagers on the outcome of almost any future event such as a sports match, a presidential election, a winner of a movie award or other scenarios where there is more than one possible outcome, or the outcome is less than certain.

On May 14, 2018, a historic ruling by the U.S. Supreme Court overturned the Professional and Amateur Sports Protection Act (PASPA) of 1992. This Act had prohibited states, except for Nevada, from offering sports wagering. Under the new Supreme Court ruling, each state can now legalize and regulate sports betting. Many states have already taken advantage of this new law and are currently offering sports wagering through licensed operators. The reversal of PASPA, however, did not affect the 1961 Wire Act, which continues to impose cross-border restriction on sports wagering. The 1961 Wire Act requires all bets to be offered within the boundaries of a state of a licensed sportsbook taking a bet. Currently, most sportsbook operators in the U.S. offer traditional Nevada-style fixed odds wagering by taking bets on both sides of an event. Nevada historically has always taken the position that peer-to-peer (P2P) wagering is illegal, while other states such as New Jersey and Colorado do not take the same position and allow sportsbook operators to offer P2P betting. Overall, the 1961 Wire Act applies to all types of sports wagers including P2P wagering precluding operators from offering multi-state P2P exchange betting. This Wire Act limitation restrains online betting exchanges in the U.S. from having adequate liquidity and longevity to compete with land-based casinos who have the lobbying power with state legislators and can make sure they will not lose control over the business. Land-based casinos also have lower customer acquisition costs and can leverage loyalty programs of their terrestrial casinos to acquire online players.

Video gaming and eSports have been extremely popular with the younger generation who grew up with computer games, and now that they are of legal age to gamble, are finding traditional Nevada fixed odds style sports betting not to be exciting enough. Instead, they have lately been gravitating towards day-trading by gambling on the price of meme stocks such as GameStop. Wagering on esports is a growing opportunity for casinos and sportsbook operators who have been slow to offer fixed odds wagering on eSports mainly because they are still trying to figure out how to manage the risk associated with these events. In the last few years, streaming services such as Twitch and YouTube have been broadcasting live eSports video games which at any given time are attracting millions of people watching other people playing video games. As part of their strategy, eSports stakeholders such as game developers and streaming services have been creating open architecture systems to allow third party software developers to create wagering services for video games with seamless online opportunities for betting with cash or any item of value, a process that commonly is called skin betting offered as part of the video streaming service of the game.

Skin or item betting does not use cash. Instead, players place wagers with transferable in-game items such as virtual weapons that can be exchanged for cash at a third-party's website. Skin betting has been popular with minors and millennials who illegally have been betting on offshore sites. Generally, the digital nature of eSports makes it is easier to develop and offer integrated wagering while watching eSports matches on a computer or a mobile device, versus traditional sports which require second screen wagering, i.e., watching the event on a TV screen and betting on another screen such as a phone, iPad, laptop, or a desktop. Overall, wagering on eSports can be in the same format as wagering on regular sports that are offered in different formats such as fixed odds, pari-mutuel (pool betting), head-to-head (single-game betting), parlays, contests, tournaments, sports lottery, etc. The seamless layering of betting on top of live stream eSports makes it easier for bettors and operators to monetize on eSports betting. Also, although operators are currently taking bets on eSports via traditional fixed odds systems or peer-to-peer exchanges, the landscape for eSports wagering is rapidly changing as new technologies such as AI and machine learning are getting developed to help operators better manage their risk exposures.

Sportsbooks may offer competitions between bettors for real money or for fun as a promotion or as a marketing and customer acquisition tool. These competitions are usually offered in the form of tournaments or contests to reward players with cash and other prizes as well as publicity and recognition. Although sometimes the wording for tournaments and contests are used interchangeably, there are some subtle differences between the two. A tournament usually includes a bracket or a ladder system to determine who moves up to the next bracket to win a tournament. On the other hand, a contest is the process of letting participants compete against each other. Also, a tournament may be set up as a series of contests where the person who finishes in a round or in the final round with a better record or score is declared the winner of that round or the entire tournament. Oftentimes a tournament is a season long, such as betting on who will win a league's championship, or it could be in a fantasy format where contestants assemble and manage virtual teams to compete against other virtual teams assembled by other contestants.

As described by patent application Ser. No. 16/896,047 which is anticipated to be issued in November 2021 and is incorporated herein, bettors who place bets with operators can sell their bets through a multi-state Betting Exchange (BetEx) ecosystem. Using the BetEx ecosystem, operators may offer tournaments and contests for a series of micro (in-game/InPlay) propositions (props) and offer them as composite props as described herein and in the prior patents and applications that are incorporated here by reference. As defined in patent application Ser. No. 16/896,047, a composite prop is an umbrella prop that covers a series of events which does not require a bettor to win on every single prop to win on a bet. These props can be offered either before events start or while they are in progress. For example, participants may register for an interactive tournament or a contest that includes betting on a series of pitches in baseball or drives in football. The in-game props could cover various aspects of an event or series of events for certain performance of a team or a player, such as the "average offensive drive per play" a team achieves during a game or a series of games. As an example, if the in-game prop offered is for Raiders to average 6 yards drive per play, and at some time during the game Raiders already has averaged 8 yards, then a bettor who took "the over" prop has the opportunity to sell her bet at a profit at a competitive price to others in BetEx's ecosystem while the game is still in progress versus waiting until the event is over or take the "cash out" option that some operators currently offer to buy back their bets which in most cases would not be at competitive prices for the bets.

Participation in a contest or in a tournament usually requires an entry fee which is usually a legal wager and needs to comply with state and federal laws and usually are required to be offered on a state-by-state basis. Tournaments and contests could be wagering pool products and might have multiple legs or various brackets. Also, they might be played for money or for fun, or they might be paid as a consolation, a bonus, or as a jackpot prize to one or more contestants on top of the main prize that is paid to the winner of the tournament or contest. Depending on the number of participants and the probability of winning, the jackpot prize could be a substantial amount. For example, the jackpot for predicting the winner of all NCAA basketball games could be in millions of dollars, more than what some lotteries would pay.

In general terms, fungible assets are identical, replaceable, and interchangeable assets, and non-fungible assets, on the other hand are the opposite, i.e., they are unique, irreplaceable, and non-interchangeable. One can argue that a traditional bet such as a $10 bet on team A against team B is a fungible bet and a $10 bet on a tournament to select one or more teams out of so many teams or a series of competitions is non-fungible because each bet could have its own unique selection. Moreover, the winners of a tournament may also receive a unique or limited edition of non-cash prizes or sports memorabilia such as a signed picture of an athlete, a team or a league's logo, etc.

NFTs, short for (Non-Fungible Tokens) are verifiable digital assets that lately have become popular with those looking to own collectibles or rare items. An NFT essentially is a digital item's deed of ownership which can range from images to songs to videos to tweets, etc. NFTs are verifiable through blockchain technology and lately the demand for owning them has been growing as they provide proof of ownership and a new monetization methodology which capitalizes on authenticating their origin and scarcity.

At the end of a game, the value of a fixed odd bet is binary i.e., its value is either zero if the bet loses or its value is the win amount of the bet plus the return of the wager amount less any commission or fee payable if the bet is successful. Until the outcome of a bet is established, it has an implied or theoretical value that ranges between zero and the potential net win including the wager amount. On the other hand, the implied value of a composite bet i.e., a bet that has more than one event, can be established using statistical theory based on the results of the completed events together with the expected outcome of the upcoming events and the potential payout of the wager. Similarly, the implied value for a tournament or a contest is based on the position of the participant in relation to other participants together with the potential payout of the bet and the probability of winning on the bet.

Implied values can be useful benchmarks for bettors to compute the value their bets and arrive at the decision as to whether to sell their bets or to buy other people's bets. As a simple example, if 110,000 people entered a multi-leg tournament and each one paid $1 entry fee for a chance to win a $100,000 prize and 10 people moved up to the last leg of the tournament, then the implied value of each of the 10 participant's position who are in the last leg of the tournament is $10,000. Generally, if a bet gets sold at a price higher than its implied value, then it is sold at a premium and if it is sold below its implied value then it is sold at a discount. Establishing and displaying the implied values can help the tournament participants in determining their buying and selling prices and trading decisions on BetEx which provides a service to the participants to cash out early at competitive prices by selling to others versus taking the risk of waiting to the end of the tournament and not winning any amounts if their bets are not successful. Like any other asset, the market price of a bet is the last price that a similar bet was traded on BetEx.

U.S. patent application Ser. No. 16/896,047 which is anticipated to be issued in November 2021 and is incorporated herein, introduces an innovative technical solution for trading already-placed bets with licensed bookmakers on a wagering ecosystem with a multi-jurisdictional exchange and use of trading symbols that uniquely defines a wagering opportunity. Similar to the stock market, which essentially is a secondary market for already issued securities, BetEx is a secondary market for already issued bets. Also, like options and futures which are derivatives of stocks, an already-placed bet is a derivative, a financial instrument which by itself is not a new bet, instead its underlying asset is the bet that is already in place with a licensed bookmaker.

The embodiments in the previous patents and those described herein introduce what is broadly called Exchange Tradeable Contracts (ETCs) encompassing both traditional and innovative bets such as composite bets, a new class of bets that cover one or more pre-match or in-game events, or future events such as the winner of a league, or in the case of tournaments or contests, is the fee for entering a competition. Moreover, an ETC, whether it is the initial bet or is a derivative of a bet can be presented as a Casino Crypto Currency (C3) as described by U.S. patent publication 20190180558 as incorporated herein by reference.

SUMMARY

Various embodiments of a wagering ecosystem are described, allowing punters and other entities to buy and sell already-placed wagers on the outcome of one or a series of sports, eSports, future events and entries into tournament or contests. In one embodiment, a multi-jurisdictional exchange server located in a first jurisdiction is described, comprising a memory for storing processor-executable instructions, a network interface for sending and receiving buy and sell orders for already-placed wagers via a wide-area network; and a processor, coupled to the memory and the network interface, for executing the processor-executable instructions that causes the server to generate, by the processor, initial bet equalizers for future events or propositions of the tournament or contest, distribute, by the processor via the network interface, the initial bet equalizers to a plurality of licensed book servers ("LBS"s) located in one or more different jurisdictions different than the first jurisdiction, receive, by the processor via the network interface, a buy order to buy an already-placed wager or entry, receive, by the processor via the network interface, a sell order to sell the already-placed wager or entry, match, by the processor, at least one attribute of the buy order with at least one attribute of the sell order, provide, by the processor via the user interface, a first notification to the first LBS that the first already-placed wager was purchased when a first attribute of the buy order matches a second attribute of the sell order, and provide, by the processor via the user interface, a second notification to the second LBS that the first already-placed wager was sold when the first attribute of the sell order matches the first attribute of the buy order. It should be noted that the already placed wager traded on BetEx could have been initially generated as the result of a direct bet made by a punter against a licensed bookmaker or as the result of a P2P bet where one punter placed a bets against another punter and the bookmaker acted as the facilitator between the two punters.

In another embodiment, the win amount for a bet or the prize for a tournament or a contest may include one or more digital assets or NFTs, such as sports memorabilia which can be tracked through an Inter-Gaming Operator (IGO) server that issues and tracks Casino Crypto Currency (C3) for use in gaming and non-gaming transactions as described in US patent #20190180558A1 which is incorporated herein by reference. For each transaction that is processed by the IGO, the IGO debits and credits user accounts in accordance with the attributes of the C3 to track digital assets or NFTs. As a matter of course, each C3 transaction is maintained by generating one or more crypto-blocks with each crypto-block comprising a cryptographically-encoded version of all or a portion of the information in each transaction received by the IGO server.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein:

FIG. 9 is an illustration of one embodiment of a database structure and permission rights for C3 as illustrated in FIG. 5;

DETAILED DESCRIPTION

Figure 1:
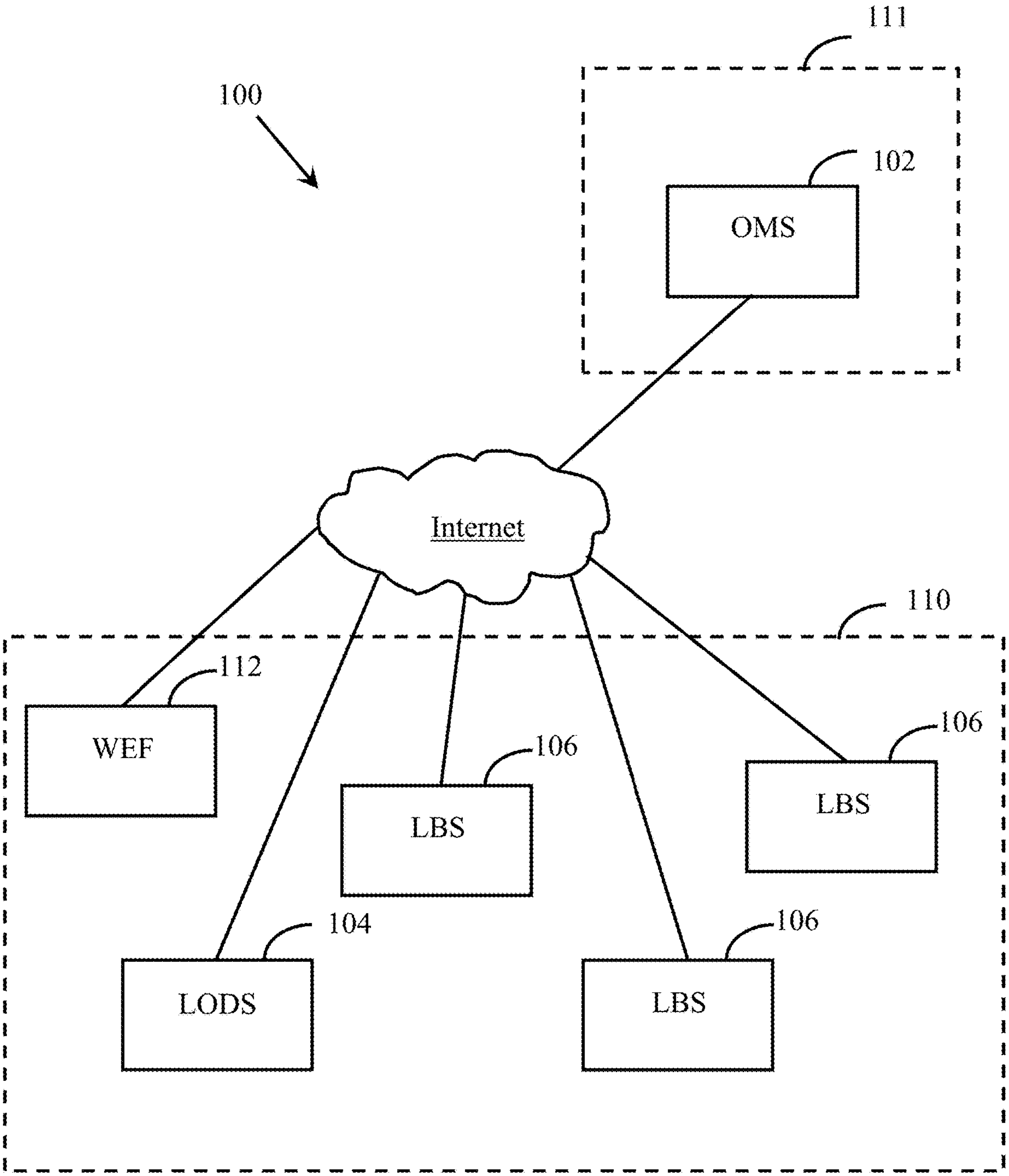
FIG. 1 is an overview diagram illustrating one embodiment of a networked wagering ecosystem.

Embodiments of the present invention introduce a technology solution for creating a secondary market for a multi-state tournament whereby the participants enter a tournament or a wagering pool via licensed operators. The participants then can sell their entry tickets through a multi-jurisdictional exchange using unique ID's as the symbols for trading the ticket and receive competitive pricing for selling their positions while the tournament or contest is in progress. Creating a liquid and competitive market for an entry or purchasing the position of a participant in a tournament allows people to sell their entry/position or buy other participant's entry/position. This flexibility will attract more contestants, provide more options which will result in larger pools and higher prizes.

In one embodiment, a tournament is offered through a multi-jurisdictional betting exchange ecosystem that pays out NFTs as its main prize or as part of the total prize. As a form of stable currency, Casino Crypto Currency ("C3") can represent the implied value of an already placed bet and since C3 includes the data that defines the wager and uses blockchain technology, it can be used to place, accept, record and track wagers and other transactions including buying or selling NFTs as well as storing and transferring digital assets. As an example, a league in partnership with a sportsbook may offer the contestants of a tournament for predicting the winner of the next season's championship and pay cash prizes and/or unique digital assets that represents the league or one of the team's brands such as its logo. The winners will be given the option to sell their assets as NFTs on a blockchain network that uses C3 or another crypto currency exchange that tracks the transactions which will validate the authenticity of the NFT. In the embodiments described herein, each NFT winner may be awarded with a C3 which carries the necessary attributes and parameters to track the NFT that will include the relevant data such as the entity's ID that awarded the NFT, the operator's ID, the player's ID, the tournament's ID, the prize's ID, the date of the award, etc.

In summary, the embodiments described herein describe a multi-jurisdiction betting exchange and ecosystem that may utilize a casino-centric crypto currency (C3). The embodiments also introduce Exchange Tradeable Contracts (ETCs) are derivatives of direct bets or P2P bets (as described in paragraphs 004 and 0052), composite bets, future bets, pari-mutuel bets (pool betting), tournaments, contests, etc. Composite bets are bets on a series of events which, unlike parlays and teasers, do not require a punter to succeed on every event to win on a bet. The props that make up a composite bet could be a series of micro props, or they could be a series of pre-match props. Futures are bets on props for predicting the outcome of some future events or choosing the champion of a league from several available options, for example selecting which team will win the next super bowl. Overall, the embodiments described herein introduce a system and a process as to how Exchange Tradeable (Bet) Contracts (ETCs) are traded legally on the BetEx exchange and its ecosystem, a multi-jurisdictional secondary market and an innovative technology solution to address cross border legal challenges that are imposed by the 1961 Wire Act on the U.S. wagering industry.

Embodiments of the present invention comprise providing a secondary market, or exchange, herein referred to as "BetEx", to buy and sell already-placed wagers. Having a secondary market to buy and sell already-placed wagers may allow bookmakers to buy back their own wagers, either for their own books, or sell them into BetEx and, in return, potentially charge a fee for providing such a service. The ability to sell a wager or may increase the volume of pre-match wagers and the time window for placing such wagers. Also, some punters might look to speculate on an event's odds movement by placing wagers several weeks or months in advance and look to sell their positions at a profit before the game starts if the odds move in their favor.

Orders submitted to the exchange may be required to meet specific limitations imposed by the exchange, such as a minimum transaction amount, an odds range, an expiration date, etc. Additionally, the orders may need to adhere to a standardized protocol for one or more of its elements to distinctly identify the events, the operators that take the wagers, the tracking, the execution, using unique ID's for each element of the order. The term "operator" refers to casinos, sports book venues, racetracks, or any other venues that is legally capable of receiving wagers and/or buy and sell orders. These ID's are stored in a database and used for trade identification, execution, tracking and accounting purposes.

The exchange may store the orders associated with an event in two separate lists, e.g., one for buy and one for sell. The buy and sell orders may have their own sub-categories, such as bet types that are viewable in ascending or descending orders. For example, the orders for an NFL game that is based on spread betting may be grouped by handicapping points such as −3, −7, −10, −14, etc. to indicate the number of points for the favorite team to win against the underdog.

The buy and sell orders could identify a group of events, for example speculating on all of the NFL games in an upcoming week. Typically, bookmakers start offering odds and taking wagers on the upcoming week's events right after a week's last game finishes. As an example, for NFL games where the last game of the week finishes on a Monday and the following week's games start on the following Thursday, bookmakers can start offering odds and taking composite wagers on Tuesday, i.e., right after the Monday night game is finished, for all the games that are scheduled to be played on Thursday night all the way to the following Monday. Mathematically, the odds for all the favorites to cover their total spreads for each game is 1-to-1 right before the start of the week. For example, if there are 16 NFL games in a week, the total spread points for the week's favorites to beat the underdogs based on the consensus of major bookmakers could be, say 107 points, as published by industry web blogs such as www.VegasInsider.com. Once the odds are established, bookmakers, such as LODs and LBSs can start offering composite bets that cover the entire week's games to those looking to speculate as to whether the favorites, as a group, will cover their spreads. At the beginning of a week, say week 10 of NFL, the odds for the favorites, as a group, to cover their individual spreads is 1-to-1, however before or as soon as the first game starts, the odds could change based on the new expected results of the game. For example, if in the first game, the favorite wins by 17 points versus the pre-match odds of winning by 7, then those who have bet on the favorites will have higher odds of winning their composite bets for the week since the remaining total spreads for the rest of the games is now 90 versus 100 as the first game's actual spread was 17 versus 7 as predicted by the bookmakers.

As the legal bookmaking business in the U.S. matures, licensed operators will recognize the need to cooperate with each other through an exchange system with the goal of minimizing their risks. Other than risk hedging, a cooperative exchange provides a shield and a protection mechanism against sharps and those looking to arbitrage between legal bookmakers and international peer-to-peer betting exchanges such as Betfair and BETDAQ to make a quick profit.

Generally, an operator is deemed to have exposure to risk when it receives proportionately more wagers on one side of an event relative to the odds of the final outcome of the event. This imbalance may happen due to the biased optimism of diehard fans in a local market rooting for their teams. For example, when a team from the East Coast plays against a team from the West Coast, the sportsbooks in New Jersey may experience different betting patterns than those operating in Nevada. In such situations, a casino-operator may look to eliminate or reduce some of its risk exposure by sending trade orders to an Odds Management System (OMS) for execution. It should be noted that sportsbook operators might send their orders to an OMS either directly from their own servers or via a third-party server such as a Licensed Odds Disseminator Server (LODS) or an Inter Gaming Operator (IGO) as described in more detail in below paragraphs. Also, there could be several OMS's, each one specializing in managing the risk of different sporting leagues. For example, one such entity could be based in Nevada specializing in football, one in New Jersey specializing in basketball, one in Toronto specializing in hockey and one in London specializing in soccer. Another possibility could be a tribal OMS Exchange that handles several tribes' operations. Furthermore, there could be interoperability between these entities with one entity acting as the clearinghouse for the other entities for certain events. The business model for providing an exchange service could range from offering a spread pricing to charging commissions or charging processing fees based on the number or the size of a transaction or both. Overall, by creating a risk management ecosystem, an OMS generates a more robust market for legal and licensed sports betting operators to establish market odds for an event as well as a process that helps them minimize their risk exposures.

By the way of an example, a bookmaker that in the course of conducting its business has taken $15M in total wagers on a sporting event where $12M is wagered on Team A and $3M is wagered on Team B and Team A is favorite to win 3 to 2 has several options to manage its risk. One option is to place buy and sell orders through the Exchange so that it ends up with $9M in wagers on Team A and $6M on Team B, to balance its book i.e., the total wagers on each side are in proportion to the odds of the event. To achieve this, the bookmaker has to sell $3M of its wagers on Team A and buy $3M of wagers on Team B through the Exchange. Alternatively, the bookmaker may increase its exposure on Team B by buying an additional $1M in wagers on Team B and decrease its exposure on Team A by selling $6M in wagers on Team A. The bookmaker may also decide to take certain risks itself and not to layoff all of its risk exposure, for example it may decide to layoff an amount over a fixed amount of say $200K, or keep a small percentage, say 5%, of the total wagers, which in the above example is $750K, and layoff the rest. Another example that would benefit a bookmaker to minimize its risk is when the event involves multiple players such as a golf tournament where the bettor has to select one winner out of several participants. Similar to any other event, the bookmaker would assign odds to every participant to win the tournament and tries to layoff all or some of its exposures through the Exchange.

The OMS may also be the hub for the participating LBS's to meet the regulatory requirements such as anti-money laundering, match fixing and insider information wagering issues. The interaction with the OMS may be performed manually or through a fully automated system. For example, the OMS may have a portal for each participating operator to upload their private data to its servers or the process may include an automated interface where the LBS's data is updated real time to the OMS's system. The upload or the update may use Blockchain technology including encrypting all or some of the data. Also, the encryption of data could be for business reasons such as keeping the identity of players to remain confidential i.e. not to be disclosed to the operator's competitors or not made public for legal reasons. The data received and stored at the OMS server level are then decrypted for reporting purposes if they meet certain computer program conditions. The decrypted data identified as suspicious activities are then made available to regulators and law enforcement agencies for further investigation. For example, the system may raise a potential money laundering alert if it identifies a person has made large wagers on opposite side of an event with two or more different operators or identifies a potential match fixing incident when the system detects a patron has made a number of similar wagers with several operators or an insider has made a large wager prior to the odds of the event experiencing a big move. Such wagers, once identified and decrypted, are reported to regulators or law enforcement agencies through a secure portal using a private key or a tokenization methodology.

Regardless of the amount of wagers placed through the Exchange, a bookmaker at any time may decide to change the odds of an event for future wagers to entice new bets on the other side of the event. The process of laying off positions i.e., buying and selling wagers into an Exchange requires different parties, each one looking to fulfill their own objectives, such as avoiding risk, facilitating the process, or taking risk on the outcome of an event. By the way of an example, an LODS may act as a facilitator between an OMS and an LBS. And an LODS or LBS may act as market makers that take some risks by providing liquidity and a registered Wager Entity Fund (WEF) may also participate in the risk and market making process. By buying and selling through the exchange or hedging their positions, the process creates liquidity that currently doesn't exist since there is no interoperability between sportsbooks as each one operates independently in a fragmented market.

Overall, the exchange creates an ecosystem for bettors to buy and sell already-placed wagers, including composite bets, with bookmakers as well as P2P bets and use the bookmakers as their brokers, to trade their bets with other bettors. To execute their orders, buyers and sellers must have accounts with a bookmaker participating in the exchange. By buying and selling an already-placed wager with a bookmaker within the exchange's ecosystem, bettors effectively buy and sell derivative instruments backed by bets already placed with a bookmaker. Bookmakers could also act as market makers, placing their own orders with the exchange. Using the above example, the odds i.e. the market price for Week 10 of NFL, after the first game is finished with a spread of 17 vs. pre-match point spread of 7 could be 1.15 i.e. those who bought the favorites are now in the money and can sell their positions to others in an electronic auction marketplace, such as the exchange, that executes their orders based on the best bid and ask prices.

The orders may comprise electronic data messages, instructing the exchange with specific terms and conditions such as "all or nothing" indicating the order cannot be partially filled or it may specify minimum amounts, or may specify a limit price or a market price. When a trading match is identified between two or more orders, the exchange servers execute some or all of the orders, which are then communicated back to the bettors through a respective LBS.

The exchange may require each event to be uniquely identified according to a known convention that creates a distinct ID for each event. For example, an event ID may start with a unique ID for the event followed by the ID for the visiting team and then the ID for the home team followed by the date of the event. The sporting leagues might have a two-digit ID such as 01 for NFL, 02 for NBA, 03 for MLB, 04 for NHL 05 for MLS, etc. and the teams in each league might have three letter ID's such as "Pat" for Patriots and "Rai" for Raiders. Using this convention as an example, a game scheduled to be played, say on 22.12. 2020, between the Patriots and the Raiders will be identified and stored in a database of the exchange as 01.Pat.Rai.22.12.20. For wagering events that cover a number of games as explained above, the event ID could be “01. W10.107” where 01 refers to NFL and W10 refers to week 10 of NFL and 107 represents the total spread points for the week. Currently, the industry uses a rotational numbering system, which uniquely identifies a game during a period but is not unique over time as the same number can be used for different games over and over again.

To identify each participating operator within the ecosystem, unique ID’s may be assigned to each operator using a logical convention that is easy to follow and remember. The convention may include an abbreviation of a state or a city that the operator is based or located, as well as the operator’s name. For example, a unique ID for the MGM casino in Las Vegas, Nevada, could be MGM.LV, for Caesar’s Palace in Atlantic City, could be CZR.AC and for Foxwoods Resort Casino in Connecticut, it could be Fox.CT.

Using unique ID’s, an identification of past and future games may be stored in a database of the exchange and electronically linked to each event’s wagering and gameplay data points, such as point spreads or odds for the whole game or for its half-time or other propositions such as which team will have the first touchdown. If an operator or a regulator is looking to find certain data for an event, they can use a look up search window, for example on a web browser, with a dynamic filtering functionality that can drill down to a specific event using some of the event’s known information such as the date of the event, name of the teams, etc. It should also be mentioned that the terminology for trading sports wagering propositions, especially in peer-to-peer (P2P) betting, maybe different than “bid” and “ask” price as used in the securities industry and the commodities exchanges. For example, a “Back” price in P2P betting may be used to refer to the odds of betting on a team to win and a “Lay” price to refer to the odds of betting against a team to win. Moreover, the odds may be displayed in decimals rather than the traditional fractional formats used in the gaming industry. At any point of time, the exchange may display the best Buy (also known as Back in P2P) price and best Sell (also known as Lay in P2P) price orders available for trading including the size of each order as well as the next series of best odds and their sizes in descending order for the Back prices and in ascending order for the Lay prices. As the orders gets filled and new orders come in, the prices and order sizes changes creating a dynamic market for buyers and sellers to trade their imbalances.

When the exchange is incorporated into an OMS, an OMS may require all wagers received by its members (LODSs and LBSs) for an event to be reported to the OMS. This may be required for several reasons, ranging from meeting regulatory requirements such as anti-money laundering, match fixing, and insider wagering measures, to risk management achieved through establishing market odds and trading wagers between OMS members for their own accounts or for their customers (i.e., punters). It should also be noted that LBS’s may interface directly with OMS servers, or alternatively, communications may occur through intermediaries such as one or more LODS or via IGO if the exchange uses Blockchain technology to keep certain information private for commercial or regulatory reasons. For example, data sent to the OMS, i.e., buy and sell orders, may use Blockchain technology that encrypts the buyer’s and sellers’ personal information, in which case the exchange may then execute a program to check whether a punter has suspicious wagers as described above to be reported to the regulators. If so, information pertaining to one or more buy and/or sell orders from the identified buyer/seller may then be decrypted and privately made available to the regulators and law enforcement agencies through a designated secured portal for further investigation. The reported data may be flagged according to different suspicious activity categories, such as money laundering, match fixing and insider wagering. Moreover, such information may be linked to data received from sports leagues to highlight potential correlations between the leagues’ data and wagers by patrons to help regulators and law enforcement agencies with their investigations. For example, if towards the end of a game, a player misses a goal which he or she could have easily scored, there is a possibility of what is called “point-shaving” that could affect the game’s final point-spread results. Another example could be a referee calling a questionable foul play or a penalty.

The operators may also want to maintain some anonymity for their customers, i.e., buyers and sellers of already-placed wagers throughout the process of buying and selling already-placed wagers with the exchange. This could be achieved by using unique ID’s for customers, such as alphanumeric numbers that are only known to an OMS. For example, an operator may use the first three letters of a player’s last name followed by the last four digits of his or her social security number or driver’s license number. Additionally, or alternatively, operators may use Blockchain technologies that encrypt and chain data feeds between LBSs and OMSs by applying cryptography techniques, using hashing methodologies and using public and private keys. Information sent by operators, such as LBSs, IGOs and LODS, to OMSs may use various types of data formats, such as Comma-separated values (CSV), JSON, XML, etc. The purpose for sending this data could be for informational purposes, such as to assist OMS establish market odds for an event, or for trading and exchange purposes. Overall, the information sent by operators may contain relevant data such as operator’s ID, an event’s ID for a number of wagers, trade orders, etc. for an OMS to act on the orders. Similarly, an OMS may send real time data feeds to LBSs, LODSs and IGOs to report the total wagers taken by the operator on each side of an event, current odds for the event, as well as any buy and sell orders executed by the exchange. The execution of buy and sell orders is recorded in an accounting database which tracks the amounts payable and receivable by each operator. In one embodiment, payments get settled through an OMS or an exchange server and in another embodiment, operators settle their payables and receivables directly which each other.

Other embodiments of the present invention comprise a networked wagering ecosystem across multiple jurisdictions, such that the servers of an Odds Management System (“OMS”) in one jurisdiction sends, over a communication network, wagering odds on substantially real-time basis to a Licensed Odds Disseminator Server (“LODS”) who in turn distributes the odds to a Licensed Book Server (“LBS”), both of whom are licensed to do business within a particular jurisdiction, wherein LBS is operated by an entity that accepts wagers from punters (“P). Overall, embodiments of the invention address the existing challenges, especially for time sensitive InPlay wagers, that licensed wagering entities face for not having regulatory approval to interface their systems with unlicensed entities, and directly use odds calculated by those unlicensed entities. Embodiments of the invention provide an efficient marketplace for providing wagering odds that are legally compliant in one jurisdiction to entities located in other jurisdictions. Described herein is a technical interactivity and interoperability between a licensed entity's system and an unlicensed odds maker's system and also addresses the technology challenges of sorting through large amounts of data facing a Business-to-Consumer ("B2C") entity to identify the best odds and the bet sizes offered by third party odds providers.

Before describing the embodiments of this invention in more detail, it should be noted that the wagering industry in the U.S. started by Nevada casinos providing B2C wagering services with the goal of minimizing their risks as much as possible. This business model is now copied by operators in other states. Risk is managed by changing the odds that they offer to punters as wagers are placed and putting wagering limits or "caps" on wagers. Over the years, Nevada casinos developed various types of fixed odds wagering formats with the principle that at the time a wager is placed, the exact payout amount is established should the wager result in a win. Fixed odds can be offered in different styles, such as straight bets, parlays, totals, money lines, spreads, propositions, teasers, if bets, etc. Also, some types of wagers may have different names, for example straight bets may be called head-to-head bets and totals might be called over and under. Regardless of the types of wagers offered, one can generally put them into three broad categories. The first category includes those that are based on a probability factor, which may be presented in different formats. However, regardless of the way they are offered, they can be translated to a probability percentage of something happening, e.g., a probability of team A prevailing over team B or a probability of a number of teams winning during a tournament as in a parlay wager.

Another category of wagers uses handicap points. For example, if in a football game, team A is favorite to win over team B by 10 points, bookmakers may level off the probability factor to 50/50 by giving one team a handicap point. These types of wagers are called spread betting whereby the favorite team must win by a spread of points, e.g., by 10 points.

Another category of betting on an outcome is binary i.e., something will either happen or not happen. Examples of binary wagering is to bet whether player X scores the first goal or not, or whether a stock price of company Y will close above $100 on a specific date. The premise behind these types of wagers is that the underlying event upon which they are based either will happen or will not happen. Regardless of how a wager is presented, one can translate the odds of a binary event to a probability factor and also calculate an expected payoff based on the event's probability and a fee charged by an operator for facilitating the wager.

It should also be noted that the embodiments described herein could be applied to almost any type of wagering event, although the examples described below cover only one or two types of wagers.

In summary, embodiments of the invention introduce technological solutions that address challenges facing the wagering industry such as compliance with regulatory requirements when accepting wagers from consumers and being restricted from having business relationships and technology interactivity with unlicensed entities in the jurisdiction. The primary reasons behind regulatory requirements are to protect consumers as well as to ensure compliance with taxation requirements. Embodiments of the invention create a technology buffer between licensed Business-to-Consumer ("B2C") entities that offer wagers to punters, and licensed entities that consolidate and disseminate their own and third party-generated odds, while facilitating interactions between Business-to-Business ("B2B") and licensed B2C entities to create a technology solution to regulatory requirements. Overall, the business model of gaming companies is to offer games that have a house edge, receive a fee for facilitating a wager, or taking a rake for offering a game that has no house edge, for example, for games that the house acts as a facilitator, such as in poker games offered inside a casino or a card club. Embodiments of the present invention also create new business opportunities for risk adverse gaming entities that avoid covering a wide range of games or do not offer an extensive number of InPlay wagers. It should also be noted that during the below examples, when reference is made to a game or an event, it may apply to fantasy games based on fantasy teams as played in fantasy sports such as DFS or any future event where an outcome is uncertain.

FIG. 1 illustrates one embodiment of a networked wagering ecosystem 100 comprising an Odds Management Server ("OMS") 102 associated with an Odds Management Service located and licensed to do business in jurisdiction 111, sending feeds of odds and bet limits of future events to a Licensed Odds Disseminator Server ("LODS") 104 associated with a Licensed Odds Disseminator service within a regulated gaming market 110, such as the state of Nevada. OMS 102 generates odds for a variety of events, including InPlay and pre-play events associated with, for example, sporting events. OMS 102 may generate these odds based on user input, i.e., management of OMS 102, and/or autonomously, for example by a processor programmed with Artificial Intelligence, such as IBM's Watson. Initial odds may be set using detailed data, statistics and historical information about past events related to the future events, such as player statistics, team statistics, etc.

LODS 104 disseminates the odds and bet limits associated with future events received from OMS 102 to one or more Licensed Book Servers ("LBS") 106 associated with a licensed gaming entity such as a casino licensed to take wagers in regulated market 110, who in turn offers wagering opportunities to their customers (known as "punters" (P) 108). Each LBS 106 provides a description of each event and the odds and wagering limits associated with each event to the punters, and the punters may place wagers on one or more future events, based on the odds and betting limits. LBS 104 may also provide odds and betting limits to Wagering Entity Fund server ("WEF") 112 associated with a Wagering Entity Fund. Wagers placed by P 108 and WEF 112 with LBS 106 are reported to LODS 104, which then reports them to OMS 102 for risk management purposes and consideration as to whether OMS 102 should change the odds and the bet limits associated with the event, based on wagers placed by punters in one or more LBSs 106 and WEF 112. The totality of wagers received from a plurality of LBSs 106 and/or WEFs 112 of a future event forms a book of OMS 102 and the goal of OMS 102 is to balance the book for each defined future event to limit losses to management of OMS 102 in case the book becomes imbalanced, based on all of the wagers received, including wagers placed by punters in jurisdiction 111 and received by OMS 102. In one embodiment, another OMS 102 provides odds and betting limits directly to WEF 112 or to LBS 106.

It should be understood that although only three LBSs 106 and one LODS 104 is shown in jurisdiction 110, in practice, there is typically many tens or hundreds of LBSs and several LODSs 104 operating in jurisdiction 110. Further, although FIG. 1 shows LODS 104 and each LBS 106 communicating with each other via the wide-area network, in other embodiments, one or more LBSs 106 may communicate directly with an LODS 104, for example over a local-area network or via some other network other than the wide-area network.

Each OMSs 102 is located outside regulated gaming market 110, while LODS 104 and LBS 106 is located within regulated gaming market 110. LODS 104 may calculate and distribute its own odds relating to an event and offer these odds, as well as the odds provided by OMS 102, to LBS 106 and/or WEF 112. OMS 102 may also provide similar services to other jurisdictions 110.

System 100 allows LBS 106 to offer wagering opportunities to its punters that it normally would not, or could not, due to a lack of liquidity that certain wagering opportunities would present. For example, if management of a casino operating LBS 106 wanted to offer a wagering opportunity for punters to place wagers on an "obscure" event, such as the outcome of a soccer game in Chile, it might find that it receives bets from only a few punters. In that event, the chances that the book would be imbalanced is high, meaning, for example, that LBS 106 might receive wagers of $1,000 that soccer team A will win, while receiving wagers of $10,000 that soccer team B will win. This imbalance would normally open management of LBS 106 to a risk that Team B would win, resulting in a large loss to management of LBS 106. System 100 eliminates this risk and shifts it to management of OMS 102, who is better able to tolerate imbalances from a single LBS 106, as OMS 102 receives wagers from many other LBS 106's located in gaming market 110, as well as other wagering/gaming markets. OMS 102 provides odds of certain future events normally unavailable to LBS 106, or on events where LBS 106 may risk low liquidity (i.e., for InPlay wagers, or foreign-based wagers), and LBS 106 offers these wagering opportunities to its customers (i.e., punters), in exchange for a guaranteed fee from OMS 102.

In one embodiment, the odds and betting limits for a variety of wagering opportunities received by LODS 104 from one or more OMSs 102 is organized, for example, by odds and/or by betting limits, and then LODS 104 makes the organized data available to one or more LBSs 106 and/or WEFs 112 within a jurisdiction where LODS 104 is located. OMS 102 may transmit the odds and bet limits to LODS 104 via a web feed, such as RSS or similar technology that provides frequently-updated data content securely to LODS 104 to either be relayed to LBS 106 or stored along with the data received from other OMSs 102 in a memory or database. If the data is stored in a database, LODS 104 may sort it by game/event, by wagering odds and/or by bet limits and relay the sorted data to LBS 106 for selection and offering to a plurality of punters. The data provided to LBSs 106 may additionally comprise an indication of a credit to one or more of the LBSs 106 for using the wagering odds provided by LODS 104 as a guaranteed fee for LBS 106 offering wagering opportunities to punters based on the wagering odds provided by OMS 102. Similar to quotes made by a stock exchange such as NADSAQ, OMS 102 creates a vigorous marketplace for LBSs 106, via LODS 104, to offer new wagering opportunities in their jurisdiction to punters based on wagering odds provided by one or more OMSs 102 located outside of the jurisdiction that the LBSs 106 are located.

It should be noted that LBS 106 and WEF 112 could be the same entity, i.e. an entity licensed to take wagers and willing to take risks, generate its own odds or purchase odds from LODS 104.

Figure 2:
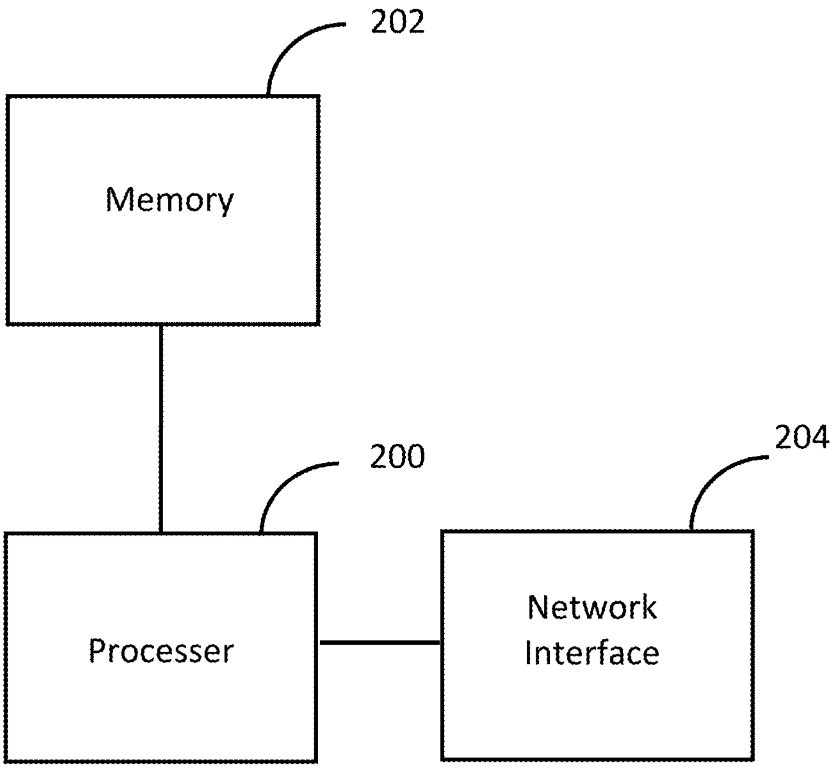
FIG. 2 is a functional block diagram of one embodiment of the LBS shown in FIG. 1 comprising processor 200, memory 202, and network interface 204.

FIG. 2 is a functional block diagram of one embodiment of LBS 106 comprising processor 200, memory 202, and network interface 204. It should be understood that OMS 102, LODS 104 and WEF 112 comprise the same or similar functional components.

Processor 200 is configured to provide general operation of LBS 106 by executing processor-executable instructions stored in memory 202, for example, executable code. Processor 200 typically comprises a general-purpose processor, such as an i5 processor manufactured by Intel Corporation of Santa Clara, California, although any one of a variety of microprocessors, microcomputers, and/or microcontrollers may be used alternatively.

Memory 202 comprises one or more information storage devices, such as RAM, ROM, EEPROM, UVPROM, flash memory, SD memory, XD memory, or other type of electronic, optical, or mechanical memory device. Memory 202 is used to store processor-executable instructions for operation of LBS 106, as well as any information used by processor 200 to offer new wagering opportunities to punters, such as real-time, in-game bets and bets relating to events occurring in jurisdictions other than where the an LBS 106 is located, such as wagering odds provided by LODS 104 and/or OMS 102, one or more books, each relating to a particular wagering opportunity, punter account information, account balances, etc.

Network interface 204 comprises circuitry necessary for processor 200 to communicate over one or more networks, such as the Internet and/or one or more local area networks. Such circuitry is well known in the art.

Figure 3A:
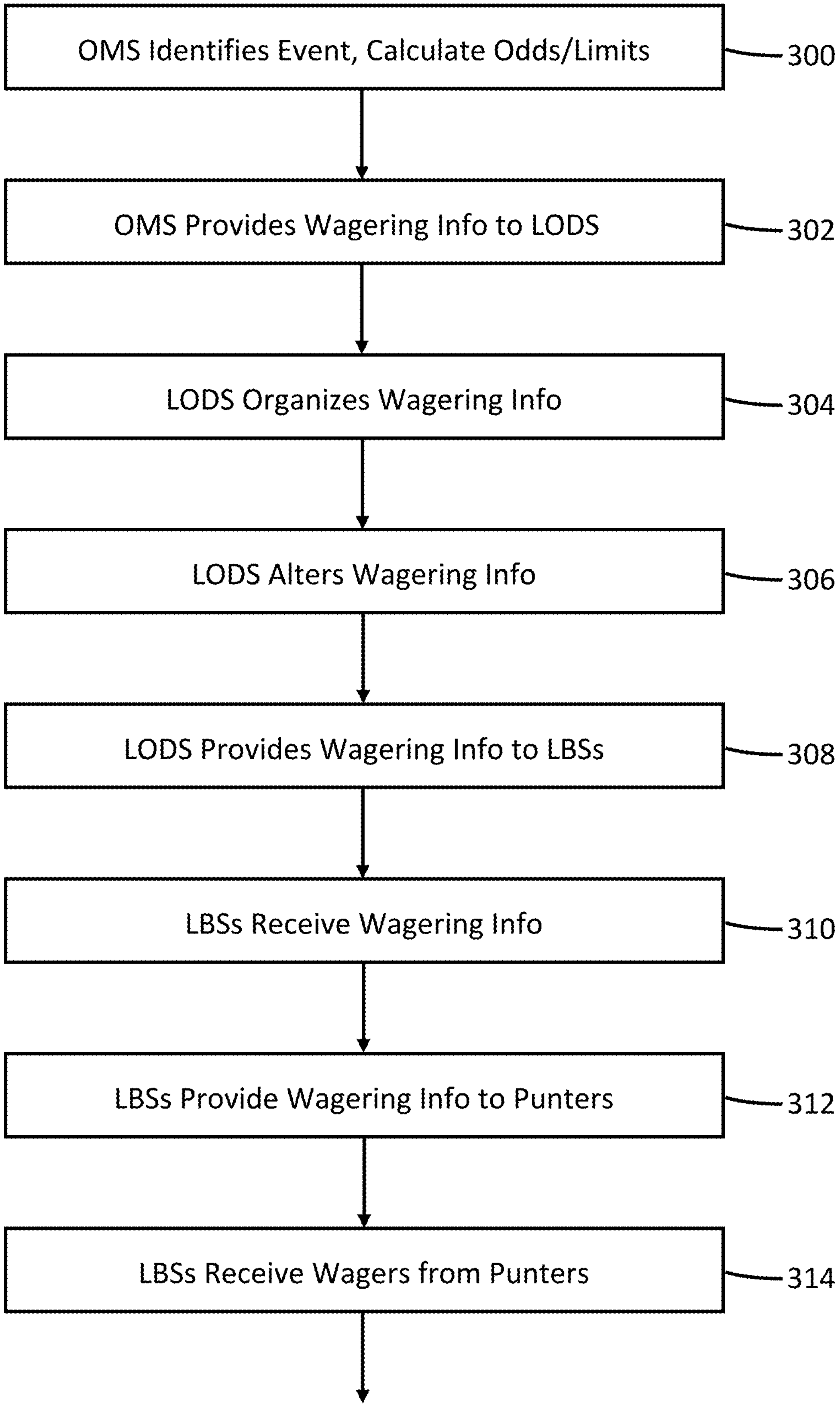
FIGS. 3A and 3B are flow diagrams illustrating one embodiment of a method for enabling the LBSs shown in FIG. 1, located in one jurisdiction to offer wagering opportunities based on future events that occur outside of the jurisdiction.
Figure 3B:
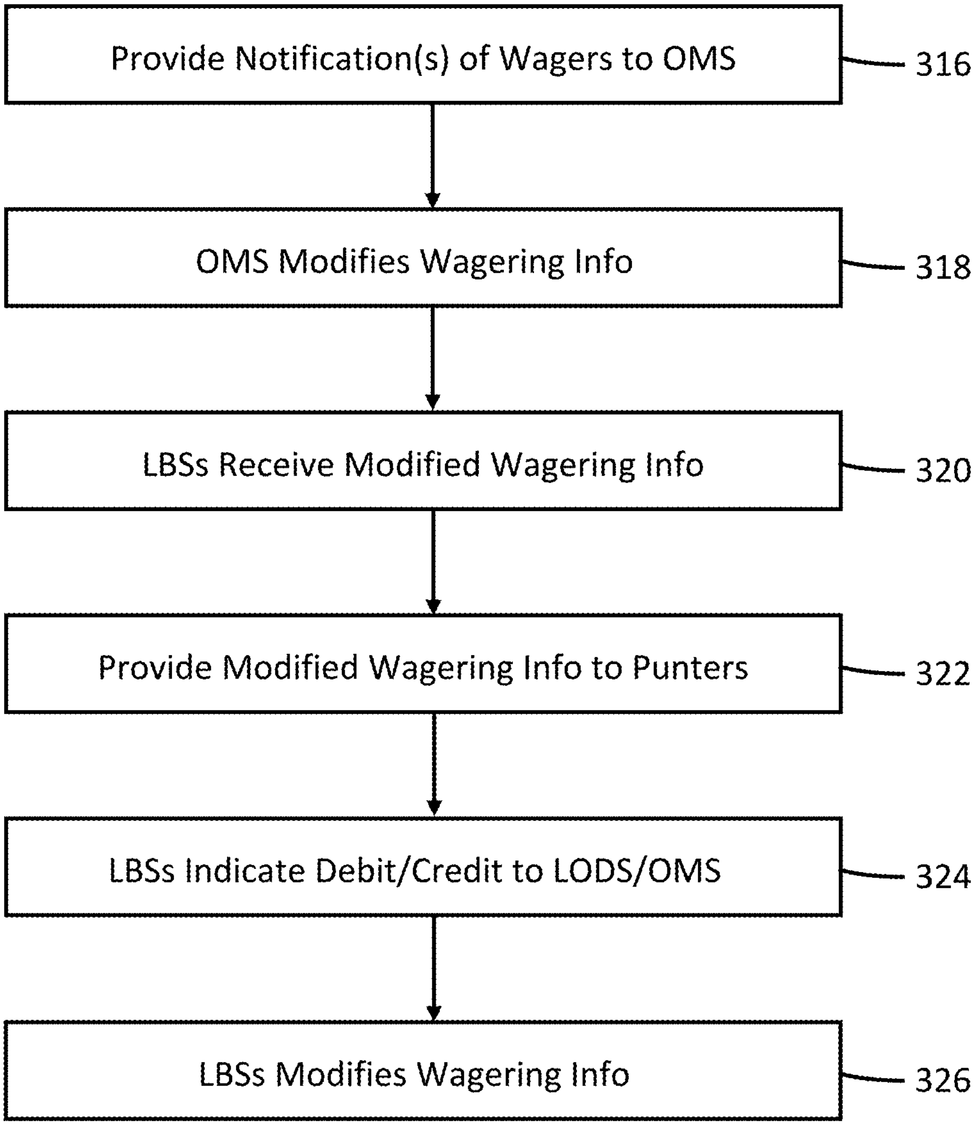

FIG. 3 is a flow diagram illustrating one embodiment of a method for enabling LBSs 106 located in one jurisdiction to offer wagering opportunities based on future events that occur outside of the jurisdiction or on any future event where LBS 106 is at risk for having an unbalanced book, such as InPlay events or "obscure" events, i.e., events not known by a vast majority of the gambling public. It should be understood that the steps described in this method could be performed in an order other than what is shown and discussed.

At block 300, OMS 102, located and licensed to do business in a first jurisdiction, identifies one or more future events and calculates wagering odds, wagering limits, end date/time for receiving wagers, or other information associated with each future event ("gaming information"). OMS 102 may identify events and calculate odds as provided by management of OMS 102, and/or it may perform these functions using artificial intelligence. The gaming information may additionally comprise a guaranteed fee to any LBS 106 who promotes the wagering opportunities to its punters located in a second jurisdiction, as will be explained below.

At block 302, OMS 102 provides an identification of the future event and the associated wagering odds and/or limits (the "gaming information") to LODS 104 via wide-area network, such as the Internet. LODS 104 is located and licensed to business in the second jurisdiction, but not the first jurisdiction. In another embodiment, OMS 102 provides the identification of the future event and associated wagering odds and/or limits directly to one or more LBSs 106.

At block 304, LODS 104 receives the gaming information associated with one or more future events, and may organize this information based on event, event type, event location, by odds, by wagering limit, etc. The information received from OMS 102 is typically stored in a memory or database associated with LODS 104.

At block 306, LODS 104 may alter the waging information provided by OMS 102. For example, LODS 104 may alter the wagering odds, wagering limits, etc. This may be performed automatically, by LODS 104 comparing the gaming information to one or more sets of pre-stored gaming information stored in an associated memory or database. For example, pre-stored gaming information may indicate that the maximum wagering limit for any wager is limited to $500. If a wagering limit received from OMS 102 is greater than this limit, LODS 104 may alter the limit received from OMS 102 to $500.

At block 308, LODS 104 provides the gaming information to one or more LBS 106, typically via the wide-area network, either in the original format as provided by OMS 102, sorted by LODS 104, and/or altered by LODS 104.

At block 310, LBS 106, located and licensed to do business in the second jurisdiction, but not in the first jurisdiction, receives the gaming information from LODS 104. The gaming information is provided to processor 200 via network interface 204. In some embodiments, the wagers include wagers tied to InPlay and pre-play events.

At block 312, processor 200 provides the wagering opportunities, including wagering odds and betting limits, to a plurality of punters. This may take the form of processor 200 updating a web page where wagering opportunities are offered to punters, and/or processor 200 may provide a signal to a display board located in one or more venues, such as casinos, where an indication of each future event may be displayed along with the wagering odds calculated by OMS 102 and/or LODS 104. Punters may place wagers on one or more of the future events, for example, online or by interacting with an agent of a venue, providing monetary value to the agent in exchange for a ticket, voucher or other proof that a wager was placed for a certain future event.

At block 314, processor 200 receives an indication via network interface 204 that one or more wagers have occurred, typically indicating an identification of a punter who placed the wager, a wager amount, an identification of the future event selected by the punter on which the wager is applicable, and/or the wagering odds. Processor 200 may store this information in memory 202.

At block 316, processor 200 may provide a notification of each wager that is received via network interface 204 to LODS 104 and/or directly to OMS 102 via the wide-area network, either as the wagers are received or at predetermined time intervals, such as every 15 minutes. The notifications may comprise an identification of LBS 106, a wager amount and an identification of the future event selected by the punter, or it may comprise, simply, a book maintained by LBS 106 regarding wagers placed on both sides of the bet for each particular wagering opportunity offered to punters. In one embodiment, the notifications are provided to LODS 104, and LODS 104 forwards the notifications to OMS 102. In one embodiment, LODS 104 may not report the wagers that can get consolidated, because their associate risks effectively offset each other. By balancing the risks associated with these wagers, LODS 104 can keep in-house the profit spreads pertinent to these wagers.

At block 318, either LODS 104 or OMS 102 may modify the wagering odds for the future event listed in a notification, based on the wagers placed by punters in the jurisdiction where LBS 106 is located, since OMS 102 is ultimately responsible for the risk of book imbalances of LBS 106 and other LBS 106's. For example, OMS 102 may provide original wagering odds regarding a future event to LODS 104 and then LODS 104 forwards the odds to LBS 106 as 2:1 that an outcome of the future event would favor outcome A vs. B. LBS 106 provides these odds to punters as explained above, and may receive $2000 in wagers that outcome A will occur, while only receiving $500 that outcome B will occur. These wagers are reported to LODS 104 and/or directly to OMS 102 to be included in OMS 102's overall risk management system serving multiple jurisdictions. In response to receiving the wager information from one or more LODSs 104 and/or one or more LBSs 106, OMS 102 may modify the odds in order to reduce a risk of loss due to an imbalance that may occur based on the totality of wager information received from all LBSs 106. For example, OMS 102 might modify the 2:1 odds to 4:1 in an attempt to balance its own book. The modified odds are then provided to any LBS 106 that is offering wagering opportunities of the future event associated with the odds change, either directly or via one or more LODSs 104. When processor 200 determines that a book related to a future event is out of balance by more than a predetermined amount, processor 200 may change the odds relating to the event in order to attempt to bring the book back in balance. The predetermined amount could comprise a percentage of the potential loss to OMS 102 or a potential dollar loss in the event that OMS 102 would have to pay out more than it received in wagers from multiple ones of the LBSs 106.

At block 320, the modified odds are received by processor 200 via network interface 204, either directly from OMS 102 or from LODS 104.

At block 322, processor 200 provides the modified wagering odds for the future event to punters via network interface 204. Thereafter, LBS 106 receives wagers for the future event from punters based on the modified wagering odds.

At block 324, LBS 106 may provide a debit or a credit to OMS 102 or LODS 104 based on contractually-guaranteed fees provided from OMS 102 or LODS 104 to LBS 106 for LBS 106 using the wagering odds provided by OMS 102 or LODS 104 and based on the payouts by LBS 106 to punters who won wagers on the future event.

For example, LBS 106 may receive wagering odds of a future event from LODS 104 when LODS 104 receives the wagering odds from OMS 102, where OMS 102 is located outside the jurisdiction where LODS 104 and LBS 106 are located. The owners of OMS 102 or LODS 104 may be contractually obligated to provide LBS 106 a guaranteed fee in exchange for promoting betting on future events occurring outside the jurisdiction where LODS 104 or LBS 106 are located. In one embodiment, a guaranteed fee might comprise a fixed percentage of all wagers received by LBS 106 for each future event promoted to punters by LBS 106, such as 2%.

In one example, if a future event comprises a sporting event played by teams A and B against each other, OMS 102 or LODS 104 may provide wagering odds to LBS 106 that team A is favored to win against team B by 10 points. LBS 106 promotes this event and the wagering odds provided from either OMS 102 and/or LODS 104 to punters and receives $11,000 in wagers for team A to win and $5,500 in wagers for team B to win, i.e. LBS 106 receives a total "handle" of $16,500. If team A wins, then LBS 106 must provide a payout to winning punters who wagered on team A in the amount of $20,000, according to a traditional business model of betting $11 to win $10. This results in a net loss to LBS 106 of $3,500 ($16,500 received and $20,000 paid out). In this example, LBS 106 determines the net profit or loss after game has concluded and provides a notification to LODS 104 or OMS 102 of the net loss or profit. In this case, LBS 104 notifies OMS 102 and/or LODS 104 of the $3,500 cash flow shortfall ($20,000 in winner payouts less $16,500 in total wagers received and adds the guaranteed fee of $330 ($16,500×2%) to the amount that LODS has to compensate LBS for this event. LODS 104 or OMS 102, in turn, provides LBS 106 a credit in the amount reported by LBS 106. LBS 106 may report such profits, losses and fees for a specified period, such as a week or a month, and LODS 104 or OMS 102 may settle with each other at these time intervals or some other time interval. Moreover, a similar arrangement may be in place between LODS 104 and OMS 102, where OMS 102 provides a guaranteed fee to LODS 104 for LODS 104 distributing the wagering odds from OMS 102 to LBSs 106 in LODS 104's jurisdiction. In this case, LODS 104 reports to OMS 102 the results of all wagers placed by all LBSs 106 that used the wagering odds from OMS 102.

Continuing with the example above, if $5,500 was wagered on team A and $11,000 was wagered on team B, and team A won, then LBS 106 would have to pay $10,000 to the winners which, when subtracted from the total handle of $16,500, results in a net profit of $6,500 to LBS 106, plus the guaranteed fee of $330. LBS 106, then, would report a credit to LODS 104 or OMS 102 of either the grand total of $6,170 ($6,500 less $330) or it would provide the net profit and guaranteed fee separately. Assuming that LODS 104 makes 1% on all wagers from OMS 102 for wagers placed through multiple LBSs 106*s* who received the wagering odds from LODS 104, the settlement between OMS 102 and LODS 104 will reflect the accounting between LODS 104 and all LBS 106 entities that took wagers from punters based on the guaranteed fee arrangements. It should be noted that the fee percentages may vary. For example, InPlay wagers may have a higher fee than pre-match wagers, and also the fee percentages may vary by game or by types of wagers.

At block 326, LBS 106 may decide to adjust the wagering odds or its fees with LODS 104 using LOD's Routing and Management System ("RMS"). The RMS system is an interface system that manages the feed of gaming information between LODS 104 and LBS 106 and manages other data such as wagers taken by each LBS 106. The decision to change the odds may be for marketing reasons to distinguish one LBS 106 from a competing, other LBS 106 who offer the same odds disseminated by LODS 104. Using the above example where team A is favorite to win over team B by 10 points, if LBS 106 changes the spread to 12 (from 10), and team A wins by 11 points, then LBS 106 would not have to pay punters who wagered on team A, because LBS 106 changed the spread. In such cases, LBS 106 keeps the profit on these wagers in-house without having to account to LODS 104 or OMS 102. Conversely, if LBS 106 changed the 10-point spread to 8 points, and team A won by 9 points, LBS 106 would lose on these wagers and has to pay punters who bet on team A without getting compensated from LBS 106 because it changed the odds offered by LODS. In another embodiment, when LODS uses the odds from several OMS's for an event, the RMS may handle the routing of the event and odds selection from one or more OMS 102's to one or more LBS 106's. LODS 104 staff may use an administration terminal to access a database associated with LODS 104 and/or staff at LBS 106 may use an administration terminal to access the same database to select and order wagering odds for future events or upcoming sporting matches that LBS 106 is interested to offer to its punters P using the odds provisioning service offered by LODS 104/OMS 102. The RMS may also provide customization options for LBS 106 staff to adjust the wager odds and guaranteed fees by an amount such as one or more percentage points, to aid LBS 106 in distinguishing its offerings from other LBSs 106. Any modifications made are stored in the database associated with LODS 104. As an example, if fees associated with odds related to a tennis match and provided by LODS 104 to LBS 106 for InPlay wagers are 8%, LBS 106 may request to LODS 104 that the fee be increased an additional 2 percentage points, or 10%. Such modifications allow LBS 106 to have the flexibility to customize its own odds and fees around its business and marketing plans.

Figure 4:
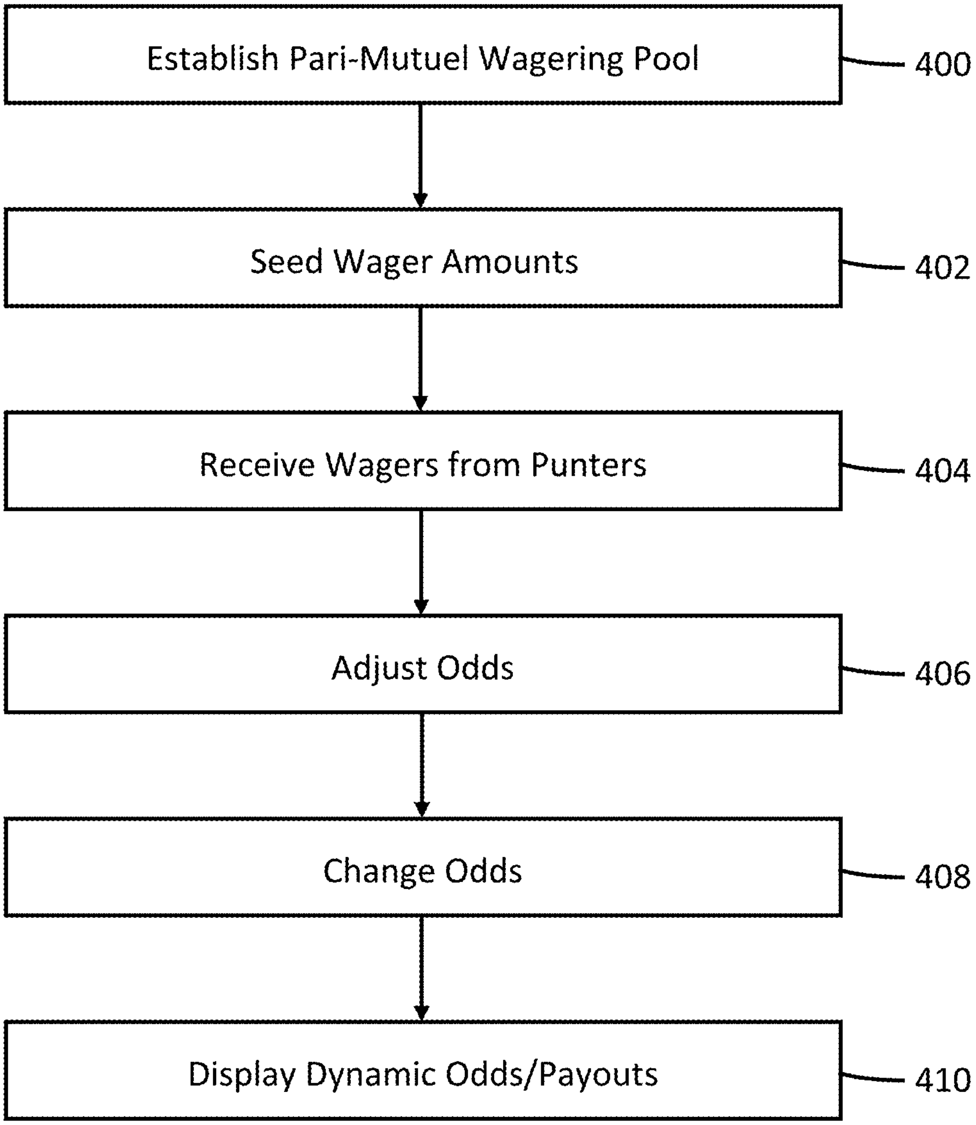
FIG. 4 is a flow diagram illustrating one embodiment of a method performed by the LBS or WEF shown in FIG. 1, acting as a wagering fund prepared to take risk, which may either get licensed as a book or cooperate with one or more existing books to offer "hybrid" wagering.

FIG. 4 is a flow diagram illustrating one embodiment of a method performed by LBS 106 or WEF 112, acting as a wagering fund prepared to take risk, which may either get licensed as a book or cooperate with one or more existing books to offer "hybrid" wagering, i.e. a combination of fixed odds and pari-mutuel wagering. In this embodiment, after paying fixed odds winners and fees associated with both the fixed odds and the pari-mutuel wagers, LBS 106 or WEF 112 distributes the remaining balance in a betting pool to winners proportional to their wagers. A hybrid-wagering framework allows punters who prefer fixed odds to participate in placing wagers on games with those who are participating in a pari-mutuel format. Having both fixed odds and pari-mutuel stakeholders willing to take risk in one pool can create a bigger and more robust market than having a number of individual pools of fixed odds, with each entity trying to balance its own book. By using historical data and statistical analysis that generates odds with higher win probabilities and implementing arbitrage with other books, a wagering fund associated with WEF 112, for example, could take calculated risks and produce above average returns for its investors. This system and process of offering fixed odds within a pari-mutuel framework could create an attractive wagering venue for both average punters, who would prefer fixed odds, and also provide a robust market for those who are willing to take more risk and in return receive better returns. In one embodiment, one or more wagering funds willing to take more risk may guarantee the pari-mutuel participants a payout range if their wagers prevail. The model supports having different classes of pari-mutuel bettors which takes into account the general principle of those who take more risks have the potential for more rewards. It should be understood that the steps described in this method could be performed in an order other than what is shown and discussed. It should also be understood that although the following discussion references only WEF 112, the same principles could be applied to LBS 106. Finally, it should be understood that WEF 112 comprises the same functional components as LBS 106, shown in FIG. 3, and reference will be made to these components during the following discussion.

At block 400, WEF 112 may either by itself or in partnership with LBS 106, establish a pari-mutuel wagering pool for a game or an event in response to input from management of WEF 112 via network interface 204 or a user input device, such as a mouse/keyboard (not shown). In response, processor 200 provides a notice of wagering opportunities for the game or event to punters in a casino via network interface 204 and one or more displays located inside the casino. The notice includes fixed odds, as generated by LBS 106, WEF 112, LODS 104 or OMS 102, as well as an indication that a pari-mutual payout will also occur. Processor 200 may additionally create a data record for storage in memory 202 of the wagering pool to track wagers placed by punters on either side of the wager. Such a data record may comprise an identification of the game or event, initial wagering odds, total wagers placed on one side of the bet and total wagers for the other side of the bet. A wager size limit may also be determined by management and provided to processor 200, which includes the wager size limit in the data record. Finally, a risk amount may be defined as the maximum dollar amount a risk manager/ management of a book or a fund would be willing to lose if the outcome of the event is unfavorable to a position that management could take in the outcome of the event.

At block 402, processor 200 may seed one of the total wager amounts stored in the data record with an amount that is based on a probability factor for the wining side that is either internally generated by processor 200, provided by management, or offered by a third party. As an example, processor 200 may receive from LODS 104 or OMS 102 wagering odds that team A is a 2-to-1 favorite to win against team B and, in response, processor 200 may seed the total wagers placed for team A, as stored in by the data record, in an amount of $50 and seed the total wagers for team B in an amount of $100. In another example, if the wagering odds comprise a point spread, and team A is favorite to win by 10 points against team B, each of the total wagers for each of team A and team B may be seeded with the same amount, e.g. $100. Seeding both sides maybe in line with the expected payoff including any fees or those offered by a traditional fixed odds bookmaker, for example, if team A wins by at least 10 points, an $11 wager on team A wins $21 which includes a $1 fee for the bookmaker.

At block 404, processor 200 begins receiving wagers from punters via network interface 204. As the wagers are received, they are stored in memory 202.

At block 406, processor 200 may perform an adjustment of the odds, maximum wager allowed, and/or place a wager on one side if the pari-mutuel pool starts to become imbalanced. The adjustment may be performed automatically, by evaluating the wagers placed on both sides of the bet and determining when one balance is greater than the other balance by a predetermined amount and comparing the imbalance with criteria stored in memory 202, such as the maximum risk limit, or a stored ratio of one side of the bet vs. the other, or some other factor that indicates that the pool has become unbalanced, meaning that the wagers placed are not in proportion to expected wagers based on the odds provided to the punters.

As an example, if the wagering odds are 2-to-1 in favor of team A beating team B, and the maximum risk limit is defined as $50,000, processor 200 may begin reducing a wager size limit that punters may place on a sliding scale on one side of the bet, reduce the maximum wager limit and/or place a bet on one side or the other, either through an automated (via processor 200) or a manual (i.e., management) process, if one side of the bet moves away more than a pre-established threshold from the 2-to-1 probability factor. Each time the thresholds are hit, processor 200 automatically makes an adjustment or sends an alert to an operator to provide input to processor 200 for processor 200 to make an adjustment. By the way of an example, one may expect that given odds of 2-to-1 in the above example, if $100,000 is wagered on team A to win, the wagers for team B should be roughly $50,000. However, when the total wagered amount on team B is $80,000 and on team A is $100,000, and the wagering odds remain at 2-to-1, management of WEF 112 could have a $60,000 loss in the event that Team B wins (Total take=$180,000, less (2:1 payout to wagers placed on team B=$160 k plus return of wagers to punters who placed wagers on team B=$80 k)). To bring the wagers in line with the odds of the event, in one embodiment, processor 200 determines the exposure or amount that management of WEF 112 could lose, based on the wagers placed, and "wagers" $30,000 on team A to win and, in one embodiment, change the wagering limits that a punter can place on the event, for example, new wagering odds of 1.25:1 that team A will beat team B, which is in conformance with actual wagers received by processor 200 when the wagering odds were at 2:1. In other embodiments, processor 200 reduces the maximum bet allowed for team A or reduces the odds from 2:1 to something less.

At block 408, after setting up the pool (i.e., generating a wagering record of the event for storage memory 202 and promoting the event to punters), the odds of an event may change. For example, a key player may become injured, or OMS 102 and/or LODS 104 modify the odds based on wagers received. In this case, processor 200 calculates new odds based on a changed circumstance, may suspend accepting new wagers from punters and/or may start a new pool using the modified odds, and then provides the changed odds to punters.

In one embodiment, processor 200 may guarantee a minimum or a range of payouts if a wager prevails. In such situations, any monetary deficiencies have to be covered by the risk dollars set aside associated with the odds offered for the event. If the system offers these types of guarantees, then the hybrid system has to be more sensitive to the wager limits and adjust them more frequently. In one embodiment, one or more pari-mutuel participants e.g. WE 112 may take the most risks and guarantee a range of payouts for the other pari-mutuel participants if their wager prevails. For example, if the probability of a team winning is 2 to 1, the payout to a class of pari-mutuel participants may range between 3/2 to 1 and 3 to 1 if their wager wins. In such cases, those taking the most risk, for example WE 112 will stand to receive the most rewards by sweeping the remaining balance in certain circumstances, which might translate to a higher payout e.g. 5 to 1.

At block 410, during the open period prior to the event, when processor 200 permits wagering on the event, processor 200 may dynamically display the odds or payoffs for a pari-mutuel bettor based on the current status of wagers placed. Once the event is finished and the results are established at block 410, i.e., processor 200 receives an indication via communication interface 204 of a result of the event, processor 200 provides a credit to the fixed odds winners in accordance with the odds when the winners placed their wagers, as well as fees due to WEF 112, i.e., as a fixed percentage of the total pool for hosting the pool, before processor 200 provides credit to the pari-mutuel winners. Processor 200 credits winners by sending payout information based on the wagers and the odds when the wagers were placed, as retrieved from memory 202, to one or more network-based terminals inside a venue where the bets were placed or over a wide-area network to online winners.

By offering hybrid wagers, i.e. a blend of fixed odds and pari-mutuel wagering, together with an interactive market and competitive odds for wagering on sports and uncertain future events, allows entities such as WEF 112 to act as an investment fund for investors that are willing to participate in high-risk and high-reward transactions that a traditional licensed bookmaker, whose primarily goal is to mitigate risks and balance it book, shies away from.

In another embodiment, an industry-wide, digital gaming currency and blockchain accounting system is described, that effectively replaces existing casino currencies, which may be used by gaming system operators to determine gaming revenues across all gaming platforms. The embodiments described herein may also be used to generate data and metrics for awarding loyalty points to players for wagers placed inside a gaming establishment as well as games played online. Such data/metrics may comprise including players' names/IDs, game IDs, wager amounts, times when wagers are placed, and results of wagers. Embodiments of the invention introduce a digital casino chip/currency, referred from hereon as Casino Crypto Currency (from heron abbreviated to C3). A user or an application can access the user's C3 with one or two private keys to securely read or record a wager and its result. In addition, C3 may be used to conduct non-wagering transactions, such as the purchase of food and beverages, clothing, jewelry, or other goods or services, associated with a particular gaming establishment, in one embodiment.

Cryptography is a methodology for storing data securely into a database and ensuring only those who are authorized can access the data. Access to each record of C3 may be based on pre-assigned permission rights as stipulated by gaming laws and regulators of a particular jurisdiction. Storing C3 into a centralized ledger includes generating a hash string of data that is immutable and is time stamped. The creation and recording of C3 transactions into a centralized ledger include creation of a fingerprint i.e. a digital signature that at any subsequent point in future can prove the data's integrity by regenerating its fingerprint and comparing it with the original fingerprint stored in a database to prove the data remained unaltered since first writing the hash to the centralized ledger.

C3 is a virtual currency created and stored in a combination of central and distributed ledgers under the control of a licensed inter-gaming operator ("IGO"), which issues C3 as a cross-platform virtual currency. In the case of sports wagering, an IGO could manage the operability of an Odds Management System ("OMS") provider, similar to a market maker of a stock or a futures exchange whose job is to create an orderly market for both sides of a transaction. As described in U.S. patent application Ser. No. 15/436,600, an OMS may collaborate with a Wagering Entity Fund ("WEF") to help balance its book. Additionally, an OMS and or a WEF may insure or reinsure all or some of their risks with one or more insurance or reinsurance companies. Overall, as wagering expands across many states and becomes more digital via websites, financial institutions and insurance companies may want to get involve in the business and may introduce their own blockchain technologies and cryptocurrencies that are interoperable with C3, thus providing more transparency and liquidity to the wagering business, which ultimately may benefit the average sports fan that is betting on a sports wagering event. Additional financial institution participation may also help to drive illegal sportsbook operators out of the marketplace, whose activities are estimated to be in billions of dollars. IGO's servers, together with other connected servers, create a distributed ledger to maintain and track transactions involving C3, such as gaming transactions and non-gaming transactions.

An IGO may comprise a casino operator licensed by a regulator or it may comprise an entity providing such a service to one or more gaming system operators. In one embodiment, multiple IGO's may serve the casino industry with each IGO being licensed by one or more regulators following the laws of the jurisdiction that their particular casinos operate in. C3 is a cryptographic currency that has chains of records tied together in blocks that may include player and game data on a distributed ledger with each transaction having immutable records to make fraudulent misuse of its data almost impossible. The chains of records maybe tied together using a unique ID such as the player's social security number, driver's license number together with the issuing state or the player's biometrics e.g. fingerprints, face recognition, etc. The use of a unique ID for each player and associating it with each wager on an immutable distributed ledger makes a C3 account to be a historical gaming ledger for each player. Furthermore, an IGO may be the only entity that could create a C3 account and convert the currency value of C3 to a legal tender such as U.S. dollar or another virtual currency.

Embodiments of the invention allow for a user's C3 to be managed by a digital wallet, where a user may "spend" his or her C3 on goods and services that accept C3. In one embodiment, merchants associated with a particular gaming system operator, such as internal or external restaurants, shops, spas, and hotels of a casino operator, may each register with one or more IGOs. "Associated with" means owned by, authorized by, licensed by, and/or using the same C3. This process allows a C3 to be used over and over for gaming and other forms of commerce without the need to be redeemed and reissued every time. Use of C3 for both gaming and non-gaming means C3 is maintained on a hybrid blockchain, i.e. C3 offers both the benefit of private and public blockchain through a middleware or a platform that converges the functionalities of public and private blockchain networks. Gaming data related to a user's wagers is recorded in a private database over a private network associated with each gaming operator, accessible only by authorized personnel, such as gaming operators and regulators, and non-gaming data may be maintained on a public network. The private network generates hash values of all transactions and stores resulting crypto-blocks on a blockchain network or in a local memory or database. The hybrid format of C3 allows flexibility i.e. its gaming-related data stays private on IGO servers for security and auditability purposes and the non-gaming data is shared publicly on a public network that ensures every transaction is verifiable by an immutable record on a public blockchain platform such as Ethereum. In its public state, each transaction gets approved by a secure and trustworthy network thus making it difficult for a single public actor to meddle with the transactions or entries.

C3 is a secure, transparent and immutable currency issued and managed by IGO that makes the C3 balances available on both private and public networks, restricting the right to view certain transaction details of wager-related transactions. C3's hybrid nature means every device running a public node in the network has a ledger stored on its local machine and private nodes are connected to one or more IGO's via one or more networks that contains all gaming transactions that have been validated and put into a block. It should also be mentioned that some parts of C3 data maybe be encrypted using conventional methods before hashed.

C3 may create labor efficiencies within the gaming industry and reduce credit card transaction fees for casinos and those merchants that collaborate with an IGO to accept C3 in commerce. Using C3 as a platform-agnostic currency resolves issues that arise by having to manage a variety of currencies, such as cash, chips, vouchers, TITO, account wagering, casino credit and loyalty points. Using C3 consolidates one or more existing casino currencies into one digital currency, which may comprise historical wagering data to help a gaming operator to streamline its business, save on credit card transaction fees and have a better reporting system. Currently, operators use different sportsbook systems, which makes it very difficult to identify suspicious wagers placed on a sporting event. However, C3 may be used to maintain a historical database of wagers made on a sporting match to deter bad actors profiting from fixing an event's result or laundering money by placing large wagers with one or more operators In another embodiment, a win recognition system is described that recognizes a player's win amount by counting and recognizing the value of chips paid to a player after the conclusion of each round of play. In a related embodiment, a miniaturized camera may be placed into a chip tray of a table game that can recognize the total chip inventory, including the number and denomination of the chips, within a chip tray at any given moment. A software solution that includes a win recognition system could flag some of the potential errors of a bet recognition system that utilizes cameras to make determinations. For example, if a bet recognition system reported that a player wagered $55 at a blackjack table by reading a wager as two $25 chips and one $5 chip, and a win recognition system incorrectly reads the winning chips as three $5 chips i.e. $15 in win amount, then the win determination system may flag the dealer to investigate and correct the inconsistency, which might have occurred either during the bet recognition or during the win recognition process. In one embodiment, the payout logic of a game could be part of the win recognition system. For example, if the bet recognition system reads a $10 wager and the win recognition reads $15 in winning chips, then the win recognition system may report just a cautionary warning signal and not an error because most likely the player had a blackjack and was correctly paid 3-2.

Combining bet recognition with win recognition and a chip tray inventory recognition can create a fully integrated solution that decreases the possibility of chip reading errors going unnoticed. Taking the above scenario as an example, if a win recognition system reported that the player had a blackjack, then the $15 payout is expected and is not flagged as an error. However, if the card recognition system reported that the player had twenty, e.g. two tens, then the program would flag an error. Overall, win recognition, chip tray inventory and card recognition systems provide additional checks and balances to a bet recognition system in identifying a misreading, which typically happens due to environmental interferences. Because the readings of each recognition system occur at different times, the probability of an error going undetected is reduced when combining two of the above described interdependent systems and even further reduced when there is interoperability between three or four of the systems described above.

In one embodiment, C3 could automatically integrate the readings of a bet recognition system for the purpose of awarding a player with rewards, as well as the readings of a win recognition system for the purpose of rating a player and profiling a player. Moreover, a program combined with bet recognition, card recognition, win recognition and chip inventory recognition can provide real-time win and loss accounting for a table game when using traditional casino chips, as well as better rating players and rewarding them while the industry fully transitions from physical chips to C3.

The more players that are registered with an account that has a unique identifier for each player on a distributed ledger such as C3, the more efficient the industry may become, which would also benefit consumers. For example, if a player scans a QR barcode at a gaming table using a QR reader app installed on his or her phone and is prompted to register or login to his or her C3 account, the player then can either use his or her C3 wallet to place a wager at a C3-enabled table or use regular casino chips and a bet/win recognition system installed at the table. The player may then connect to a gaming server or loyalty server coupled to a bet determination system at the table through the Internet or a local WIFI network to receive loyalty points on real time basis.

The central ledger kept by IGO servers ensures integrity of C3 records and an audit trail that is visible only to authorized entities, such as operators and regulators, who are assigned one or more private keys to access C3 records. For example, the personal and gaming history of a C3 holder may not be visible to a merchant taking C3 from a person buying a cup of coffee at the casino resort's coffee shop but is available to the casino operator and gaming regulators who have jurisdiction on the operation of the IGO and/or a related casino.

In one embodiment, gaming and non-gaming transaction data may be maintained by an IGO, while a subset of such transaction data, such as a running account balance, transaction prices (i.e., wager amounts, payoffs received, prices paid for goods and services), and the dates and times of the transactions are verified by a public, distributed ledger. In another embodiment, gaming transaction data is maintained by a private server, such as casino server, and a subset of the gaming transaction data is provided to IGO (such as net wagering result). In this embodiment, for every gaming transaction, the IGO updates a user's account balance and verifies the account balance using the public, distributed ledger. In any case, users may be issued one or more private keys or a combination of one or more public keys and private keys to access either the gaming and/or non-gaming transaction data. For example, a merchant may only be able to verify the validity of C3 and an account balance, while a casino, regulator or government agency could access the details of gaming transactions, including an identity of a person converting cash into C3 and those converting C3 to a legal tender such as cash or other tenders such as a digital currency.

One of the properties of C3 is incorporation of the principle of Know Your Customer (KYC) as its foundation, which corresponds with the strict KYC standards of regulated online gaming. A benefit of C3 includes its application in sports wagering to deter match fixing and money laundering by bad actors by creating a C3 sports wagering integrity database that links and aggregate all wagers made by one person on an event on one or more Licensed Book Servers ("LBS") and creates an alert if the person exceeds a pre-established amount or has placed opposite wagers on an event. The alert may be determined by one or more LBS servers or Odds Management System ("OMS") servers, which manages the odds of an event and distributed to LBSs through a Licensed Odds Disseminator Server ("LODS") as described in U.S. patent application Ser. No. 15/436,600. Overall, the integrity database created by C3 has the ability to identify a person that tries to avoid getting the attention of operators, regulators and law enforcement agencies by placing wagers across multiple operators covering an event. A C3 wallet could be used as a one-to-one-ID system, requiring players to use unique ID's, restricting each player to only one C3 account, and thus allowing C3 to emulate a gaming card that can use with different operators. Online gaming and sports wagering operators have to follow a KYC registration process and request valid ID's to avoid registering those who present fake ID's. C3's unique ID could be a social security number, a driver license number, or a biometric data such as a fingerprint or facial recognition. The IGO may assign one private key to every registrant and a public key to a licensed operator.

While the industry develops a fully interoperable and interactive process for wagers to be received and included in an odds management calculation, a simple version of OMS could act as a central database for creating odds based on a summarized total of wagers, rather than individual wagers received from participating operators to calculate up to date odds that are generated from the aggregate data. The wager information communication and the database maybe kept on a private or a public blockchain that creates updated odds that are reported back to participating operators on a periodic basis. With the new wagering odds sent to operators, they are given the opportunity to change their odds to reduce the risk of sports data analysts, i.e. wise guys taking advantage of their uncompetitive odds by placing wagers and hedging their risks with another operator. The process of aggregating the wagers taken by all participating operators is to create an ecosystem that would make the job of wise guys more difficult to get in between different operators to profit from their odds discrepancies.

The C3 sports wagering integrity database may automatically alert regulators, sports leagues or law enforcement officers when total wagers for an event placed by one person on one or more LBSs exceeds a threshold, thus creating an alarm for match-fixing that may justify further investigations. The threshold amount could have different limits depending on the type of games, the type of events and the volume of wagers. For example, the limit for the final result of an NFL game could be much larger than those set for an NCAA game or a tennis match, or for an in-game wager where patrons can bet during a game as to the outcome of an upcoming event. The capture of wagers and associated data could be performed in real time, i.e. recorded at the time wagers are placed, or they may be posted at a later date, i.e. at the end of each day, in which case the data could be downloaded from an operator's gaming and wagering system and uploaded to the C3 sports wagering integrity database or through a menu by manually inputting the data into the C3 sports wagering integrity database.

IGO servers create C3 wallets when users register and fund their accounts with legal tenders such as US dollar or a verifiable virtual currency. Registered users may log into their wallets over a secure network and select an amount to be placed as a wager on a game. The transfer of funds maybe encrypted end-to-end and may use available technologies such as QR codes, near field communications (NFC) or other methods to transfer funds securely across wired or wireless networks. Moreover, a user or a player need not necessarily be connected to the Internet to use his or her C3 wallet. The placement of a wager or the transfer of C3 funds could happen if a user and a IGO are on the same network, i.e. without the need to be connected to the Internet for transmitting information such as the player's ID, the game ID and the amount of C3 to be transferred from the user's C3 wallet as a wager on a gaming device.

Regulated gaming requires transparency, thus use of Bitcoin and any virtual currencies that are based on anonymity and no central repository source, are not appropriate. Moreover, virtual currencies that are not regulated and are not linked to a person's identity, could have their supplies increase by "miners" and their prices could fluctuate based on supply and demand. Additionally, lack of regulations and an increase in the supply of a virtual currency generally do not meet gaming standards of a highly-regulated jurisdiction. Furthermore, virtual currencies such as Bitcoin, by their nature, operate on decentralized systems and require several confirmations of past transactions. Another drawback of Bitcoin is that each Bitcoin's block confirmation could take an average of 10 minutes. To reasonably ensure validity of a Bitcoin transfer, confirmation of 6 blocks or more are usually required, therefore making a Bitcoin transfer a lengthy process. The fundamental principle behind C3 is that its data associated with transactions stored on private, centralized servers. The issuance and redemption of C3 is performed by licensed and regulated entities, and the conversion rate between C3 and its underlying currency, say U.S. dollars, is conducted at a fixed rate. As an example, a user may convert $100 to 100 units of C3 and similarly may convert back 100 units of C3 to $100, all done at a fixed rate. Another inventive feature of C3 is its data structure and its access rights. The administration of a C3 is performed by an IGO that can issue and redeem the currency as well as validate and ensure its integrity. An IGO's server maintains a sequential record of each wager or transaction associated with a C3 wallet until redeemed for cash or exchanged for other legal tenders. Participating gaming operators, recipients and merchants receiving C3 can verify its validity from the issuing IGO. They can also request an IGO to redeem a C3 in exchange for an authorized legal tender such as cash or another virtual currency. Moreover, a C3's ecosystem and technology process allow a person owning C3 to split it into multiple C3's or merge several C3's into one C3 adding up to the same number of C3 units. All such transactions are cryptographically tracked and stored in a sequential blockchain.

The placement of a C3 wager is made via devices that can communicate the wager to an operator's gaming system. This wagering process may be accomplished by a variety of mediums such as a printed image e.g., a QR code, wired or wireless communications that securely send data to and from a user's device, e.g. a player's smartphone that executes a casino gaming app. It should also be noted that the device the player uses to place a wager, especially in the case of games offered in a land-based casino, may comprise a device owned and administered by the casino. In such cases, a player may securely log into the player's C3 wallet and/or the casino gaming system and/or an IGO using the device with his or her login password, private keys and credentials. Regardless of the software, hardware or the communication protocols used, a player can securely access his or her C3 using a private key administered by IGO, its servers and its database. Similarly, the casino's system that accepts C3 wagers may also be securely connected to one or more IGO servers and to a distributed network of gaming operators and participating merchants.

In one embodiment, when a player places a wager, an IGO server records all the wager information into its central database for recordkeeping purposes, independent of the gaming system that received the wager and established an outcome of the wager. The records kept by IGO servers may include a player ID, a game ID, a session ID, a wager amount, a time of the wager, a game outcome, etc. along with one or more hash totals that is/are generated during the record-storage process. In this way, the IGO server acts as a separate ledger from a ledger kept by a gaming operator in managing their operations. The IGO server maintains historical information related to a wager, such as its outcome, create a more comprehensive accounting report and an audit process that could work across an operator's entire enterprise. An IGO server may act as a subsidiary ledger i.e. a ledger used to keep additional records over and above those currently kept by existing gaming operators. For example, if a C3 wager is made on a slot machine, the slot machine may determine an outcome, and a slot accounting system may record the slot machine's net results and report each gaming transaction to a IGO server, i.e., either detailed information (such as a wager amount and/or a payoff amount), or more general information (such as the net win/loss for each gaming transaction). Similarly, if a wager is placed over the Internet, an online gaming system may keep track of the wagers placed and their outcomes and provide an IGO server with either detailed or general information related to each wagering transaction. And, in the case of live gaming, i.e. those games dealt by a live dealer, such as blackjack, the dealer or some other manual or automated system may determine the wager amounts as well as the game's outcomes and payouts into an intermediary device that is connected to the operator's table gaming accounting system which then provides either detailed or general information about each wager to a IGO server. As an example, if a player wagers $10 at a blackjack table and wins $15, the dealer or an image recognition system combined with a bet recognition system, enters wagers and the win amounts into a device connected to the casino's table game accounting system that tracks the wagers made at the table and, in turn, reports wagering activities to a IGO server. In another embodiment, the IGO server may receive the wagers and their results directly from an intermediary device that receives the player's digital wagers. In general, an IGO server interfaces with a casino's gaming systems to separately record information pertaining to wagers placed by users.

Access to an IGO server and its data could be via a private key or a combination of a public key and one or more private keys. The private keys maybe generated by the server and used as part of the encryption process. The data stored on an IGO server may be encrypted with one or more private keys that provide access to a particular record based on whether the record is related to a gaming or to a non-gaming transaction. As an example, if a casino patron registers with an IGO server and deposits $100 into his or her wallet/account and places a number of wagers during a gaming session, and the patron's balance when leaving the game is $75, the patron's account will show the $100 deposit and a $25 loss during the gaming session, thus leaving a $75 balance. A casino operator or a regulator's access to the database on the other hand, will show all the gaming details of the player, such as the wagers and the related game outcomes, the ID of the game played etc., all time stamped on a chronological order.

One of the main benefits of using C3 is that an IGO server's distributed ledger keeps historical records that allow wagering activities to be tracked across all gaming products and platforms of one or more gaming operators. Another benefit of C3 is that players may use their C3 balances as a virtual currency inside or outside of an operator's resort property. Currently, casino revenues are determined on a game-by-game basis by adding up the net win amounts of each game. C3 allows an operator to calculate its revenues based on the result of all wagers by all patrons across different gaming channels and platforms. The strict regulatory oversight placed on gaming operators provides a level of trust to those who prefer to hold C3 as a virtual currency and use it in commerce to purchase goods and services from merchants or anyone who would accept C3 as a currency. One of the incentives for an entity to accept C3 is savings on charges imposed by banks and credit card providers. Another incentive to accept C3 is the trust placed on an IGO as a service provider and the confidence that one can always have the option to request the issuing operator or IGO to redeem a C3 for cash.

As the central repository source that maintains historical data related to wagers, the IGO server allows various entities, such as casino operators, LBSs or regulators, access to such information and run reports that are not readily available using prior art techniques. For example, a casino operator may request a gaming history of a particular player for a particular period of time across all its games and platforms. As another example, a net win report may be requested by an operator or a regulator for one or more gaming devices, such as one or more slot machines, over a set period of time to identify major deviations from the norm, to monitor a game's historical performance from the expected results and to determine whether the reported net wins is in line with the game's expected hold. With the history of all wagers and their outcomes being recorded on the IGO server, an operator can set up alerts and exception reports to identify unusual gaming activities. Access to the gaming related information and reports may be restricted to certain entities, such as operators and regulators, by assigning one or more private keys that allow such entities permission rights to read such information. However, a private key assigned to a player may only provide access to basic information, such as a C3 funds balance, loyalty points awarded, total wagers and win amounts.

Some of the differences between crypto currencies such, as Bitcoin, and C3 include data formation, distribution and transparency. Bitcoin is an unregulated currency mined by the processing power of computers. However, C3 is regulated and is issued as the result of a casino patron depositing cash into his or her regulated gaming account. All Bitcoin records are kept on a distributed network, while C3's primary records that include gaming-related transactional details are kept on centralized servers and may not include certain information, such as a user's C3 balances or information relating to non-gaming transactions, which are held on a distributed public network. The public network may merely maintain the records that relate to the balance of a C3 holder before and after a transaction. The primary purpose of centralized computing is to comply with gaming regulations and maintaining transparent records for those that have the permission rights to read and download any information related to a C3 account holder, such as the history of a C3 from issuance to redemption.

If a patron holding a C3 wallet decides to make a non-gaming transaction, for example makes a $30 purchase from merchant A who already has an account with an IGO server, the $30 transfer gets recorded as a non-gaming transaction and the patron's C3 balance is reduced by $30, while merchant A's balance is increased by $30. Similarly, if merchant A pays merchant B with C3 funds, the payment is recorded and time stamped as a non-gaming transaction on an IGO server, and the account balance of A is debited while the account balance of merchant B is credited. At any point of time, anyone that has C3 can request redemption, i.e., request legal tender in exchange for C3 currency or an alternative approved virtual currency, from an operator or an IGO server. With all C3 transactions being recorded in blocks, time stamped and maintained in a storage device or system, any transfer or redemption of C3 funds will be almost instant, as these transactions are not verified using a plurality of networked computers, such as in a Bitcoin network, thus creating a major advantage over a decentralized virtual currencies such as Bitcoin which requires verifications through solving complicated puzzles that could take some time to be verified.

In summary, C3 is a programmable fiat money i.e. a unit of currency such as a dollar, that may be associated with a single player, where gaming and non-gaming transactions involving C3 are recorded in private and public ledgers associated with an IGO. Using C3, the current labor-intensive practice of converting cash into chips at a table and converting chips back into cash at the casino's cage, as well as replacing TITO vouchers used in slot machines, is avoided. Use of C3 also allows interoperability between different gaming platforms, such as table games (such as poker, Blackjack, roulette, craps, etc.), on-site mechanical games (such as slot machines, video poker machines, etc.) and online gaming systems (such as online poker, craps, roulette, blackjack, etc.) of a casino, allowing players to purchase and redeem a crypto currency at a table game, a mechanical game, or online, as well as allowing non-gaming transactions. When making a wager on a casino game, a patron may use C3 to place wagers and receive payouts if the wagers result in wins. Embodiments of the invention comprise a method for players to deposit cash into a holding account maintained by a regulated IGO, together with a process and protocol for administering a digital wallet for wagering on a casino's table game, slot machine or on an online game. Due to C3's digital format, the system could allow an electronic token or image to be created and applied as a wager on a table game such as a blackjack. Similarly, a digital token can be transferred into slot machines or used in a casino resort's physical retail stores and restaurants.

The use of the term Casino Crypto Currency (C3) herein refers to a digital currency used by gaming operators and associated non-gaming merchants to allow wagering and non-gaming purchases. Each transaction between a user and a gaming operator or a non-gaming merchant is verified by a public, distributed network, i.e., using blockchain technology. However, details of wagering transactions are not exposed to the public blockchain. C3 may be "held" by users in a crypto wallet after purchasing C3 using traditional currency or credit.

Figure 5:
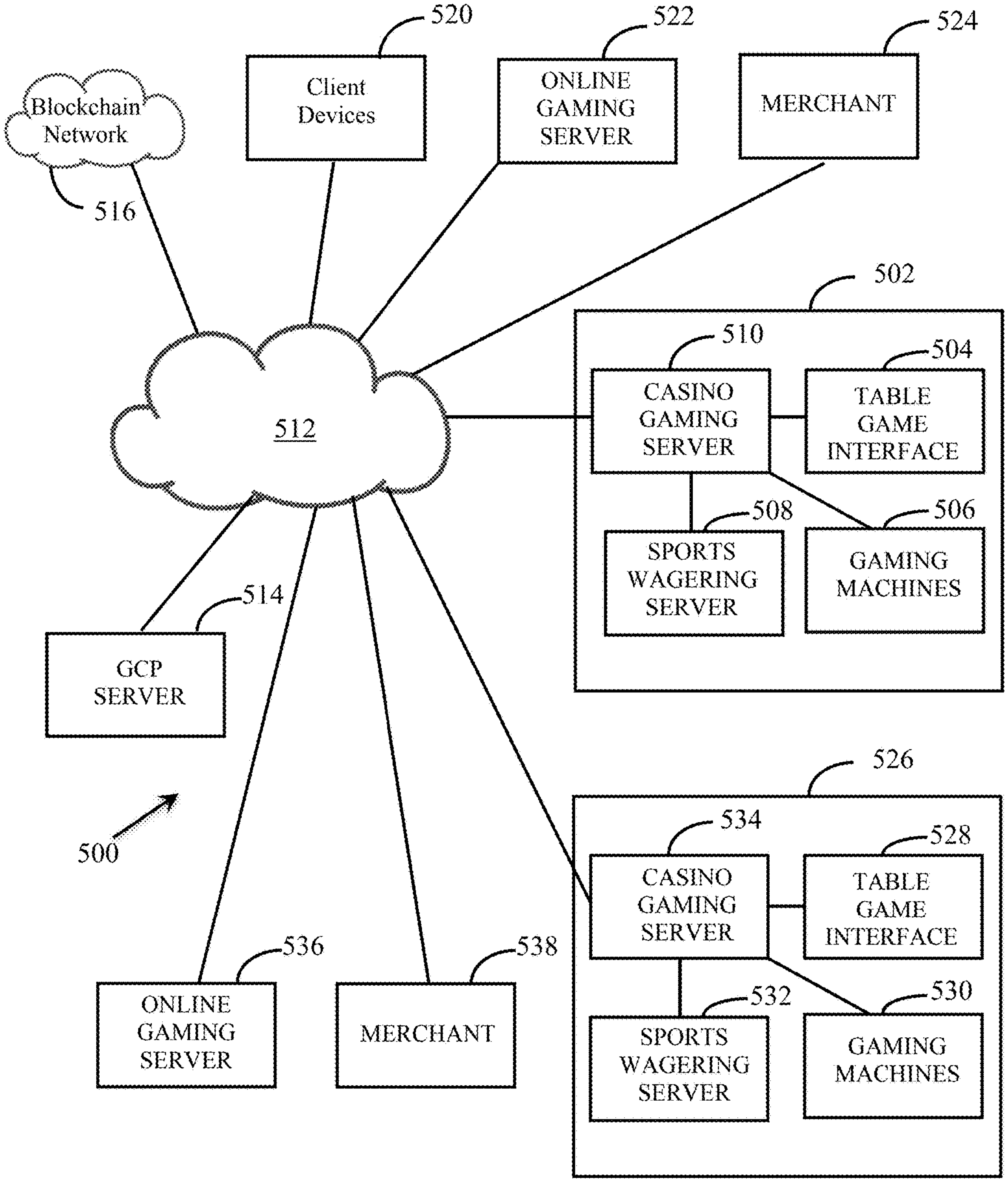
FIG. 5 illustrates one embodiment of a gaming network using C3.

FIG. 5 is an overall block diagram of a system 500 that uses C3 to allow gaming and non-gaming transactions. The system 500 comprises gaming operator systems 502 and 526, for example, casinos, that offers various gaming platforms to its patrons, such as table games via a table game interface 504/528, electronic gaming via gaming machines 506/530 and sports betting via a sports betting server 508/532. Each of the platforms may communicate with a respective casino gaming server 510/534 that manages some or all of the functionality of the various gaming platforms. Casino gaming servers 510/534 may also manage patron loyalty rewards as patrons place wagers on the various gaming platforms.

In this embodiment, both casino gaming server 510 and 534 are coupled to a wide-area network 512, such as the Internet, for communicating with an IGO server 514 and, in some embodiments, gaming operator system 502 comprises an online gaming server 522 and gaming operator system 526 comprises online gaming server 536. In other embodiments, a gaming operator system's online gaming platform is coupled directly to IGO server 514 via wide-area network 512. While only two gaming operator systems are shown in FIG. 5, it should be understood that in reality, multiple operator systems are present in system 500, each coupled to IGO server 514. Each online gaming server may additionally be associated with one or more merchants, such as hotels, spas, restaurants, bars, shops, etc. The merchants may be physically located on a gaming operator site, such as within a casino, or off-site. Each transaction platform of gaming operator system 502 (i.e., the table game interface, gaming machines, sports wagering server, online gaming or merchants) accepts a particular C3 that is only redeemable on one of the transaction platforms of gaming operator system 502, while each transaction platform of gaming operator system 526 accepts a different C3 that is only redeemable on one of the transaction platforms of gaming operator system 526.

IGO server 514 receives transaction information pertaining to gaming and non-gaming transactions from the transaction platforms of gaming operator systems 502 and 526. Upon receiving transaction information, IGO server 514 creates "crypto-blocks" for use in tracking transactions reported by the transaction platforms. The crypto-blocks are stored in blockchain network 516, which may comprise a commercially available blockchain management system, such as an IBM Blockchain Platform provided by International Business Machines of Armonk, New York.

Client device 520 may be used to purchase and/or redeem C3, to play online wagering games conducted by online gaming server 522, or to participate in any of the table games, gaming machines, or sports wagering offered by gaming operator system 502 or 526. Client device 520 may comprise a smart phone, tablet computer, wearable device, or some other personal computing device, executing a software application that provides an interface to a user for conducting transactions with any of the transaction platforms.

Online gaming servers 522 and 536 may be owned and/or operated by gaming operator systems 502 and 526, respectively, and may be located outside of a premises of a gaming operator system, as shown, or in other embodiments, inside the premises of a gaming operator system. The online gaming servers may each offer online games such as blackjack, various forms of poker, electronic roulette, craps, slots, sports betting, and/or virtually any game that permits wagering to occur. Players may access the gaming servers via their client devices or via any computing device capable of network communications with the gaming servers.

Table gaming interface 504/528 comprises an electronic interface to one or more different casino wagering games, such as blackjack, craps, roulette, and poker. Such an electronic interface may comprise a wireless player interface, such as Bluetooth, for communicating with one or more players' client devices at one of the wagering games to receive wagers and to provide game outcomes and payouts. Players may interact with a wagering game using their client device 520, which may allow a player to wager a certain amount of C3 available to a player after the player has purchased C3 from a gaming system operator.

Gaming machines 506/530 may comprise any electronic wagering game, such as slots, video poker, video roulette, or any number of specialized electronic gaming machines, such as Wheel of Fortune®, Super Mystery Bingo, etc. The gaming machines may comprise a wireless player interface, such as Bluetooth, for communicating with a player's client device in order to receive wagers and to provide game payouts using a C3 particular to the gaming operator system where the gaming machine is located.

Sports wagering servers 508/532 comprise a computer server executing processor-executable instructions for providing sports-related wagering on a plurality of sporting events, such as football games, baseball games, horse racing, etc. Typically, a player accesses a sports wagering server via a player's client device, but in other embodiments, a gaming operator system may provide customized electronic interfaces on-site for allowing players to place wagers on various sporting activities. Wagers are placed using a player's C3 particular to the gaming operator system associated with the particular sports wagering server.

In any of the above examples, each time that a wager is placed, or an outcome is determined, at a table game interface, a gaming machine, or via a sports wagering server, transaction information is generated and provided to casino gaming server 510/534. The transaction information is used by various systems of a gaming operator to track wagering, such as an accounting system that tracks player account balances of C3, a database system for storing historical gaming information for gaming regulators, and a player rewards system that provides players with rewards to players for prolonged game play at a particular gaming operator site. The transaction information is also forwarded to IGO server 514 by casino gaming server 510/534.

Figure 6:
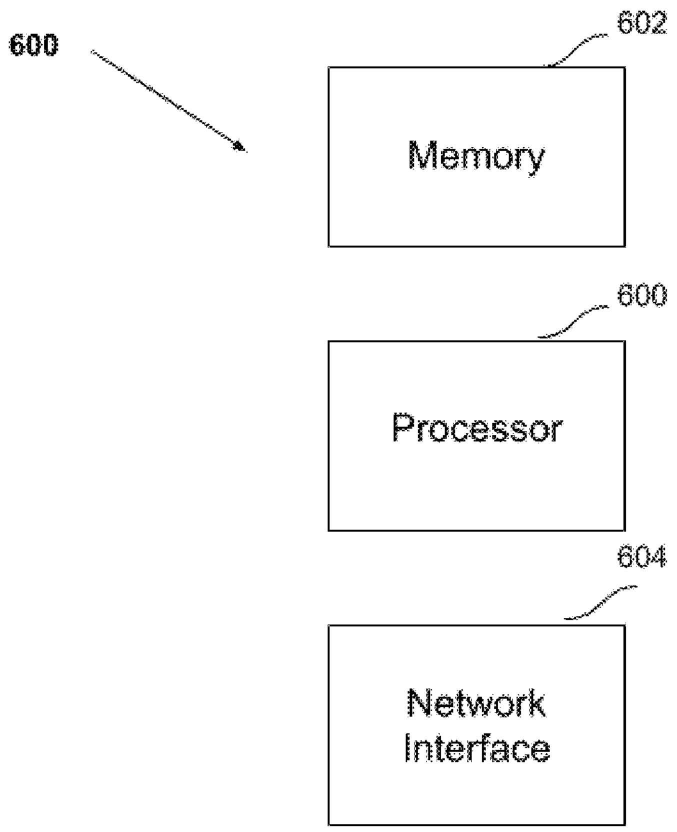
FIG. 6 illustrates a functional block diagram of one embodiment of a gaming sever used in the gaming network of FIG. 5.

FIG. 6 illustrates a functional block diagram of one embodiment of IGO server 514. Specifically, FIG. 6 shows processor 600, memory 602, and network interface 604. It should be understood that the functional blocks shown in FIG. 6 may be connected to each other in a variety of ways, and for purposes of clarity, not all functional blocks necessary for operation of IGO 514 are shown (such as a power supply). Processor 600 is configured to provide general operation of IGO 514 by executing processor-executable instructions stored in memory 602, for example, executable code. Processor 600 is typically a general-purpose processor, such as any one of a number of Pentium® class microprocessors manufactured by Intel Corporation of Santa Clara, California. Memory 602 comprises one or more information storage devices, such as RAM, ROM, flash memory, or virtually any other type of memory device. Memory 602 is used to store the processor-executable instructions for operation of IGO 514 as well as any information used by processor 600, such cryptographic keys for creating and deciphering crypto-blocks, user account information, gaming operator account information, and merchant account information.

Figure 7:
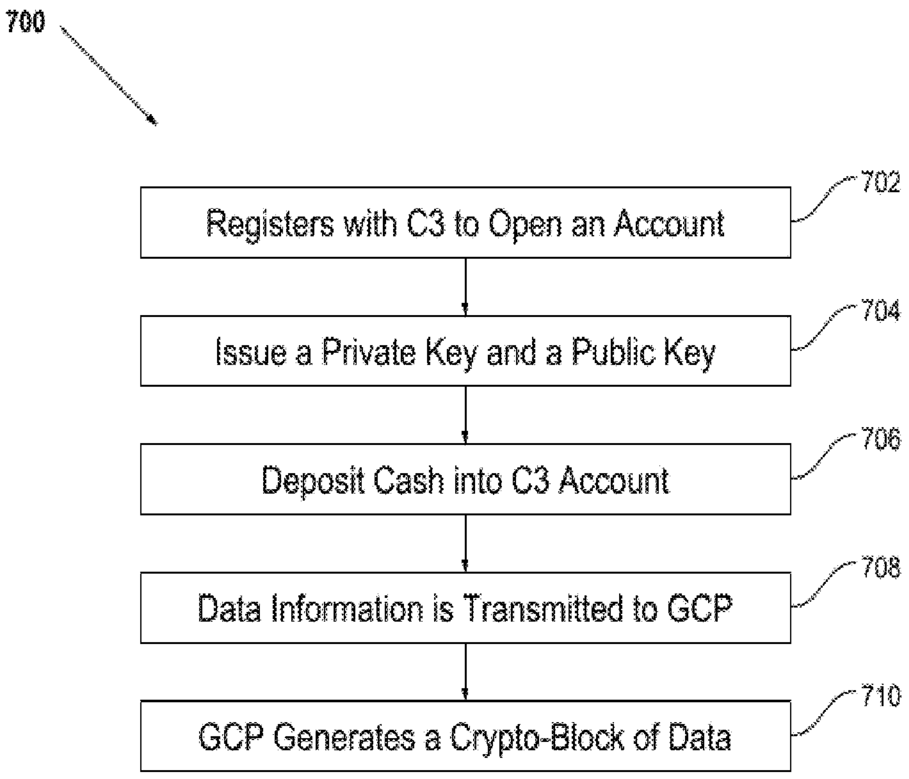
FIG. 7 is a flow diagram illustrating one embodiment of a method for a user opening a C3 account with an IGO for placing wagers on games, sporting events and make non-gaming purchases.

FIG. 7 represents an embodiment of a registration and login process by a user to open an account with IGO 514. At 702 a user registers with IGO 514 at physical location of an operator gaming system, or at some other designated physical location. Depending on the rules and regulations of the jurisdiction, the user might have to be physically present at the time of sign up and be required to show proof of ID such as driver's license or passport. In one embodiment, IGO 414 creates a primary account and associates one or more sub-accounts with the primary account, each sub-account associated with a particular gaming operator system that uses a particular C3, in one embodiment, different than other gaming operator systems. Generally, IGO server 514 stores a username and password provided by the user as login credentials for subsequent access to the user's account(s).

At 704, IGO 514 may issue a private encryption key and a public encryption key to the user for later use by the user to decrypt past transaction information that has been received and encrypted by IGO server 514 using the user's public key. The public key may be stored in memory 602 by processor 600.

At 706, the user funds the account(s), either while at the designated place for opening a new account as described above (or at some other time), or online via the user's client device 520. In either case, the user provides funds in the form of currency to a gaming operator and, in exchange, the gaming operator issues an amount of C3 to the user in accordance with an exchange rate set by the gaming operator. The casino gaming server 510/534 may perform this transaction, or some other server associated with the gaming operator.

At 708, information related to the transaction is provided to IGO server 514 via wide-area network 512 as transaction information. The transaction information typically comprises at least a user Id that identifies the user, such as a driver's license number, social security number, etc., that was previously verified by the gaming operator during the account setup process, a gaming operator ID that identifies a particular gaming operator, i.e., casino, that has provided C3 to the user, a transaction type, such as "deposit" or "withdrawal", and a transaction amount equal to the amount of currency deposited or withdrawn.

At 710, the IGO server 514 receives the transaction amount, and in response, generates a crypto-block from the transaction information and, in one embodiment, a cryptographic key associated with the user.

Figure 8:
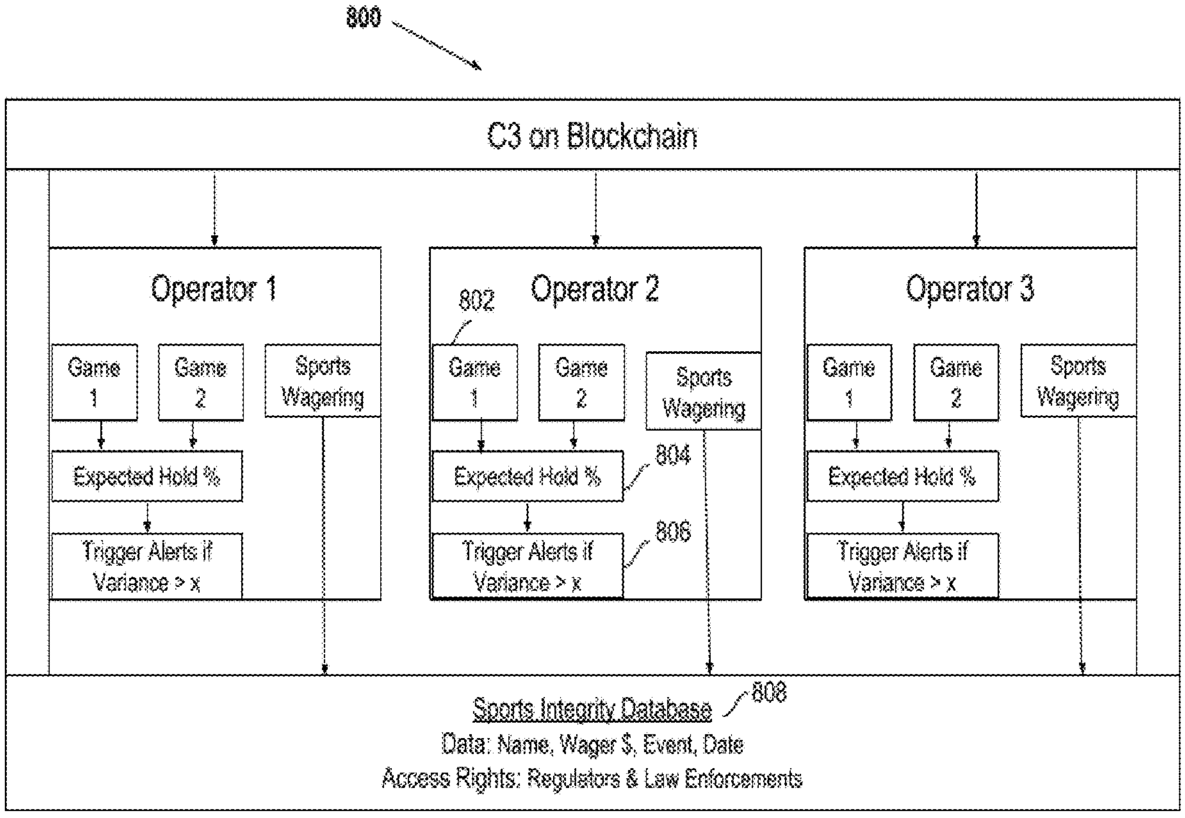
FIG. 8 illustrates one embodiment of a method for setting up automatic alerts for a game when its results and outcomes exceeds certain results.

FIG. 8 illustrates one embodiment of a method used by a gaming operator to set up automatic alerts 806 based on expected hold percentages 804 for games 802 offered by gaming operators, such as table games, slots, sports wagering and online games. IGO server 514 tracks and records each wager by creating crypto-blocks and storing the crypto-blocks on blockchain network 516, enabling gaming operators to create gaming-related reports and alerts. Block 800 of FIG. 8 illustrates a process for a gaming operator 502/526 to use the data stored on blockchain 516 for sending automatic alerts 806 to its casino managers concerning an unusual activity such as game hold percentage 802 deviating from an expected hold percentage 804 for table games managed by table game interface 504/528, or electronic games, by a predetermined percentage established by the operator or a regulator. The alert could be based on the historical results of a game or the historical play of one or more players for a period of time. As an example, if the hold percentage of a blackjack table or a slot machine is substantially below the expected hold percentage and the anomaly is traced to be associated with a high win by a player, the variance may suggest collusion, fraud or a malfunction.

FIG. 9 represents an embodiment of an IGO crypto-block structure and the permission rights associated with various persons and entities. The Database 902 includes encrypted data with one or more hash keys for data records for each player and wager's history such as Player ID, Player's C3 balance time stamped, the ID of the games played by the player, the wagers made by the player time stamped, game outcome e.g. win or loss, the win and loss amount for each game session, loyalty point balance time stamped, loyalty points awarded for each wager, non-gaming merchant ID and C3 transfers to non-gaming merchants. Access to each record is in accordance with pre-assigned Permission Rights 904, for example, each player is given the rights to access his or her C3 balance, win or loss for a gaming session, loyalty points balance and loyalty points awarded for each gaming session as well as C3 transfers made to a non-gaming merchant for purchase of goods and services. It should be noted that the data kept on blockchain 516 is archived according to regulators and statutory data retention requirements. As an example, a player may use his private key and a smartphone that has a C3 gaming app to access the player's encrypted data on blockchain network 516 to get information on his C3 balance or to make a purchase from a merchant that is authorized to accept a particular C3 currency. Using a computer that is connected to IGO 514 and a private key, the operator or a regulator gets full access to all crypto-blocks stored on blockchain network 516 and detailed reports about the activities of each player.

Figure 10:
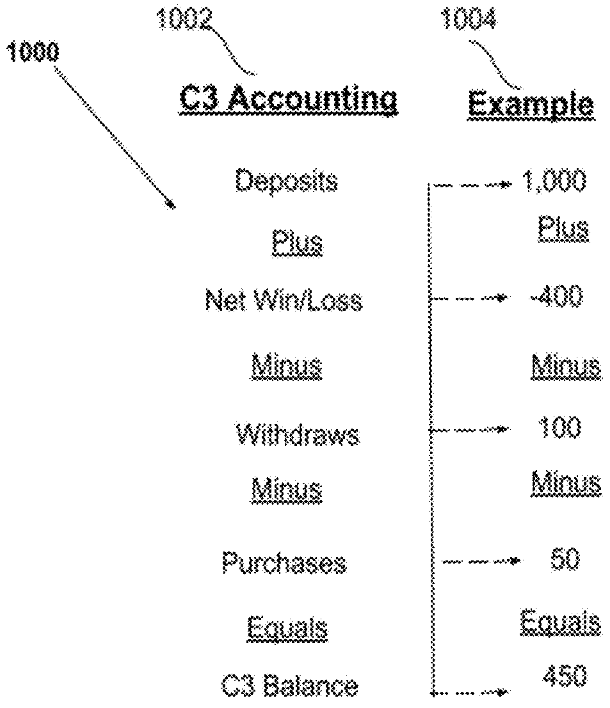
FIG. 10 presents an illustration and an example for C3 as illustrated in FIG. 5 for record keeping proposes between various stakeholders.

FIG. 10 illustrates one embodiment of Accounting 1002, a process for associating deposits made by a player to a gaming operator, and wagers made by the player using client device 520. At 1004, the player uses his client device 520 that has a C3 gaming app that shows 1000 C3 Units. The player approaches a slot machine and connects to the slot machine with client device 520 using NFC, Bluetooth, or some other near-field wireless technology, to place a $10 wager at the machine or may make a C3 transfer to the machine's meters prior to commencing a gaming session at the machine. At any point of time, a player's C3 balance maybe associated to a deposit by the player or a credit such as a gaming win. The association may be done using various methods such LIFO (Last In First Out) or FIFO (First In First Out). Regardless of which methodology is used, it is important it is used consistently throughout the process of storing and retrieving the C3 data, which is time stamped upon creation of crypto-blocks by IGO 514.

At example 1004, if a player makes three deposits to his C3 account, one for $200, followed by a $500 and then a $300 to give him a balance of 1,000 in C3 Units before playing twenty rounds of play at the slot machine, and at the time he quits the game his loss during the session was 400, which was then followed by a $100 withdrawal at the casino's cage and a transfer of 50 in C3 Units to a merchant that accepts the particular C3 in the player's account, then the player's C3 balance after all these transactions is reduced by 550 Units from 1,000 to 450. The player's remaining 450 C3 Units may get associated on a LIFO basis to his three deposits and his net win or loss. In Example 1004, the 450 C3 balance represents the last $300 deposit made by the player plus $150 out the $500 deposit made prior to the last deposit. The 50 C3 Units, the 100 withdrawal and 200 of the gaming loss get associated with the $500 deposit and the remaining 200 gaming loss gets associated with the initial $200 deposit. The player's app will give the player access to the crypto-blocks that are pertinent to the player's game session with the slot machine and his non-gaming activities, i.e. the C3 balance of 1000 before starting the game, the net loss of 400 when leaving the game, the 100 Units withdrawal and the 50 Units transfer to the merchant for a purchase. However, the operator or the regulator can access all the data and records of the player, such as the amount of each wager, the game ID, the results of each wager, etc. all time stamped. Since the IGO server 514 associates each wager to a player's deposit or a net win, the present invention enables a casino operator to have full access to all its gaming activities and provides a more comprehensive "net win" calculation than the current systems available to the industry such as slot accounting systems, which track the net win on a slot-by-slot basis by deducting total wagers less total payouts. Similarly, it can replace the net win calculation for table games, which is done on table-by-table basis for each shift based on net change in chips inventory adjusted for drops, fills and markers, etc.

Figure 11:
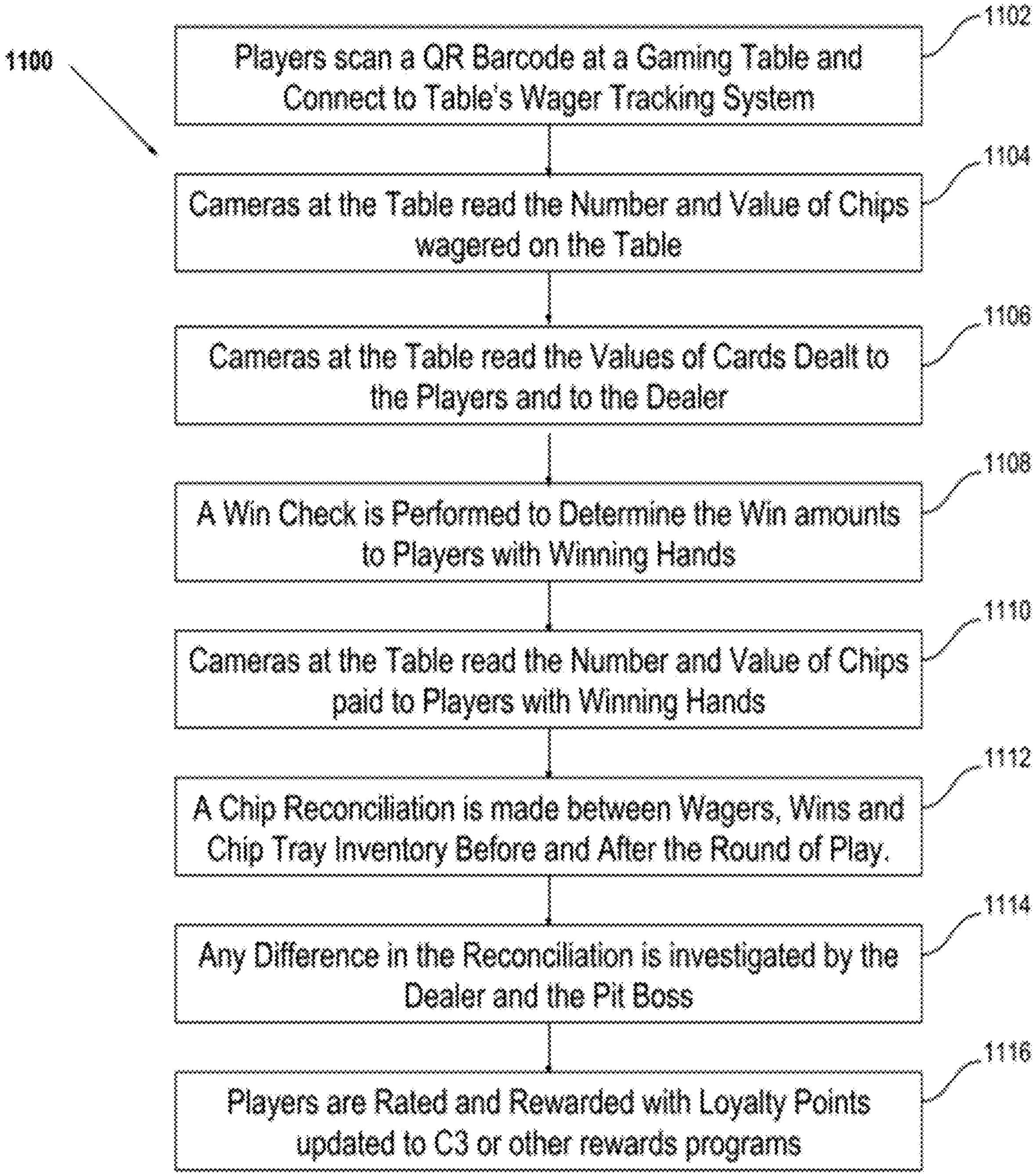
FIG. 11 is a flow diagram illustrating an embodiment of a gaming table with cameras recognizing the value of chips and value of cards dealt at the table as well as rewarding and rating players at the table.

FIG. 11 is an illustration of an embodiment of a table game where a player makes a wager using traditional casino chips. At 1102, the player might use his or her client device 520 to scan a QR barcode or go to a website or an App to connect to table game interface 504 associated with a particular table game, such as blackjack. At 1104, cameras read the number and denomination of the chips wagered by each player at the table. At 1106, cameras read the number and value of cards dealt to the players and the dealer. At 1108, a win check is performed to determine the win amounts to be paid to each player who have a winning or push hand. At 1110, cameras at the table read the value of the chips paid to each player with a winning or push hand. At 1112, the table game interface 504 performs a reconciliation between the total value of the chips in the chip tray before the round of play started, the total wagers made at the table, the total win amounts paid to the players with winning hands as well as the ending inventory of the chip tray after the round of play is finished. At 1114, any difference in the reconciliation is reported and investigated by the dealer or the pit boss, and at 1116, table game interface 504 rewards players with loyalty points according to the bets they made which may be reported to IGO 514 and stored as a crypto-block on blockchain network 516 or other loyalty rewards system. The system may also rate the player based on wagers and win amounts, which may be recorded in IGO server 514 and may only be visible to the gaming operator.

Figure 12:
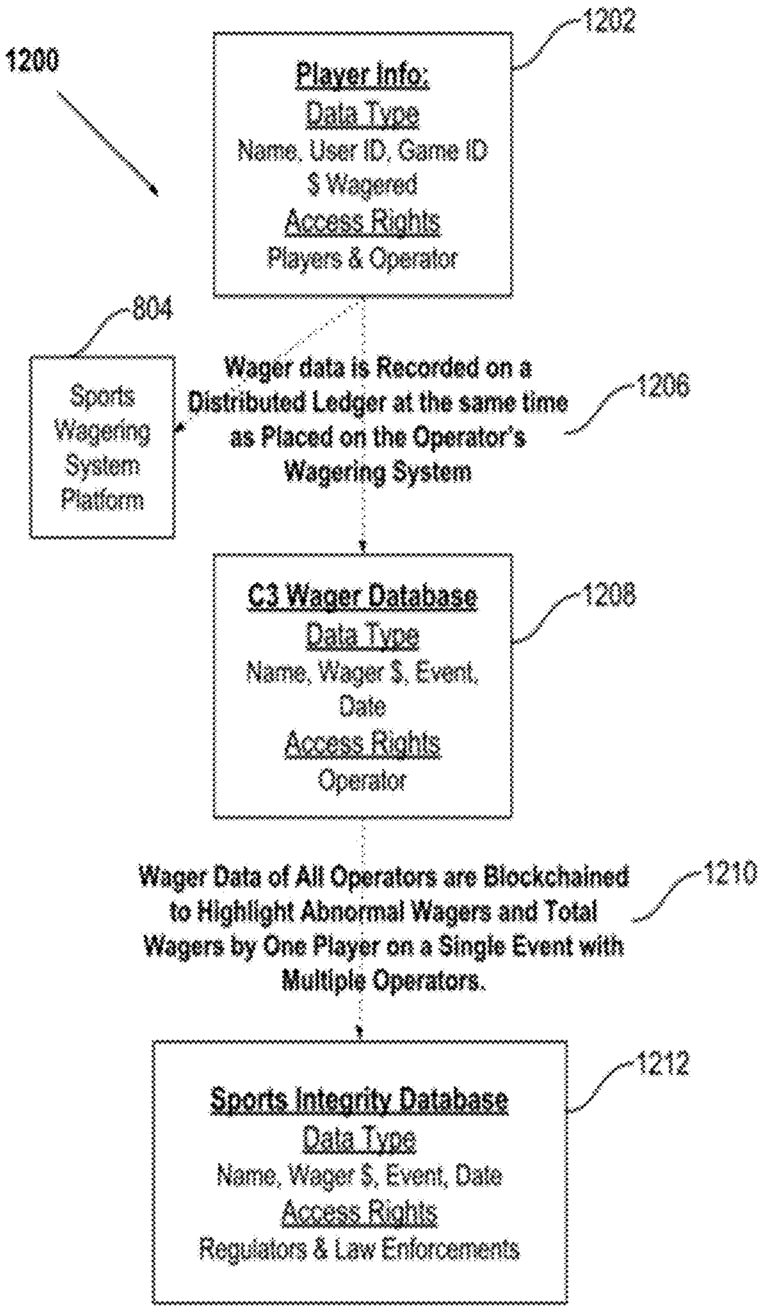
FIG. 12 is an illustration of an embodiment for sports wagering operators to enter into IGO's C3 database large and suspicious wagers and criteria to alert regulators and law enforcement agencies.

FIG. 12 is one embodiment of a sports wagering integrity database architecture whereby sportsbook operators enter or upload large or suspicious wagers into IGO server 514. At 1202, a gaming operator provides details of a wager placed by a player, such as the player's ID, the wager amount and the gaming operator ID, and a game or event ID that identifies the particular sporting event that was wagered on. In another embodiment, the player uses a C3 wallet to place a wager on sports wagering server 510, which is recorded by IGO server 514 as shown in step 1206. Step 1208 highlights the type of data that is stored on the blockchain network 516 by IGO server 514, which includes at minimum the following information: Player ID, Event ID, Event date, $ amount wagered, etc. Such data is only made available to the gaming operator that player used to place his wager. At 1210, wager data from all gaming operators are compared to highlight abnormal wagers such as identifying players who wager large amounts with different operators for the same event or wagers on both sides of an event or a pattern of such wagers by different players that might be colluding with each other.

Figure 13A:
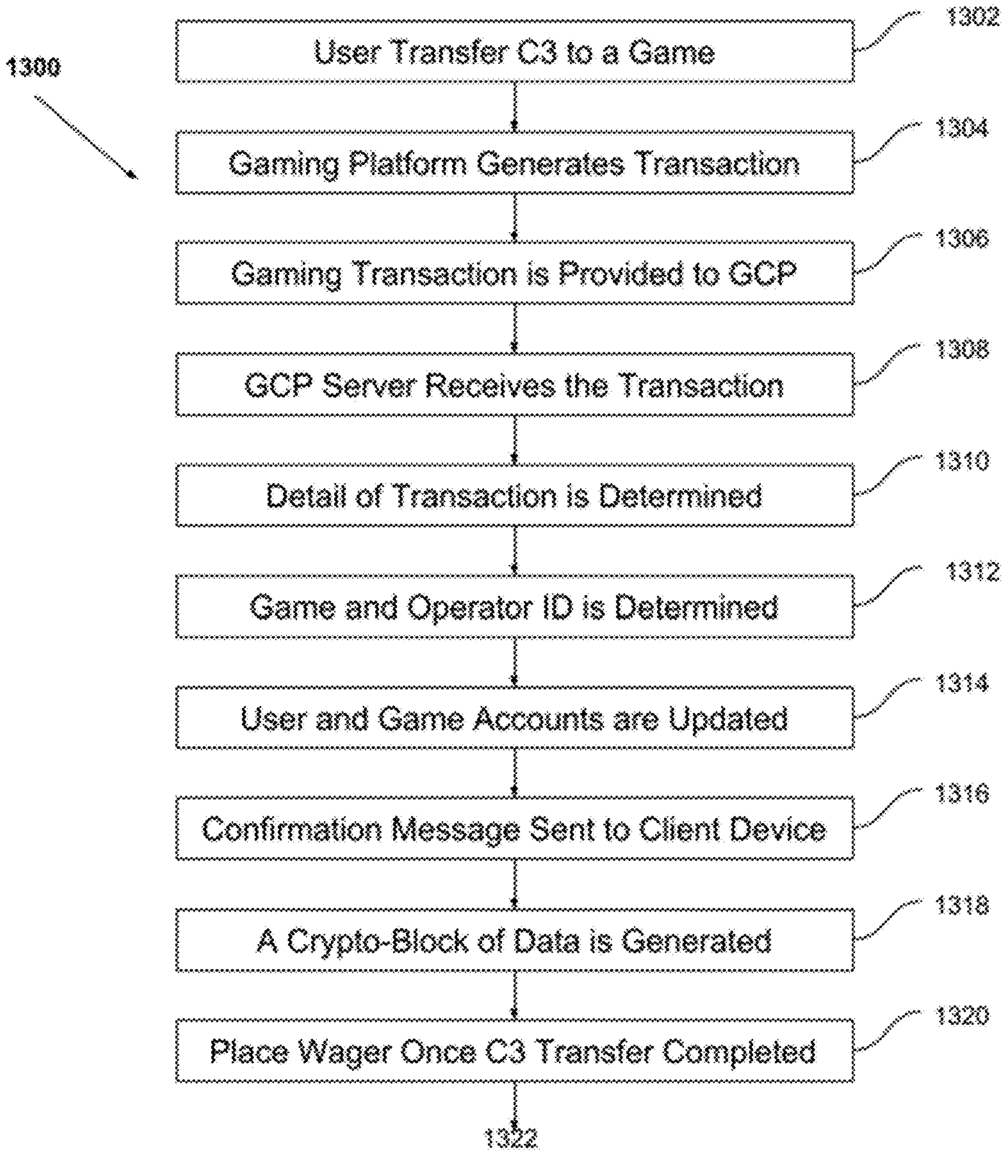
FIGS. 13A, 13B, and 13C are a flow diagram of one embodiment of a method, performed by the IGO server as shown in FIGS. 5 and 6, to manage transactions that occur on platforms owned or operated by different gaming operator systems.
Figure 13B:
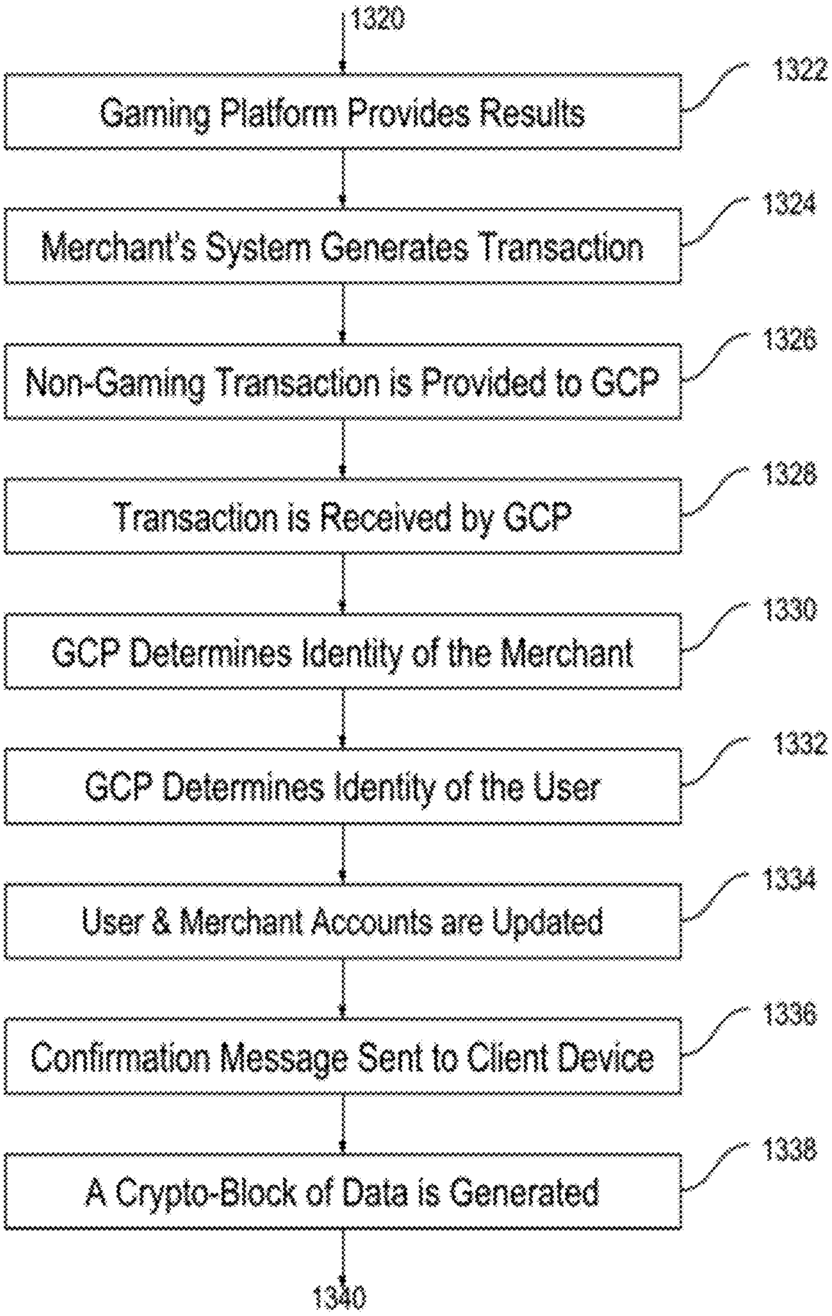
Figure 13C:
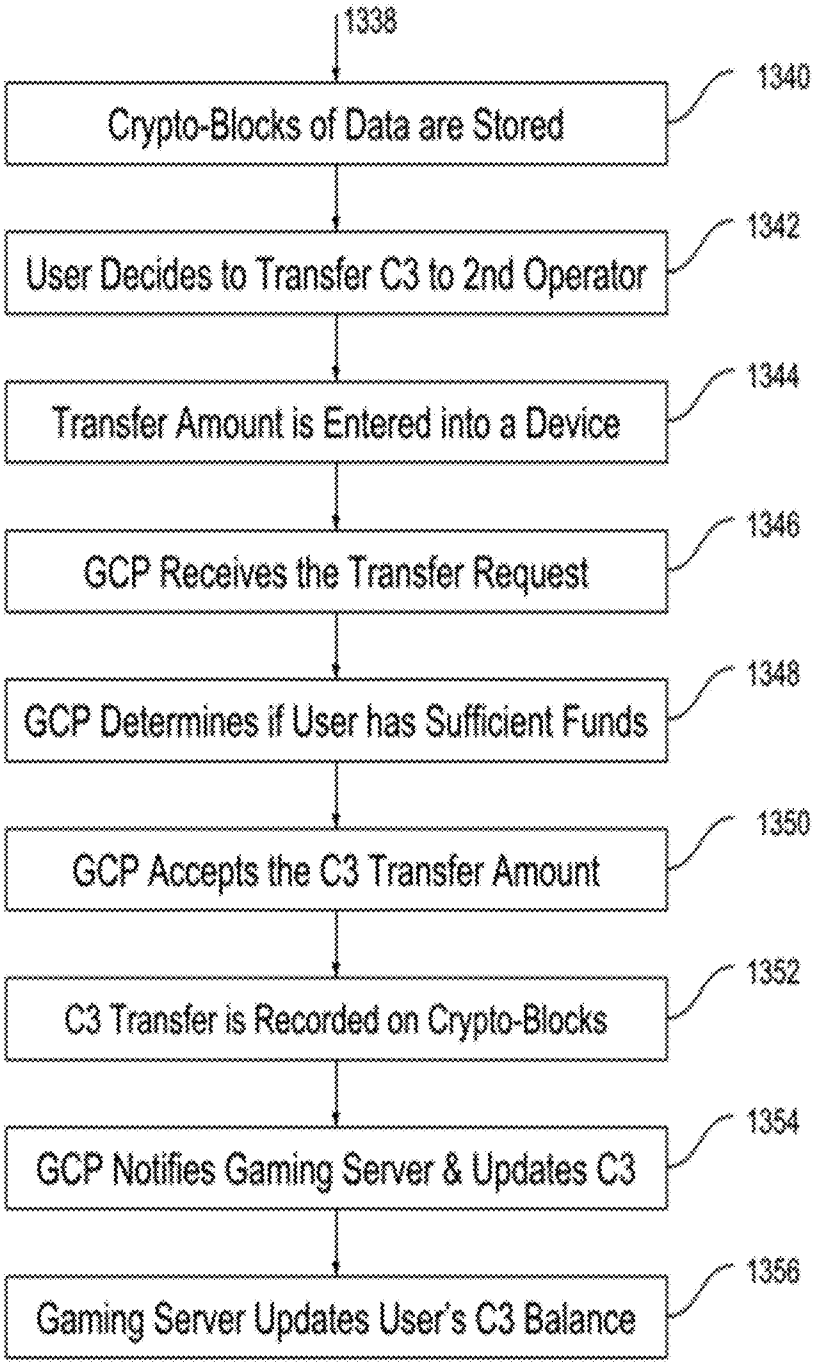

FIGS. 13A, 13B, and 13C are a flow diagram of one embodiment of a method, performed by IGO server 514, to manage transactions that occur on platforms owned or operated by different gaming operator systems. It is assumed that a person has already opened a primary account with IGO server 514, the primary account comprising at least two sub-accounts, each sub-account associated with a particular gaming operator system and a respective C3. It is also assumed that the person has funded at least one of the sub-accounts, i.e., has provided real or electronic currency to a gaming system operator in exchange for a certain amount of the gaming system operator's C3. It should be understood that the steps described in this method could be performed in an order other than what is shown and discussed, and that some minor steps may have been omitted.

At block 1300, the person may desire to place a wager on a particular gaming platform belonging to a first gaming operator system 502 associated with a first sub-account managed by IGO server 514. The gaming platform may comprise a table game, such as poker, craps, roulette, blackjack, etc. that interfaces with casino gaming server 510 via table game interface 504, a gaming machine 506, a sports wagering platform utilizing sports wagering server 508, or an online platform that utilizes online gaming server 522. In any case, the person launches a software application resident on the person's client device 520 that provides a wagering interface to any of the aforementioned gaming platforms, as well as a non-wagering interface to purchase goods or services associated with the first gaming operator system 502, i.e., accepts a first C3 issued by first gaming operator system 502 as a result of the person providing currency to a first gaming system operator associated with first gaming operator system 502.

At block 1302, the person may choose how much C3 to transfer to the table game interface 504, gaming machine 506 or sports wagering server 508 to fund one or more wagers, and provide an indication to one of the gaming platforms of such a C3 transfer by simply bringing client device 520 in proximity to a gaming platform, or some other electronic gaming terminal associated with one of the platforms. The transfer amount, as well as other information, such as a user ID or account number that uniquely identifies the person, is received by one of the platforms using techniques well known in the art, such as via wireless communication technology or scanning techniques.

At block 1304, the particular gaming platform generates gaming transaction information for recording the C3 transfer by IGO server 514, as well as, in some embodiments, casino gaming server 510. The gaming transaction information may comprise one or more of the user ID, the C3 transfer amount, an indication of the type of C3 used (i.e., C3 associated with gaming operator system 502, 526, etc.), an indication whether the amount is a debit or a credit, a transaction type (i.e., account funding, transfer, wager, wager outcome, gaming transaction, nongaming transaction, etc.), a merchant/gaming operator ID that identifies a gaming operator associated with the gaming transaction, and a game or event ID that identifies a particular gaming table, gaming machine, or sports wagering server that received the C3 transfer. The game/event ID may additionally comprise a game type (i.e., blackjack, craps, video poker). The gaming transaction information may also comprise a date and a time that the C3 transfer instruction was received.

At block 1306, the gaming transaction information is provided to IGO server 514, to casino gaming server 510, or both. In the case that the gaming transaction information is provided only to casino gaming server 510, casino gaming server 510 forwards the gaming transaction information, or at least some of the information in the gaming transaction information, to IGO server 514.

At block 1308, IGO server 514 receives the gaming transaction information via network interface 604 and provides the gaming transaction information to processor 600.

At block 1310, processor 600 determines an account that the gaming transaction information is associated with. Processor 600 typically determines this by evaluating the user ID found in the gaming transaction information and comparing the user ID to a plurality of user IDs stored in memory 602 to identify an account number belonging to the person.

At block 1312, processor 600 identifies a sub-account associated with the person associated with the gaming transaction information by evaluating the type of C3 identified in the gaming transaction information, or by evaluating a merchant/gaming operator ID in the gaming transaction information.

At block 1314, processor 600 debits or credits the sub-account associated with the type of C3 in the gaming transaction information. In this example, a balance associated with a first sub-account is debited an amount equal to the transaction amount in the gaming transaction information.

At block 1316, processor 600 may generate and send a confirmation message directly to the client device 520, indicating that the person's account balance associated with the first sub-account has been reduced by the transaction amount.

At block 1318, processor 600 may generate at least one crypto-block from at least some of the gaming transaction information. Because this crypto-block(s) are accessible to the person who placed a wager, not all of the information in the transaction information is encrypted and stored in the crypto-block. For example, the transaction information for a wager may include things like an identification of a gaming table or machine, a payoff percentage, or some other information that might be useful to a gaming operator, but undesirable for a person to view. Thus, only a portion of the transaction information for a gaming-related transaction may be stored in a crypto-block. The crypto-block comprises the portion of data from the transaction information, cryptographically-encoded using a cryptographic key associated with the person. The cryptographic key may comprise a public, or private, cryptographic key that is assigned by processor 600 to the person during account setup and stored within memory 602 in association with the person or the person's account and/or sub-accounts. In one embodiment, a public key and associated private key is generated by processor 600, and then the public key is provided to the person, while the private key is stored in memory 602 in association with the user. The private key is then used by processor 600 to generate crypto-blocks accessible to the person, but not accessible to any gaming operator or even to gaming regulators.

In one embodiment, different portions of the transaction information are stored in a crypto-block, depending on whether the transaction comprises a wagering transaction vs. a non-wagering transaction. For example, when processor 600 determines that transaction information comprises information related to a wager, processor 600 may encrypt only some of the transaction information, such as user ID, gamy type, wager amount, game result, and payoff result. Other information, such as a gaming operator ID, platform ID, or payout statistics, may not be included in the crypto-block, because the person who placed the wager has no use for such information. When processor 600 determines that a non-wagering transaction has occurred, processor 600 may encrypt different portions, or all of the transaction information.

In one embodiment, three different crypto-blocks are generated for each gaming transaction information received. Each of the three crypto-blocks are generated using a different cryptographic key, and each key is associated with a respective person or entity. For example, in this embodiment, processor 600 generates a first crypto-block associated with the person who initiated the gaming transaction, as described above. A second crypto-block is generated using a second key pair associated with a particular merchant or gaming operator as identified in the wagering transaction information, i.e., via the merchant/gaming operator ID. Here, in on embodiment, processor 600 generates a public key and a private key for a particular gaming operator or merchant, and the public key is provided to the gaming operator/merchant, while the private key is stored in memory 602 in association with the particular gaming operator/merchant. This key generation may occur during an account setup process for the merchant/gaming operator. The second crypto-block is generated by encrypting another portion, or all, of the transaction information using the gaming operator/merchant's private key, which may include data not meant to be viewed by the person who placed the wager. A third crypto-block is similarly generated using a third key pair associated with a gaming regulator, where all of the information in the transaction information is encrypted using the regulator's private key. The person may access any crypto-blocks generated by IGO server 514 and associated with the person by providing the person's public key to IGO server 514 at a later time using the software application on the person's client device 520. A merchant, or gaming operator, may access and decrypt any crypto-blocks that were generated by IGO server 514 and associated with a particular merchant or gaming operator by providing the gaming operator/merchant's public key to IGO server 514.

The gaming regulator may access and decrypt any crypto-blocks generated by IGO server 514 and associated with the gaming regulator by providing the gaming regulator's reciprocal key to IGO server 514 at some later time (the gaming regulator's key pair generated during an account setup process for the gaming regulator, similar to the setup described to create an account for a merchant or gaming operator).

At block 1318, processor 600 provides the one or more crypto-blocks to network interface 604 for storing the block(s) on blockchain network 516. In another embodiment where three crypto-blocks are generated as described above, each crypto block is stored in memory 602 in association with the person or entity to which the crypto block was generated for. For example, the first crypto-block described above would be stored in memory 602 in association with the person, person's account, or person's sub-account associated with the gaming transaction information. The second crypto-block would be stored in memory 602 in association with the merchant or gaming operator identified in the gaming transaction information. The third crypto-block would be stored in memory 602 in association with the gaming regulator.

At block 1320, after the person has transferred an amount of C3 particular to a gaming operator system to a particular gaming platform, the person may place a wager using the gaming platform itself, i.e., place a wager at a blackjack table, place a wager using a slot machine user interface, place a wager using a video poker user interface, etc., or otherwise placing a wager via the software application running on the person's client device.

At block 1322, the gaming platform generates wagering transaction information indicative of the wager that was placed, i.e., comprising a wager amount (in the particular C3 that is valid on the gaming platform), In either case the wagering transaction information at this block comprises some or all of the information described above with respect the wagering transaction information during transfer of C3 from the person to the gaming platform. The wagering transaction information is sent to IGO server 514 and processed as described above, debiting or crediting a sub-account of the person, and generating one or more crypto-blocks.

At block 1322, a wager result is determined, either by the gaming platform or casino gaming server 510, i.e., whether the wager placed by the person was successful, depending on an outcome of a particular game. In response, the gaming platform generates wagering transaction information, comprising one or more of an identification that the transaction comprises a wager result, a wager result (i.e., win or loss), a payout amount (if a win), and other information described earlier herein with respect to wagering transaction information. The wagering transaction information is sent to IGO server 514 and processed as described above, debiting or crediting a sub-account of the person, and generating one or more crypto-blocks.

At block 1324, the person may wish to conduct a non-wagering transaction with a merchant associated with gaming operator system 502, i.e., one that accepts the same C3 that was issued by the gaming operator associated with gaming operator system 502, such as a hotel, restaurant, spa or shop associated with the gaming operator. The person uses the software application running on the person's client device 520 to pay for the non-gaming transaction, and an electronic payment system or POS associated with merchant 524 receives an indication of payment in C3 from the person via the client device 520.

At block 1324, the payment system of merchant 524 generates non-gaming transaction information, comprising much of the same information as the gaming information generated in response to gaming transactions, described above. The non-gaming transaction information may indicate that the transaction is a non-gaming, or merchant, transaction, and include a description of the goods and services purchased by the person.

At block 1326, the non-gaming transaction information is provided to IGO server 514 via wide-area network 512.

At block 1328, the non-gaming transaction information is received by IGO server 514 via network interface 604 and provided to processor 600.

At block 1330, processor 600 determines an account that the non-gaming transaction information is associated with. Processor 600 typically determines this by evaluating the user ID found in the non-gaming transaction information and comparing the user ID to a plurality of user IDs stored in memory 602 to identify an account belonging to the person.

At block 1332, processor 600 identifies a sub-account associated with the person associated with the non-gaming transaction information by evaluating the type of C3 identified in the non-gaming transaction information, or by evaluating a merchant/gaming operator ID in the non-gaming transaction information.

At block 1334, processor 600 debits or credits the sub-account associated with the type of C3 in the non-gaming transaction information. In this example, a balance associated with the first sub-account is debited an amount equal to the transaction amount in the non-gaming transaction information.

At block 1336, processor 600 may generate and send a confirmation message directly to the client device 520, indicating that the person's account balance associated with the first sub-account has been reduced by the transaction amount.

At block 1338, processor 600 may generate at least one crypto-block from the non-gaming transaction information, similar to the process of creating a crypto-block as described above with respect to a gaming transaction.

In one embodiment, processor 600 determines that the non-gaming transaction information involves a non-gaming transaction and, in response, generates a crypto-block for the person, and a crypto-block for use by the merchant who participated in the transaction. Processor 600 does not create a gaming regulator crypto-block, because a gaming regulator should have no authority to oversee non-gaming transactions.

At block 1340, processor 600 stores the crypto-block(s) either in a blockchain network 516, or memory 602. In one embodiment, crypto-blocks associated with the person are stored in association with the person's account or sub-account, while crypto-blocks associated with the merchant are stored in association with the merchant.

At block 1342, the person may wish to transfer a first C3 that was originally purchased as described above, to a second gaming operator system 526 that uses a second form of C3. For example, the person may wish to transfer $100 worth of MGM casino operator's C3 that was issued to the person previously to Harrah's casino operator that uses a different form of C3 incompatible with the C3 from MGM. The person may access a portion of the software application running on the person's client device 520 to view available balances in each account or sub-account that the person opened previously. In this example, the person previously opened a main account having two sub-accounts, one that references all gaming and non-gaming transactions associated with MGM, and another sub-account that references all gaming and non-gaming transactions associated with Harrah's. Further, in this example, the balance in the MGM account is $100 worth of MGM C3, and the balance in the Harrah's account is $0 worth of Harrah's C3.

At block 1344, the person utilizes a user interface provided by the software application to enter a transfer amount, a sub-account to transfer from, and a sub-account to transfer to.

At block 1344, the client device 520 sends a transfer request to IGO server 514 via wide-area network 512, the transfer request comprising a user ID of the person, a transfer amount (either in currency or C3 amounts), the transfer-from sub-account, and the transfer-to sub-account. Note that the transfer request is sent to IGO server 514 and not to casino gaming server 510 (i.e., MGM's gaming server) or to Harrah's gaming server 534, as the two gaming operators reconcile their accounts with each other at predetermined time periods, such as once per month.

At block 1346, IGO server 514 receives the transfer request via network interface 604 and provides the transfer request to processor 600.

At block 1348, processor 600 identifies the transfer-from sub-account and determines whether there are sufficient funds available in sub-account (associated with MGM in this example) to transfer to the sub-account associated with Harrah's.

At block 1350, when processor 600 determines that there are enough funds, processor 600 debits the MGM sub-account by the transfer amount and credits the Harrah's sub-account with transfer amount. Note that in terms of C3, a different amount of C3 may be debited from the MGM sub-account than credited to the Harrah's sub-account, due to potential exchange rates offered by MGM vs. Harrah's.

At block 1352, processor 600 generates one or more crypto-blocks detailing the transfer (such as user ID, transfer-from sub-account, transfer-to sub-account, date of transaction, time of transaction, etc.), in one embodiment using the person's cryptographic key that was provided to the person during the setup process, and stores the one or more crypto-blocks either on blockchain network 516 or in memory 602 in association with the person's account or sub account(s). In another embodiment, one or more crypto-blocks are generated by processor 600 using the person's cryptographic key, another one or more crypto-blocks are generated by processor 600 using a cryptographic key provided to gaming operator system 510 (i.e., MGM), another one or more crypto-blocks are generated by processor 600 using a cryptographic key provided to gaming operator system 526 (i.e., Harrah's), and another one or more crypto-blocks using a cryptographic key provided to the gaming regulator. Each of these crypto-blocks may be stored on blockchain network 516 or in memory 602 in association with the person and each respective entity.

At block 1354, after the amount has been transferred, IGO server 514 sends a notification to casino gaming server 510 indicating that the person's balance has been reduced by the transfer amount.

At block 1356, IGO server 514 sends a notification to casino gaming server 534 indicating that the person's balance has been increased by the transfer amount.

In this way, use of IGO server 514 allows convenient transfers of C3 between different gaming operators, while transactions involving the transfer of currency to a person's sub-accounts is performed by gaming operators, who generally have the necessary authority to conduct such transactions.

Figure 14:
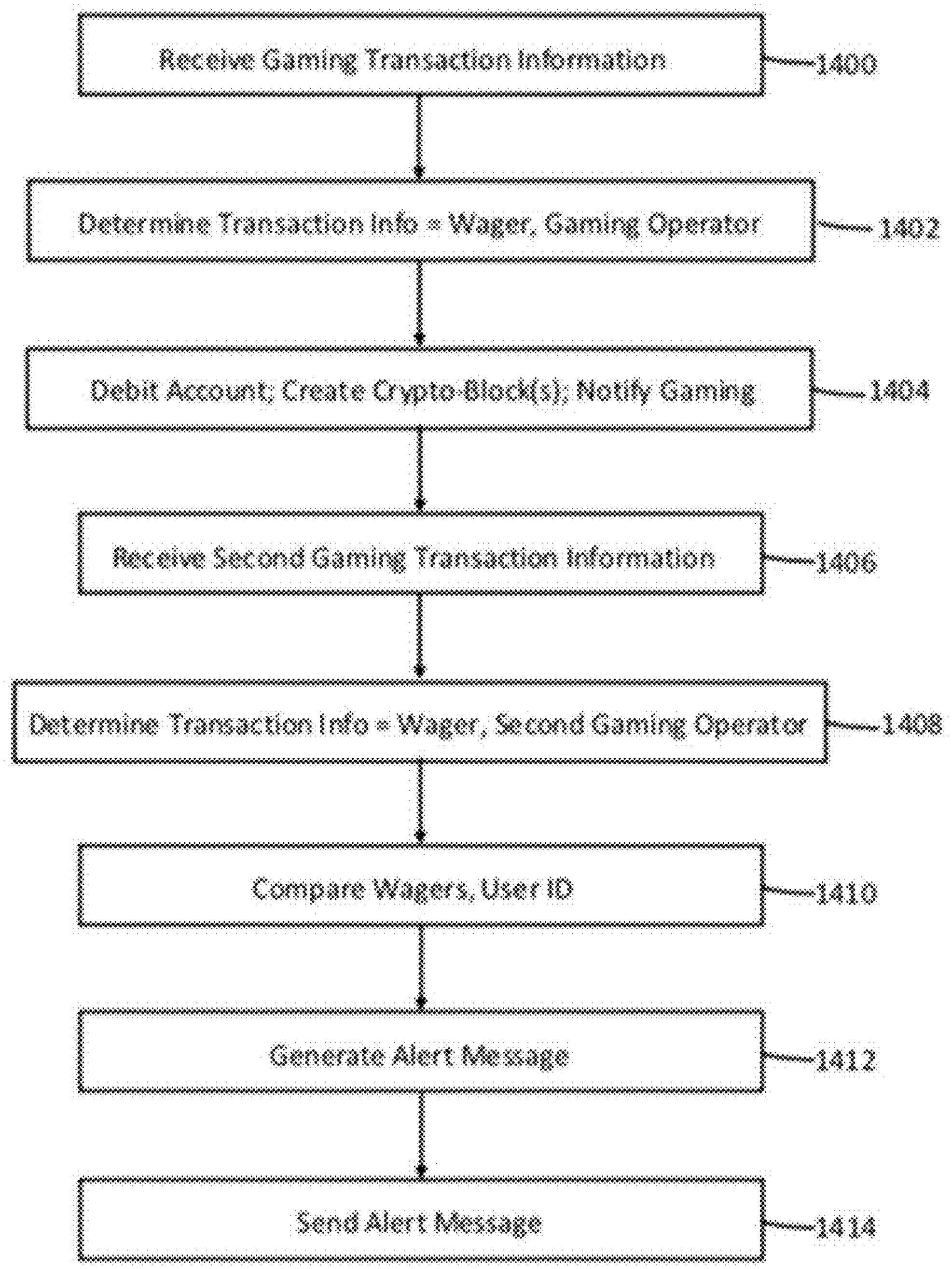
FIG. 14 is a flow diagram illustrating one embodiment of a method performed by the IGO server as shown in FIGS. 5 and 6 to track gaming and non-gaming transactions using C3.

FIG. 14 is flow diagram of one embodiment of a method, performed by IGO server 514, to identify potential fraudulent or criminal activities involving gaming transactions occurring at different gaming operator platforms. The method is described in terms of wagers placed on a particular sporting event, in this example, a professional football game between the Seahawks and the Raiders, placed on platforms owned or operated by different gaming operator systems. It is assumed that a person has already opened a primary account with IGO server 514, the primary account comprising at least two sub-accounts, each sub-account associated with a particular gaming operator system and a respective C3. It is also assumed that the person has funded both accounts with C3 from each of the respective gaming operator systems. It should be understood that the steps described in this method could be performed in an order other than what is shown and discussed, and that some minor steps may have been omitted.

At block 1400, IGO server receives gaming transaction information from network interface 604 and provides the gaming transaction information to processor 600.

At block 1402, IGO server determines that the gaming transaction information comprises one or more of a wager provided by a certain gaming platform associated with a particular gaming operator system, in this case, an online wager placed through online gaming server 522 and associated with gaming operator system 502, a wager amount of C3 currency associated with gaming operator system 502, a wager event ID (i.e., Seahawks vs. Raiders), a wager selection (i.e., the Seahawks will win), a user account or sub-account associated with a person that submitted the wager, as explained above with respect to the method of FIG. 13.

At block 1404, processor debits a sub-account of the person, generates one or more crypto-blocks memorializing the transaction, and notifies casino gaming server 510 and/or online gaming server 522 to reduce a balance of the person by the amount of the wager, also as explained above with respect to the method of FIG. 13. Processor 600 may also store certain information in the gaming transaction information temporarily in memory 602 for use in determining illicit gaming transactions, as explained below. For example, processor 600 may store a user ID, wager information (amount, event ID, wager selection, date, time, platform, gaming system operator, etc.). This information may be only kept for a predetermined time, such as a time when a sporting event concludes, or at some point soon thereafter, such as a day or a week.

At block 1406, IGO server receives second gaming transaction information from network interface 604 and provides the gaming transaction information to processor 600.

At block 1408, IGO server determines that the second gaming transaction information comprises one or more of a wager provided by a certain gaming platform associated with a particular gaming operator system, in this case, a wager placed using sports wagering server 532 at gaming operator system 526, a wager amount of C3 currency associated with gaming operator system 526, a wager event ID (i.e., Seahawks vs. Raiders), a wager selection (i.e., the Raiders will win), a user account or sub-account associated with a person that submitted the wager, as explained above with respect to the method of FIG. 13.

At block 1410, processor 600 compares at least some of the information in the second gaming transaction information to the temporary gaming transaction information stored in memory 602. The comparison may be configured to determine that the same person placed a wager on the same sporting event, for example, based on the same user ID in each gaming transaction information received, but on opposing sides of the bet (i.e., bet on Seahawks to win and also bet on the Raiders to win). This may indicate money laundering. If processor 600 determines that such a condition exists, a decision to flag the transactions as suspicious may be filtered first through a predetermined threshold, to determine of the wager amounts are greater than a predetermined amount, such as $100.

At block 1412, when processor 600 determines that the same person placed wagers on both sides of an event, processor 600 generates a message that indicates the possibility of an illicit wager. The message may include a name of the person associated with the transactions, the person's account or sub-account information, the amount of the wagers, an identification of the platform where each wager was placed, the date and time that the wagers were placed, and the name of the gaming operator through which the wagers were placed.

At block 1414, the message is provided to one or both gaming operator systems, and/or to regulators via text message, email, voice call, or some other electronic notification system that provides timely alerts to such entities.

In this way, IGO server 514 is able to detect illicit wagering activities that may involve money laundering or match fixing, because IGO server 514 receives wagering information from multiple gaming operators and is, therefore, able to cross-check the wagering information originating from different gaming operators. In this way, illicit wagering detection techniques are improved by the use of IGO server 114.

Figure 15:
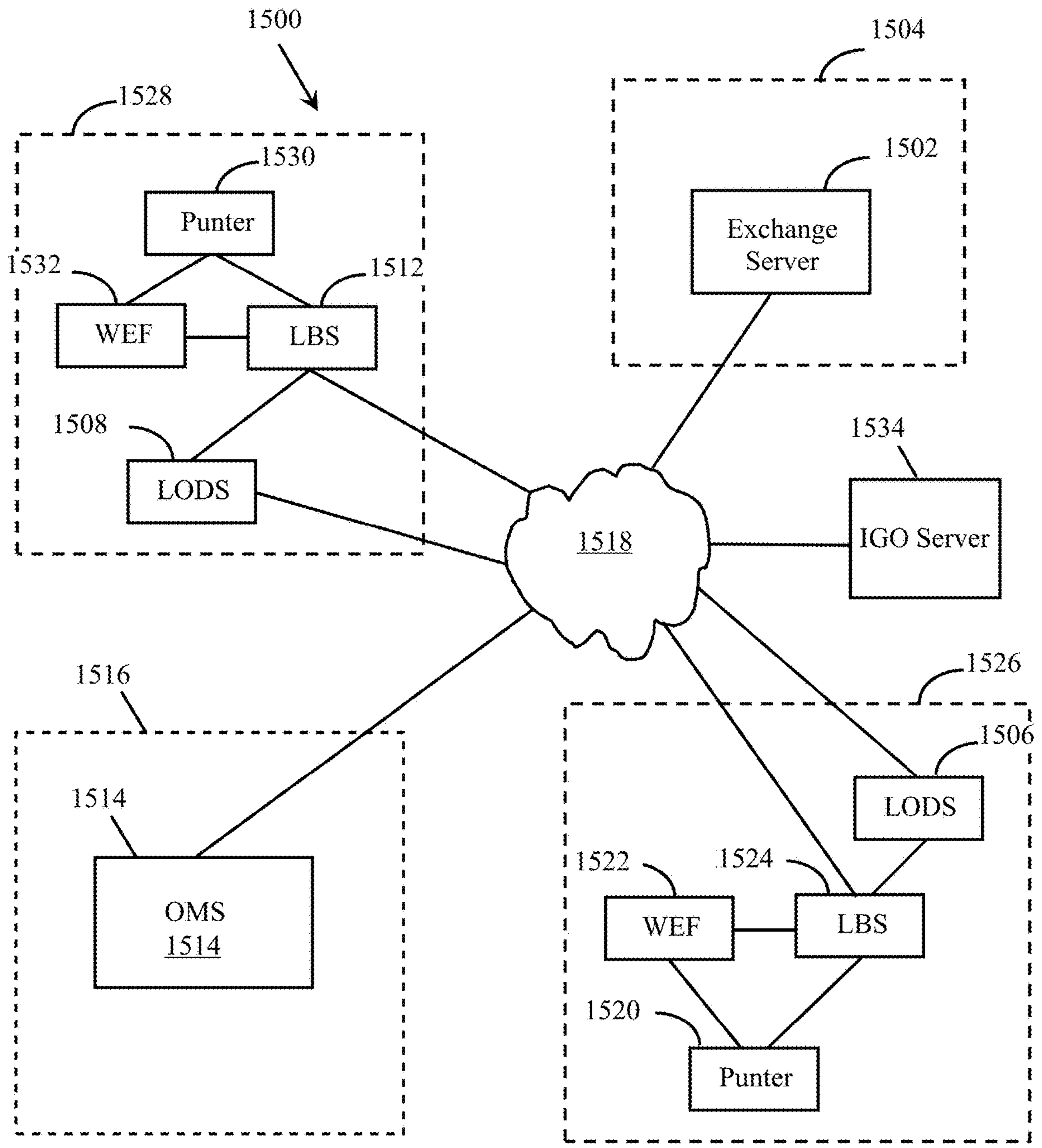
FIG. 15 is a block diagram of one embodiment of a system that allows trading of already-placed wagers among entities located in disparate jurisdictions.

FIG. 15 is block diagram of one embodiment of a system 1500 that allows trading of already-placed wagers among entities located in disparate jurisdictions. A "wager" may comprise one or more "wager attributes", such as a "face value" (i.e., a dollar amount chosen by, and paid by, the punter to make the wager), an event or proposition ID (i.e., an identifier that uniquely identifies a future event or proposition, or a combination of future events and/or propositions, an expiration time (i.e., a time when the wager can no longer be redeemed, or a deadline for an event or proposition, or a combination of future events and/or propositions, to occur), an identification of the punter who made the wager, and an identification of the wager itself (such as a unique number that identifies the wager). Additionally, a wager typically comprises two contractual components: an "obligation to pay" component, obligating an LODS or an LBS to pay money to a punter if the punter's wager is successful, and a "right to receive" component, entitling the punter to receive money from an LODS or an LBS if the punter's wager is successful. "Already-placed wagers" refers to wagers that have already been placed by and accepted by a LODS or a LBS. In FIG. 15, exchange server 1502 is shown located in a first jurisdiction 1504, such as an Indian reservation, a county, a state, a country, or some other jurisdiction that may be regulated by governmental authorities for purposes related to gambling or financial exchanges. Exchange server 1502 provides a trading platform allowing LODS 1506, LODS 1508, LBS 1510, LBS 1512, or some other entity, to exchange already-placed wagers with each other, for purposes related to balancing each entity's books, or for allowing punters to exchange their already-placed wagers. While shown as a separate entity from OMS 1514, exchange server 1502 could be incorporated into OMS 1514. Moreover, exchange server 1502 generally comprises the same or similar components as the LBS shown in FIG. 2, i.e., a processor 200, a memory 204 and a network interface 104. Reference to these components shall be made when referring to exchange server 1502 herein.

The already-placed wagers are bets that have already been placed by punters, associated with a certain outcome of a future event or proposition. Examples of future events comprise a winner of a sports competition, or a winner of an election. Examples of future propositions comprise whether a first score of a football game will be a safety, whether a quarterback will throw a touchdown or interception on the next play, whether a sports team will score more than a certain amount of points in a given time period, etc. An already-placed wager, may comprise a wager on a group of events, such as a wager on all football games to be played in week following the day the wager was placed. In this example, if there are 16 NFL games in a week, a total point spread for the week's favorites to beat the underdogs may be calculated by OMS 1514, say 107 points, and provided to the LBSs and LODSs. Once the odds are established by OMS 1514 or is published on a website that shows the odds of major oddsmakers, bookmakers, such as the LODs and the LBSs, can start offering composite wagers that cover the entire week's games to punters looking to speculate as to whether the favorites (i.e., teams favored to win, as determined by odds or a point spread), as a group, will cover their odds or spreads (i.e., that the combined scores of favorites exceeds the combined scores of the underdogs, plus a spread). At the beginning of a week, say week 10 of a 16 game season of the National Football League, the odds for the favorites, as a group, to cover their individual spreads is 1-to-1, however as soon as the first game starts, the odds could change based on the results of one game. For example, if in the first game, the favorite team wins by 17 points versus the pre-match odds of winning by 7, then those who have bet on the favorites will have higher odds of winning their composite bets for the week, since the remaining total spreads for the rest of the games is now 90 versus 100 as the first game's actual spread was 17 versus 7 as predicted by the bookmakers.

In FIG. 15, OMS 1514 is shown located in a second jurisdiction 1516, used for calculating "bet equalizers" for one or more future events or propositions. The term "bet equalizer" is used herein to refer to odds of a certain event or proposition happening, a point spread, a handicap, or some other term to quantify a likelihood of a future event or proposition occurring or not i.e. the goal of a bet equalizer is to split the opinion of punters into half. OMS 1514 performs the same or similar functions as other OMSs described earlier herein, comprising the same or similar components as the LBS shown in FIG. 2, i.e., a processor 200, a memory 204 and a network interface 104. Reference to these components may be made when referring to OMS 1514 herein. It typically calculates at least initial bet equalizers, such as odds or a point spread, of a future event or proposition to occur, based on input received from oddsmakers and other sources of information received via wide-area network 1518, such as a telephone network, a computer network such as the Internet, etc. OMS 1514 then provides one or more bet equalizers associated with one or more future events or propositions to recipients such as the LODS and/or to the LBSs, so that they may offer wagers to punters based on the initial bet equalizers. The LODS and LBSs may be located in jurisdictions different than jurisdiction 1514 where OMS 1514 is located and where exchange server 1502 is located. These other jurisdictions are shown as third jurisdiction 1526 and 1528. While only two other jurisdictions are shown in FIG. 15, in actuality, OMS 1514 and/or exchange server 1502 serves a large number of other jurisdictions.

One or more punters 1520 may place one or more wagers with WEF 1522 and/or LBS 1524, where WEF 1522 and LBS 1524 are located in a third jurisdiction 1526. WEF 1522 and LBS 1524 perform the same or similar functions as other WEFs and LBSs described earlier herein, each comprising the same or similar components as the LBS shown in FIG. 2, i.e., a processor 200, a memory 204 and a network interface 104. Reference to these components may be made when referring to either WEF 1522 or LBS 1524. The wagers received, accepted and accounted for by each of WEF 1522 and LBS 1524, for example, tracking the number of wagers received for particular future events and/or proposition, tracking the number of wagers on each side of a future event and/or proposition, tracking the total dollar amount wagered on each side of a future event and/or proposition, and/or tracking a total dollar "exposure" (i.e., a potential loss that would result if an outcome of a future event or proposition resulted in WEF 1522 or LBS 1524 having to pay out more than what was received from wagers), etc.

At some point after a wager has been placed and accepted by an LBS or a LODS, a punter may wish to buy or sell his or her "right to receive" the payment component of an already-placed wager to another punter or to an LODS or an LBS when the punter no longer believes that an outcome of a future event or proposition associated with the already-placed wager will be favorable (in the case of selling) or the punter more firmly believes that an outcome of a future event or proposition associated with the already-placed wager will be favorable (in the case of buying). Buying or selling the right to receive the payment component may each sometimes be referred to herein as "buying an already-placed wager" or "selling an already-placed wager", respectively.

Similarly, an LBS or an LODS may wish to buy or sell an "obligation to pay" component of an already-placed wager from another LBS or an LODS when, for example, one or more exposures of one or more books, or a totality of exposure from most or all of their books, exceeds an unacceptable level.

Exchange server 1502 provides a platform for punters, LODSs and LBSs to buy and sell obligations to pay components (OTPCs) and right to receive components (RTRCs) associated with already-placed wagers. Each buy and sell order may comprise one or more order attributes, such as indication of whether the order is a buy order or a sell order, a number of OTPCs or RTRCs to buy or sell, a price at which a buyer or seller is willing to buy or sell the OTPSs or RTRCs (i.e., a "bid price" or an "ask price"), an identity of the LODS or LBS where the order originates, as well as the wager attributes, such as the face value of the already-placed wager, an identification of a future event or proposition, or a combination of future events and/or propositions, an identification number of the future event or proposition, or combination of future events and/or propositions, and an identification number of the already-placed wager. LODSs and/or LBSs provide buy and sell orders to server 1502, which receives the orders and organizes them for presentation and order matching (e.g. highest bid and ask prices) to some or all of the LBSs and LODS that is a participant in system 1500, so that each LBS and LODS can see an organized list of all the buy and sell orders placed with exchange server 1502 from all other LBSs and LODs.

Exchange server 1502 evaluates one or more order attributes of the buy and sell orders to determine matches, and when a match is found, a transaction occurs, where an OTPS or an RTRC is bought or sold and is recorded in its database. Exchange server 1502 then notifies the buyer and the seller as well as the LBS's of the buyer and seller in the transaction. More details of this process are provided below.

Figure 16A:
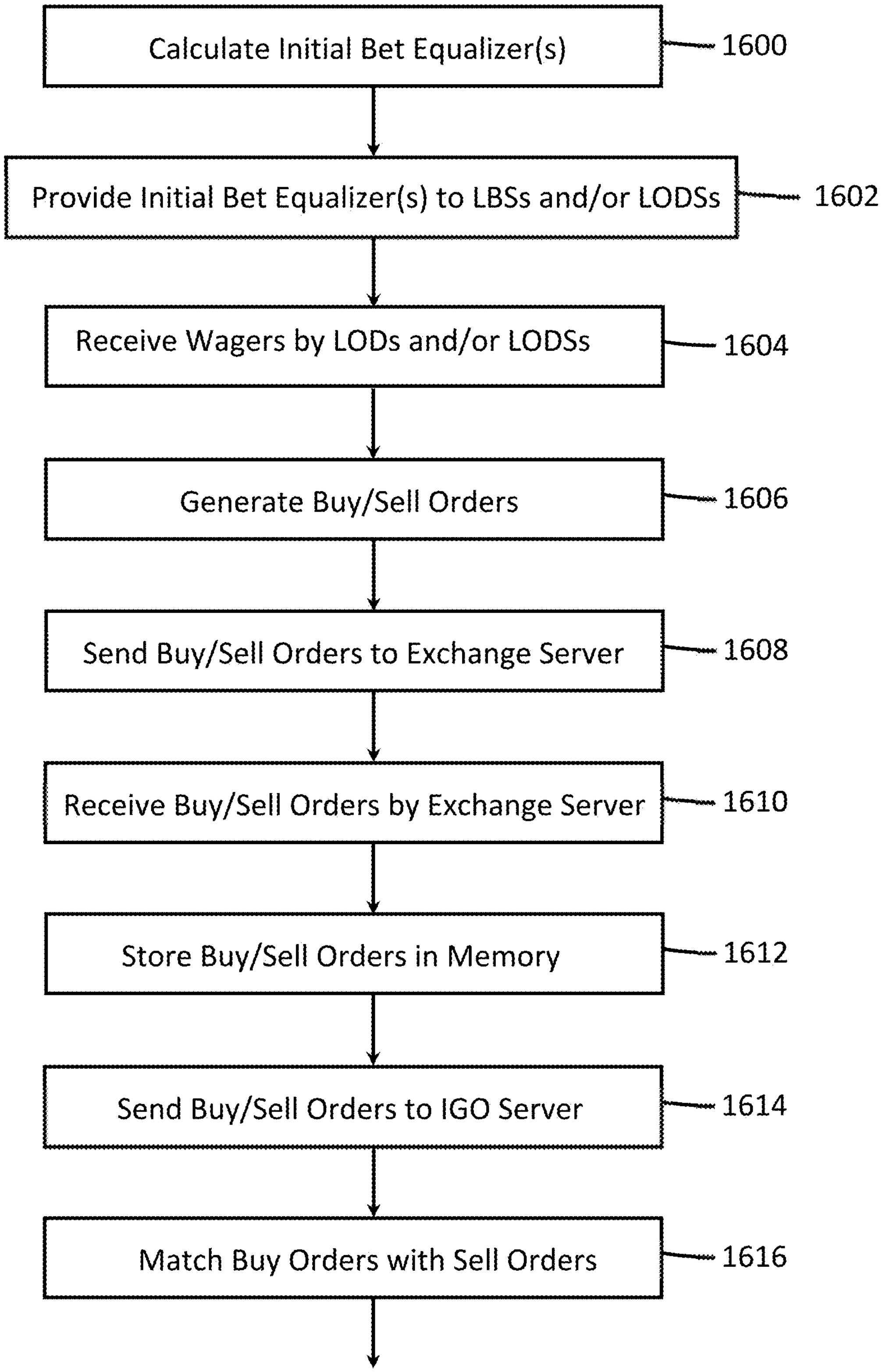
FIGS. 16A and 16B are a flow diagram illustrating one embodiment of a method, performed by the exchange server shown in FIG. 15, for providing an exchange for buying and selling rights to receive payments associated with already-placed wagers, and for buying and selling obligations to provide payments associated with already-placed wagers.
Figure 16B:
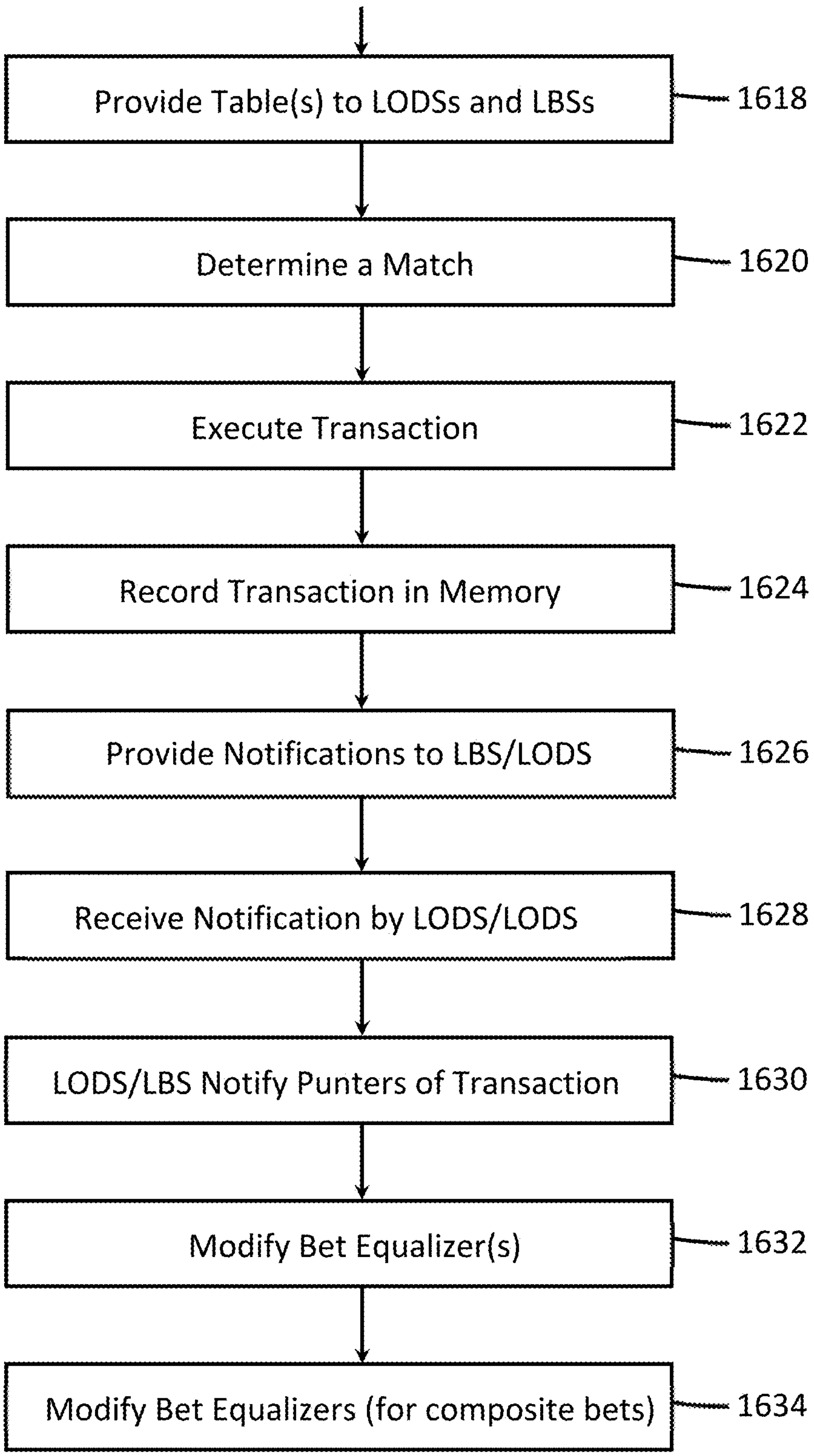
Figure 17A:
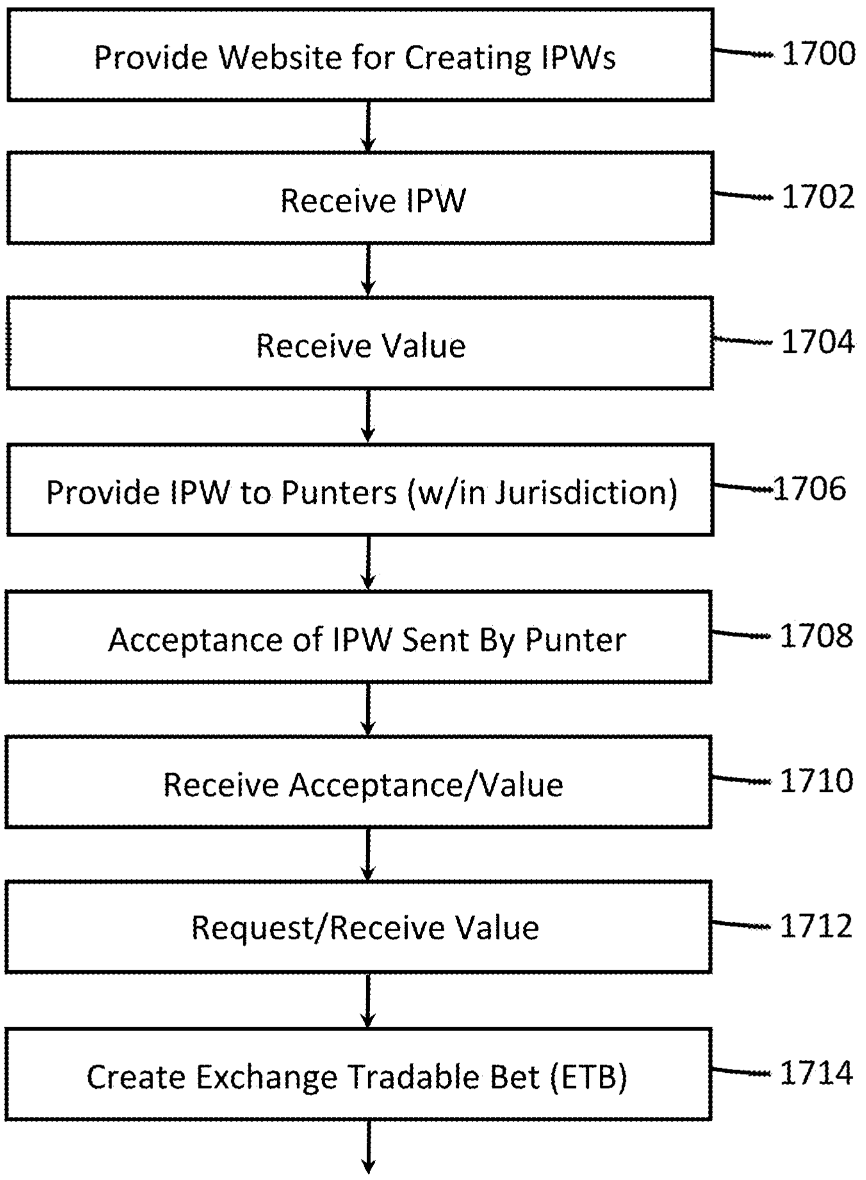
FIGS. 17A through 17D represent a flow chart of one embodiment of a method for facilitating peer-to-peer wagering transactions.
Figure 17B:
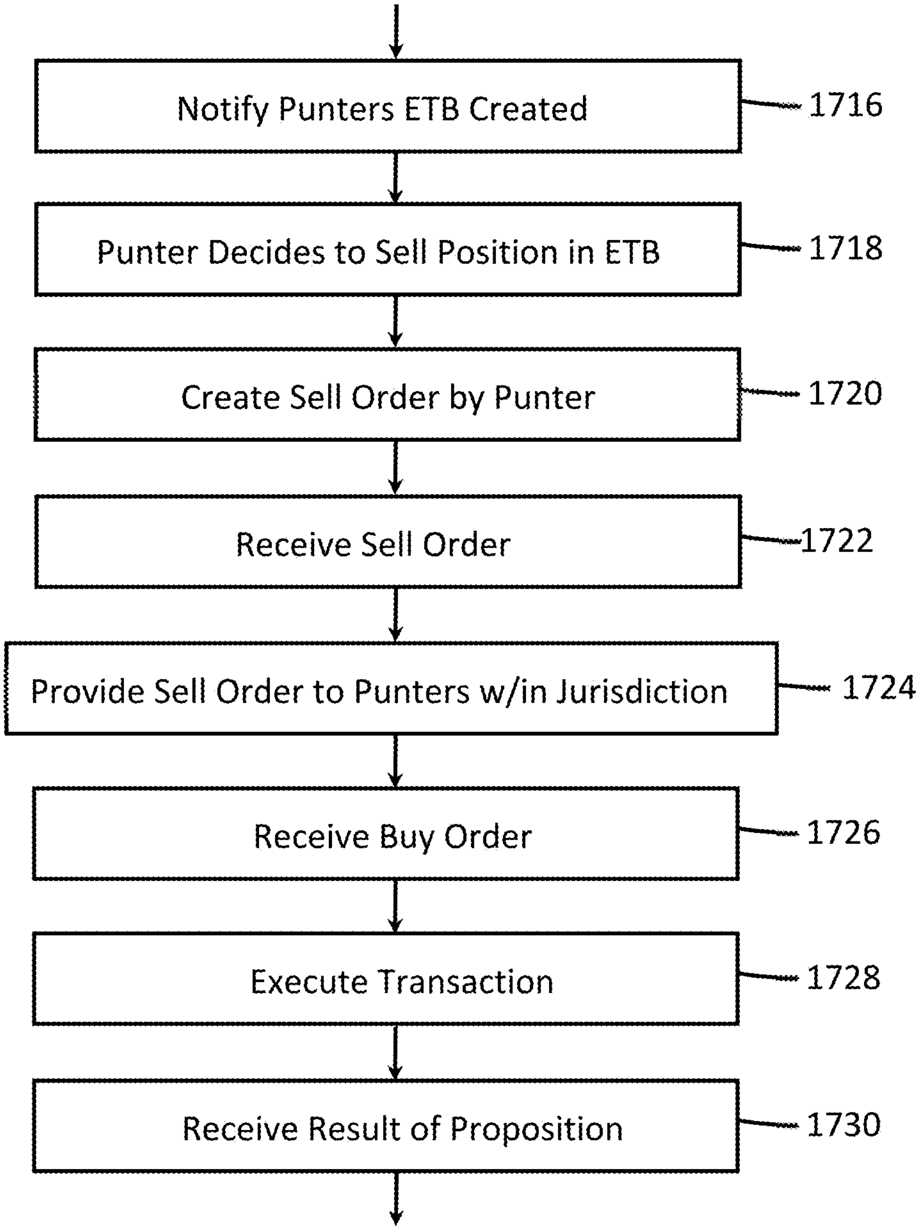
Figure 17C:
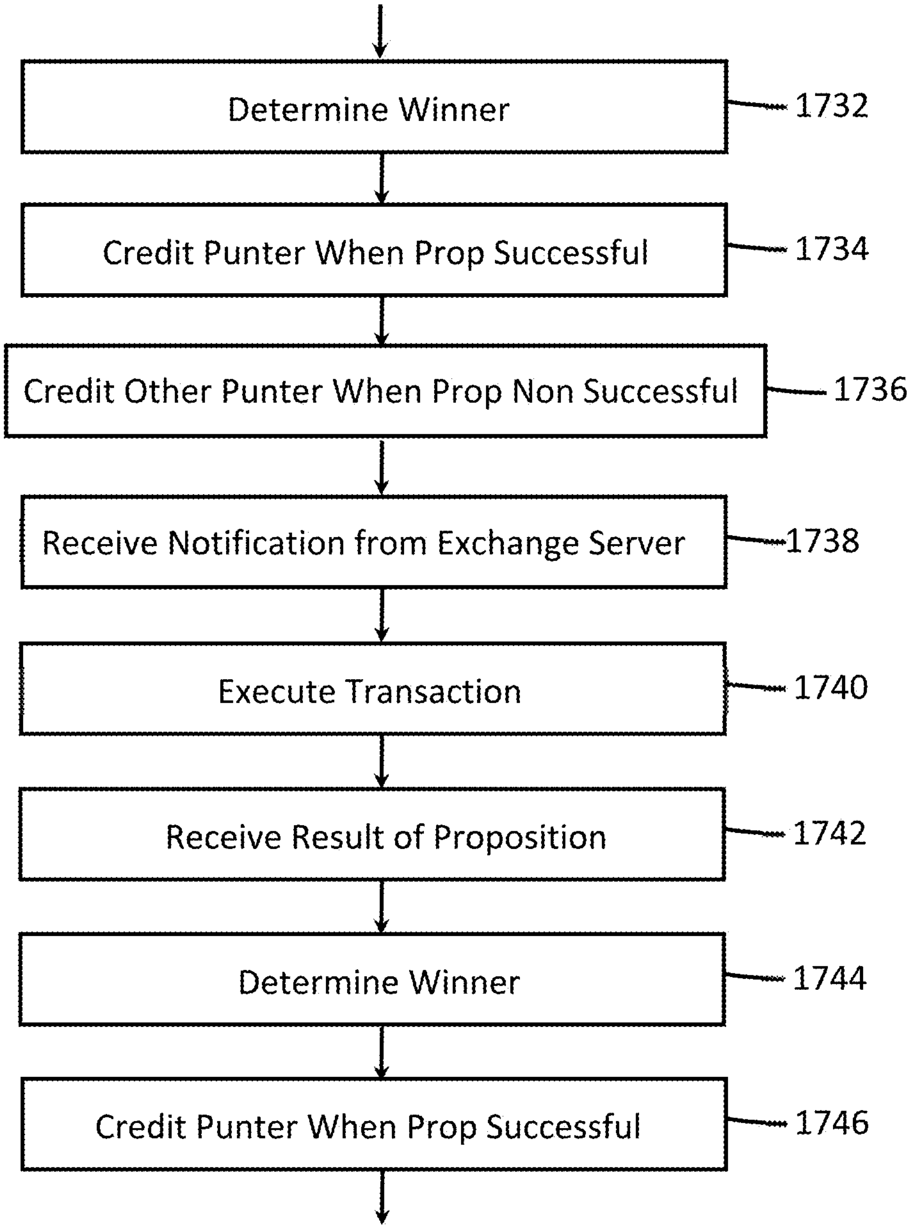
Figure 17D:
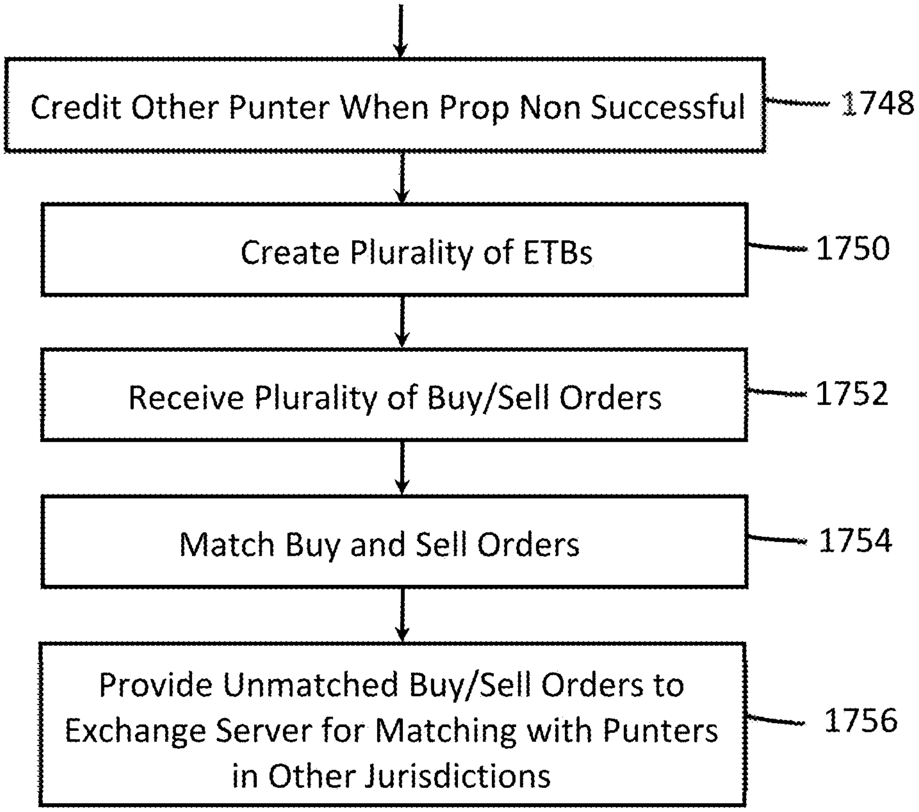

FIGS. 16A and 16B are a flow diagram illustrating one embodiment of a method, performed by exchange server 1502, for providing an exchange for buying and selling rights to receive payments associated with already-placed wagers, and for buying and selling obligations to provide payments associated with already-placed wagers. While the method is described in terms of exchange server 1502 comprising a server separate and apart from OMS server 1514, in some other embodiments, the method could be performed by OMS server 1514. Further, the method may be performed to provide exchange services for a large number of jurisdictions, such as tens or even thousands of jurisdictions, each with one or more LODSs, LBSs, and WEF servers. It should further be understood that the order in which the steps are described could be different in other embodiments, that some of the steps may not be performed in other embodiments, and that some minor steps may be omitted, for purposes of clarity.

At block 1600, OMS server 1514, located in jurisdiction 1516, calculates one or more bet equalizers in association with one or more future events and/or propositions, or a group of future events or propositions. For example purposes, OMS server 1514 may determine that the odds for team "A" to beat team "B" in a sports match played at a future date of Jun. 2, 2020, at Arrowhead Stadium located in Kansas City, Missouri, is 3:1. OMS sever may, additionally or alternatively, calculate a point spread for the sports match, awarding team "B" 10 points. OMS server 1514 may, alternatively or in addition, determine an overall bet equalizer related to a plurality of future events and/or propositions, such as combined point spread for a series of sporting matches played over a predetermined time period, such as a combined point spread for all NFL teams over a predetermined time period of one week, as described earlier herein.

At block 1602, OMS server 1514 provides the one or more bet equalizers to LBS 1524 and/or LODS 1506, both located in jurisdiction 1526, and to LBS 1512 and/or LODS 1508, both located in jurisdiction 1528. These servers, in turn, provide the bet equalizers to associated punters in order for the punters to decide whether to place wagers based on the bet equalizers, and also to determine which future event and/or proposition to bet on. In one embodiment, these servers may alter the bet equalizers by a small amount, such as 1%, in order to profit from the difference between the bet equalizers provided by OMS sever 1514 and the altered bet equalizers.

At block 1604, a plurality of wagers is received over a one day time window by LBS sever 1512 and by LBS 1524, for example, 10,000 wagers between the two servers (for purposes of clarity, in this example, no wagers are placed via WEF 1522 and WEF 1532). The orders are received by processor 200 in each LBS via network interface 204. Some of the wagers comprise wagers for team A to win, for team B to win factoring in a point spread, if any, or for team A to cover the point spread, and/or for a group of future events and/or propositions to cover their combined individual point spreads or bet equalizers. In any of these cases, LBSs accept the wagers and receives the face dollar value amount of each wager from the punters.

Processor 200 in LBS 1512 and LBS 1524 may organize the wagers and stored them in memory 202. The wagers may be organized based on wager attributes, such as a future event or proposition type, or a combination of future events and/or propositions, an expiration time of the event, proposition, or combination of one or more future events and/or propositions, an expiration time, an identification of a punter who placed the wager, an identification number associated with the wager, unique to at least the LBS that received the wager, the face value of the wager, the odds or point spread of the wager, etc. Each LBS may also determine a monetary exposure, respectively, based on the wagers for one or more particular future events/propositions or combinations of such, and/or a total exposure based on all, or most, of the wagers received. Each of the attributes may be assigned by LBS 1512 and LBS 1524 using proprietary protocols by each. For example, LBS 1512 may assign an event ID to a wager such as a 10-digit numeric code, while LBS 1524 may assign an event ID as a 15-value alpha-numeric code.

At block 1606, one or more buy orders and/or sell orders for already-placed wagers is generated by processor 200 via network interface 204, in response to receiving a request from a punter, via network interface 204, to buy or sell a wager, or in response to one or both LBSs determining that a respective risk exceeds a predetermined risk threshold set by operators of each LBS. Many thousands of buy and sell orders may be received real time or in a short time period, such as 30 seconds. Each buy or sell order comprises order attributes, such as an indication of whether the order is a buy order or a sell order, a number of already-placed wagers to buy or sell, a price at which a buyer or seller is willing to buy or sell the already-placed wager(s) (i.e., a bid price or an ask price), an identity of the LODS or LBS where the order originates, as well as the wager attributes, such as the face value of the already-placed wager, an identification of a future event or proposition, or a combination of future events and/or propositions, an identification number of the future event or proposition, or combination of future events and/or propositions, and an identification number of the already-placed wager. If proprietary codes are used by the LBSs to identify one or more order attributes, each LBS may be required to convert and map any proprietary codes to a standard format provided by exchange server 1502. In another embodiment, each LBS provides instructions to exchange server 1502 in order for exchange server 1502 to convert the proprietary order attributes into a standard format and, in some embodiments, to convert a format used by exchange server 1502 into respective proprietary formats for each LBS that uses a proprietary format.

At block 1608, processor 200, from each of LBS 1524 and LBS 1512, provides the one or more buy and/or sell orders to exchange server 1502 via network interface 204.

At block 1610, the one or more buy and/or sell orders from both LBS 1524 and LBS 1512 are received by exchange server 1502, by a processor 200 of exchange server 1502 via a network interface 204 of exchange server 1502.

At block 1612, the orders from each of LBS 1524 and LBS 1512 are stored in a memory 202 of exchange server 1502.

At block 1614, in one embodiment, processor 200 of exchange server 1502 and/or LBSs and/or LODS, may send order information to IGO server 1534. Upon receiving orders, IGO server 1534 may create "crypto-blocks" for use in tracking orders and completed transactions reported by OMS 1514, the LBSs and/or the LODS. The crypto-blocks may be stored in blockchain network 516, as described previously, which may comprise a commercially available blockchain management system, such as an IBM Blockchain Platform provided by International Business Machines of Armonk, New York.

At block 1616, processor 200 of exchange server 1502 attempts to match buy orders with sell orders. This is done by processor 200 of exchange server 1502 comparing one or more of the order attributes and the wager attributes of each order to each other, to match one or more attributes. In one embodiment, processor 200 of exchange server 1502 constructs tables based on certain wager attributes for each future event and/or proposition, or combination of future events and/or propositions, ordered, in one embodiment, by the highest several buy and sell orders received by exchange server 1502, arranged in descending order, as shown below:

Bears/Saints-Nov. 18, 2020-$10

| Buy Orders | | Sell Orders | |
|---|---|---|---|
| Quantity | Price | Price | Quantity |
| 100 | $10.00 | $10.00 | 80 |
| 100 | $9.80 | 9.90 | 100 |
| 400 | $9.60 | 9.80 | 500 |
| 250 | $9.40 | 9.85 | 150 |

In this example, the table above was constructed by processor 200 of exchange server 1502, populating the Quantity and Price fields with bids and ask prices, and associated quantities, found in the buy and sell orders matching already-placed wagers comprising a "teams" attribute, in this example "Bears/Saints" for a future event of a football game between the Bears and the Saints, matching a "date" attribute of Nov. 18, 2020 (when the game will be played), and also matching an "face value" of $10 (the dollar amount of already-placed wagers). Processor 200 of exchange server 1502 typically constructs hundreds, or even thousands of such tables, each one listing quantities and prices of already-placed wagers that buyers are willing to buy, and sellers are willing to sell. For example, processor 200 of exchange server 1502 could construct numerous similar tables, listing quantities and prices for each game of an entire season of upcoming NBA games.

In one embodiment, the quantities listed in the table are typically a sum of a total number of buy orders received by processor 200 of exchange server 1502 at each price listed in the table. For example, a total of 100 buy orders for already-placed wagers with a face value of $10 were received for an NFL game between the Bears and the Saints, to be played on Nov. 18, 2020, at a bid of $10.00. The 100 buy orders may have been received in various quantities from LBS 1524 and/or LODS located in jurisdiction 1526 and/or from LBS 1512 and/or LODS 1508.

At block 1618, processor 200 of exchange server 1502 may provide each table that it constructs to each LBS and LODS that participates the exchange managed by exchange server 1502, in this example, to LBS 1524 and/or LODS 1506, and/or to LBS 1512 and/or LODS 1508. In turn, each of these entities may provide the tables to punters, so that the punters may decide whether to place a buy order or a sell order, based on the prices that others are willing to buy and sell already-placed wagers.

At block 1620, processor 200 of exchange server 1502 determines when one or more of the buy order attributes for a particular future event or proposition, or combination of future events and/or propositions, matches each other. In this example, exchange server 1502 received 100 buy orders at $10 and 80 sell orders at $10.

At block 1622, in response to matching 80 buy and sell orders, processor 200 of exchange server 1502 executes 80 transactions between the 80 sell orders and 80 out of the 100 buy orders, leaving 20 buy orders with no matching sell orders at a price of $10. These orders remain in the table, waiting for sell orders having an ask price of $10. Each transaction of matching prices is recorded by processor 200 of exchange server 1502.

At block 1624, processor 200 of exchange server 1502 records each of the 80 transactions in memory 202 of exchange server 1502, indicating that each of the 80 buy orders and each of the 80 sell orders has been executed, crediting each buyer with a number of already-placed wagers purchased from the sellers, and debiting, cancelling, or otherwise removing ownership of the already-placed wagers from each seller.

At block 1626, processor 200 of exchange server 1502 provides notifications to each LODS and/or LBS that placed a buy or sell order that was executed by exchange server 1502, via network interface 204 of exchange server 1502. In one embodiment, notifications are, alternatively or in addition, sent to IGO server 1534 for inclusion in a distributed ledger. Notifications may be sent to LODSs and/or LBSs in different jurisdictions when a completed transaction comprises a completed buy order from a buyer in one jurisdiction and a completed sell order from a seller in another jurisdiction. For buyers, the notifications may comprise a number of already-placed wagers a buyer has purchased, a dollar amount of the purchase plus, in some embodiments, a transaction fee imposed by operators of exchange server 1502, a time and date of the purchase, etc. For sellers, the notifications may comprise a number of already-placed wagers that were placed with an LBS, a dollar amount of the seller's already-placed wagers that were sold, a dollar amount of proceeds from the sale, less, in some embodiments, a transaction fee imposed by operators of exchange server 1502, a time and date of the sale, etc. In some embodiments, processor 200 of exchange server 1502 may need to translate at least some of the information in the notifications to a format that is suitable for one or more LBSs and/or LODS.

At block 1628, each LBS and/or LODS involved in a completed transaction receives one or more notifications from exchange server 1502, via network interface 204, and stores the notifications in memory 202. In one embodiment, where exchange server 1502 is separate and apart from OMS server 1514, processor 200 of exchange server 1502 may additionally provide notifications of completed orders to OMS server 1514. In yet another embodiment, processor 200 of exchange server 1502 may send a notification to OMS server 1514 of an imbalance of one or more tables. Referring back to the table, above, if the number of buy orders exceeds the number of sell orders by a predetermined number, such as 100 more buy orders than sell orders, processor 200 of exchange server 1502 may notify OMS server 1514 of this imbalance, for OMS server 1514 to potentially modify one or more initial bet equalizers, as explained below with the goal of finding a matching order to execute the remaining order.

At block 1630, each LBS and/or LODS involved in a completed transaction notifies punters who placed buy and/or sell orders that one or more of their buy and/or sell orders has been executed. No notification may be sent when an LODS or an LBS was the buyer in a transaction. Each LBS and/or LODS may then change ownership of one or more already-placed wagers to indicate that the buyer(s) now owns the already-placed wager(s) and that the seller(s) no longer owns the already-placed wager(s).

At block 1632, in response to sending the notifications, above, exchange server 1502 may modify one or more bet equalizers previously distributed to the LODSs and to the LBSs. In another embodiment, where exchange server 1502 is separate and apart from OMS server 1514, OMS server 1514 performs this function after receiving the notifications from exchange server 1502. Modification may be proportional to the overall number of executed buy or sell orders, and/or a total dollar amount over a predetermined time period, such as 1 hour or 1 day. For example, if initial odds for the Bears to beat the Saints were calculated to be 3:1 or an initial point spread was calculated to be 10 points (with the Bears favored), and 1,000 more buy orders were received than sell orders for already-placed wagers relate to the Bears/Saints game to be played on Nov. 11, 2020, processor 200, or OMS server 1514, may modify the odds to be 2:1, or decrease the point spread to 6 points.

In a related embodiment, at block 1634, exchange server 1502 may receive an update or result of an event, either during the event or after. As a result, processor 200 of exchange server 1502 may modify a bet equalizer associated with a series of events. For example, if server 200 calculated an initial point spread for a week of NFL games to be a total 107 for all of the teams favored to win that week, and one of the games was completed, indicating that the team favored by 7 points actually won by 17 points, then punters who placed a composite wager on the favorites to win will have higher odds of winning their composite wagers, since the remaining total point spreads for the rest of the games is now 90 (107-7-10) vs. the 107 initially calculated. As such, processor 200 of exchange server 1502 modifies the composite point spread to 90, and distributes that point spread to the LBSs and LODS in system 1500.

FIGS. 17A through 17D represent a flow diagram of one embodiment of a method, performed by a computer server, such as LBS 1512 operating in system 1500, for facilitating peer-to-peer wagering transactions. It should be understood that in other embodiments, not all of the method steps are performed and that the method steps could be performed in an order other than what is shown and discussed.

At block 1700, LBS 1512 provides a website to punters within jurisdiction 1528, allowing the punters to use the website to place traditional wagers on a variety of events or propositions having uncertain outcomes. The website also comprises an online tool that allows punters to create initial, proposed wagers (IPWs) and offer the IPWs to other punters for acceptance. In one embodiment, the IPWs are offered only to punters within the same jurisdiction as a punter who created a proposed wager, while in other embodiment, the IPWs may be presented to punters to a specific jurisdiction or throughout system 1500.

An IPW typically comprises several attributes that describe a proposed wager, such as a unique ID or symbol to uniquely identify the IPW within jurisdiction 1528, an event description of a future event having an uncertain outcome, (such as Yankees vs. Giants), a predicted outcome of a proposition associated with the future event (such as, "The Giants will win the game", or "The Yankees will score first" or "The next play will be a pass"), odds of a result of the proposition occurring (such as 3 to 2, or +7 in case of point spreads), a date and time that the future event or proposition will occur, a betting format (e.g., fixed odds with point spreads, pari-mutuel, etc.), and/or a proposed wager amount. As an example, punter 1530 in jurisdiction 1528 may create an IPW having an ID of 4A53GxTJ, Dolphins vs. Saints, Saints will win, Nov. 21, 2021, $50, indicating that punter 1530 wishes to place a wager with another punter in the amount of $50, betting that the Saints will win a football game against the Dolphins on Nov. 21, 2021. After creating the IPW, punter 1530 provides the IPW to LBS 1512. In one embodiment, punter 1530 additionally provides a value to LBS 1512 equal to the proposed wager amount, such as electronic cash or something of value, such as a non-fungible token (NFT) or a crypto currency.

At block 1702, the IPW is received by processor 200 of LBS 1512 via network interface 1504.

At block 1704, in one embodiment where punter 1530 sends a value along with the IPW, the value is received and stored by processor 200 in memory 202, along with an indication that a value equal to the proposed wager amount has been received from punter 1530. In another embodiment, processor 200 simply debits an account owned by punter 1530, previously set up with LBS 1512 and funded by punter 1530.

At block 1706, the IPW is provided to only punters within jurisdiction 1528 by processor 200 via network interface 204, or posted to the website provided by LBS 1512, allowing only punters within jurisdiction 1528 to view the IPW from punter 1530. In the United States, it is illegal to create wagers across state lines. Therefore, it may be necessary to limit the IPW to only punters within the same state where punter 1530 is located, assuming that the current law remains unchanged.

At block 1708, a second punter located within jurisdiction 1528 accepts the IPW by providing an indication to LBS 1512. In one embodiment, the second punter additionally provides a value to LBS 1512 in an amount equal to the proposed wager amount.

At block 1710, the acceptance from the second punter is received by processor 200 via network interface 204 and, in some embodiment, the value equal to the proposed wager amount.

At block 1712, in one embodiment where value from punter 1530 and the second punter have not been provided earlier, in response to receiving the acceptance from the second punter, processor 200 may request that punter 1530 and the second punter each provide a value to LBS 1512 equal to the proposed wager amount in order to confirm the IPW. Each of punter 1530 and the second punter must then provide the value to LBS 1512 in order to confirm the IPW.

At block 1714, after the acceptance has been received and, typically, value equal to the wager amount is received from both punter 1530 and the second punter within jurisdiction 1528, processor 200 creates an exchange tradable bet (ETB) between punter 1530 and the second punter, wherein punter 1530 owns a first position in the ETB, i.e., owns the right to receive payment from the second punter if the predicted outcome of the proposition in the IPW occurs, and the second punter owns a second position in the ETB, i.e., owns the right to receive payment from punter 1530's representative i.e. the operator the punter has an account with if the predicted outcome of the proposition in the IPW does not occur. Unlike the IPW, the positions associated with the ETB may be tradable among punters, as described below.

At block 1716, processor 200 typically notifies both punter 1530 and the second punter that the ETB has been created.

At block 1718, at some time later but before the future event concludes, circumstances may change relating to the predicted outcome of the future event associated with the ETB. For example, a sports figure on one of the teams associated with the future event may have been injured or gets injured during the game, a new quarterback may have joined a team, or one of punter 1530 or the second punter simply has second thoughts whether the predicted outcome will occur or not. In this case, punter 1530 and/or the second punter may wish to sell their position in the ETB by using the website to generate a sell order comprising attributes of the ETB and an ask price that may be different than the value of the proposed initial wager. For purposes of clarity, it will be assumed that punter 1530 wishes to sell his/her position in the ETB.

At block 1720, punter 1530 creates a sell order using the website, comprising an identification of the ETB and an ask price that punter 1530 is willing to accept to sell punter 1530's position in the ETB. The sell order is provided to LBS 1512.

At block 1722, processor 200 receives the sell order from punter 1530.

At block 1724, processor 200 provides the sell order to punters within jurisdiction 1528, i.e., via the website, and may also provide the sell order to exchange server 1502. In this case, exchange server 1502 receives buy and sell orders from punters located in various jurisdictions willing to sell their respective positions in their respective ETBs and matches the buy and sell orders to each other based on a bid price and ask price associated with each buy and sell order.

At block 1726, processor 200 receives a buy order from a third punter located within jurisdiction 1528, comprising an identification of the ETB and a bid price.

At block 1728, processor 200 executes a transaction between the third punter and punter 1530 when the bid price from the third punter is equal to or more than the ask price from punter 1530. The transaction comprises processor 200 providing a credit to an account of punter 1530 in an amount of the ask price and modifying ownership of punter 1530's position in the ETB from punter 1530 to the third punter.

At block 1730, processor 200 receives a result of the proposition via network interface 204, for example, from OMS 1514 or from a service that provides such information, such as such as Sport Radar (https://www.sportradar.com).

At block 1732, processor 200 determines which position of ETB prevailed, based on the results of the proposition.

At block 1734, processor 200 provides the value received from punter 1530 and the value received from the second punter to an account owned by the third punter when the predicted outcome in the ETB is true, i.e., the predicted outcome betted on by the third punter occurs.

AT block 1736, processor 200 provides the value received from punter 1530 and the value received from the second punter to an account owned by the second punter when the predicted outcome in the ETB is false, i.e., the predicted outcome betted on by the second punter occurs.

At block 1738, after block 1724, where processor 200 provides the sell order to punters, some of which are outside jurisdiction 1528 via exchange server 1502, processor 200 receives a notification from exchange server 1502 that a buy order for punter 1530's position in the ETB was received from punter 1520, comprising an identification of the ETB and a bid price equal to or greater than the ask price provided by punter 1530.

At block 1740, as a result of receiving the notification, processor 200 executes a transaction between punter 1530 and punter 1520, by providing a credit to an account of punter 1530 in an amount of the ask price and modifying ownership of punter 1530's position in the ETB from punter 1530 to punter 1520. Processor 200 may notify exchange server 1502 of the transaction and exchange server 1502 may, in turn, notify LBS 1524.

At block 1742, processor 200, as well as LBS 1524, receives a result of the proposition via network interface 204, for example, from OMS 1514 or from a service that provides such information, such as Sport Radar (https://www.sportradar.com).

At block 1744, processor 200 determines which position of ETB prevailed, based on the results of the proposition. Similarly, LBS 1524 may also determine which position prevailed.

At block 1746, processor 200 provides the value received from punter 1530 and the value received from the second punter to an account owned by punter 1520 when the predicted outcome in the ETB is true, i.e., the predicted outcome betted on by punter 1520 occurs. This may involve transferring value from LBS 1512 to LBS 1524 for LBS 1524 to receive the value and credit the account owned by punter 1520.

AT block 1748, processor 200 provides the value received from punter 1530 and the value received from the second punter to an account owned by the second punter when the predicted outcome in the ETB is false, i.e., the predicted outcome betted on by the second punter occurs.

At block 1750, processor 200 may create a plurality of ETBs based on receipt of a plurality of IPWs and acceptances received from a plurality of punters within the first jurisdiction.

At block 1752, processor 200 may receive a plurality of buy orders and sell orders from punters within jurisdiction 1528, via network interface 204, to buy and sell positions associated with the plurality of ETBs, respectively.

At block 1754, processor 200 matches the buy orders with the sell orders when a respective ask price of each sell order associated with a particular ETB matches a respective bid price of each buy order of the same ETB. Processor 200 then provides a credit to each punter who sold their position to another punter and modifies ownership of the position to each buyer, respectively.

At block 1756, processor 200 provides any of the plurality of buy orders and the plurality of sell orders that have not been matched by processor 200 to exchange server 1502 for matching by exchange server 1502 with buy orders and sell orders received by exchange server 1502 from punters located in jurisdictions other than jurisdiction 1528. When matches are found between buy and sell orders originating from punters in jurisdiction 1528 and punters located in other jurisdictions, processor 200 receives notification of matching orders from exchange server 1502 and provides a credit to punters who have sold their positions in their respective ETBs, while changing ownership of the respective positions to punters outside jurisdiction 1528. When the results of the propositions of each ETB, respectively, are known, processor 200, as well as other LBSs located in other jurisdictions, determines which position of each ETB prevailed, based on the results of the proposition. Processor 200 then provides the value received punters who originated each IPW and the value received from punters who accepted each IPW, respectfully, to accounts owned by the punters who predicted the correct outcome of the propositions.

While the foregoing disclosure shows illustrative embodiments of the invention, it should be noted that various changes and modifications could be made herein without departing from the scope of the invention as defined by the appended claims. The functions, blocks and/or actions of the method claims in accordance with the embodiments of the invention described herein need not be performed in any particular order. Furthermore, although elements of the invention may be described or claimed in the singular, the plural is contemplated unless limitation to the singular is explicitly stated. It should be noted that throughout this document, the terms “player”, “user”, bettor and “patron”, and the terms “virtual”, “digital” and “electronic” are used interchangeably and the words “InPlay”, “in-game” and “micro” are also used interchangeably. Also, the word “website” is used to represent any computer web page or mobile app whether HTML5 based or downloadable apps such as iOS, Android, etc. And the word “trade order” is used to encompass those used in the securities industry such as Market order, Limit order, Stop order, Stop loss order, Good Till Cancel order, etc.

I claim:

1. A central exchange server for trading already-placed bets, comprising:

a network interface for communicating with licensed operators over a wide-area network;

a non-transitory memory for storing processor-executable instructions; and a processor, coupled to the network interface and the non-transitory memory, for executing the processor-executable instructions that causes the central exchange server to:

receive buy orders and sell orders over time only from licensed operators in a plurality of states, wherein each licensed operator is authorized to place the buy orders and the sell orders with the central exchange server;

construct a plurality of tables, each table comprising a hierarchy of the buy orders and the sell orders associated with particular events, respectively, each of the buy orders comprising a quantity and a bid price and each of the sell orders comprising a second quantity and an ask price;

dynamically maintain the plurality of tables as new buy and sell orders are received; and execute the buy orders and the sell orders when a best ask price of a buy order matches a best bid price of a sell order of a respective event.

2. The central exchange server of claim 1, wherein the processor-executable instructions comprise further instructions that causes the central exchange server to:

generate exchange tradable bets (ETBs), each ETB associated with a future event;

provide the ETBs to the licensed operators, each licensed operator located in a respective jurisdiction and licensed to offer the ETBs to punters located within each respective jurisdiction, each licensed operator configured to:

distribute the ETBs to punters within each respective jurisdiction;

accept bets associated with the ETBs from the punters located in each respective jurisdiction, each accepted bet an already-placed bet;

receive the buy orders and the sell orders from the punters to buy and sell at least some of the already-placed bets; and send the buy orders and the sell orders to the central exchange server for execution.

3. The central exchange server of claim 2, wherein each ETBs is based on a prediction of an occurrence or non-occurrence of a respective future event.

4. The central exchange server of claim 2, wherein each ETBs is based on a prediction of an occurrence or non-occurrence of one or more potential outcomes associated with a respective future event.

5. The central exchange server of claim 2, wherein the processor-executable instructions comprise further instructions that causes the central exchange server to:

establish a price of a last-executed trade associated with a particular event as a market price for ETBs associated with particular events, respectively.

6. The central exchange server of claim 2, wherein identities of the punters in a first jurisdiction are known to a first licensed operator in the first jurisdiction but anonymous to the central exchange server and to other licensed operators located in other jurisdictions.

7. The central exchange server of claim 3, wherein a payout amount for occurrence of a first future event and a payout amount for non-occurrence of the first future event comprises a potential win amount of a first ETB offered by a first licensed operator if the prediction is successful.

8. The central exchange server of claim 1, wherein the processor-executable instructions comprise further instructions that causes the central exchange server to:

provide at least some of the plurality of tables to at least some of the licensed operators for distribution to the punters located in the respective jurisdictions.

9. The central exchange server of claim 2, wherein the processor-executable instructions comprise further instructions that causes the central exchange server to:

maintain a plurality of inter-operator transactions, each associated with a particular licensed operator, as the buy orders and the sell orders are executed.

10. The central exchange server of claim 1, wherein the processor-executable instructions for executing the buy orders and the sell orders comprise instructions that causes the central exchange server to:

match a highest bid price of each of the buy orders associated with each particular event, respectively, with a lowest ask price of each of the sell orders associated with the same particular future event, respectively.

11. The central exchange server of claim 2, wherein at least some of the licensed operators are further configured to:

enable punters to create ETBs;

receive ETBs from the punters; and provide the ETBs received from the punters to other punters for acceptance.

12. A method, performed by a central exchange server, for trading already-placed bets, the method comprising:

receiving buy orders and sell orders over time from licensed operators to buy and sell already-placed bets;

constructing a plurality of tables, each table comprising a hierarchy of the buy orders and the sell orders associated with a particular event, respectively, each of the buy orders comprising a quantity and a bid price and each of the sell orders comprising a second quantity and an ask price;

dynamically maintaining the plurality of tables as new buy and sell orders are received; and executing the buy orders and the sell orders when a best ask price of a buy order matches a best bid price of a sell order of a respective event.

13. The method of claim 12, further comprising:

generating exchange tradable bets (ETBs), each ETB associated with a future event;

distributing the ETBs to licensed operators each located in a respective jurisdiction, each licensed operator licensed to offer the ETBs to punters located within a respective jurisdiction:

providing, by the licensed operators, the ETBs to the punters located within each respective jurisdiction;

accepting, by the licensed operators, bets associated with the ETBs from the punters located in each respective jurisdiction, each accepted bet an already-placed bet;

receiving, by the licensed operators, buy orders and sell orders from the punters to buy and sell at least some of the already-placed bets; and sending, by the licensed operators, the buy orders and the sell orders to the central exchange server for execution.

14. The method of claim 13, wherein each ETBs is based on a prediction of an occurrence or non-occurrence of a respective future event.

15. The method of claim 13, wherein each ETBs is based on a prediction of an occurrence or non-occurrence of one or more potential outcomes associated with a respective future event.

16. The method of claim 13, further comprising:

establishing, by the central exchange server, a price of a last-executed trade associated with a particular event as a market price for ETBs associated with particular events, respectively.

17. The method of claim 13, wherein identities of the punters in a first jurisdiction are known to a first licensed operator in the first jurisdiction but anonymous to the central exchange server and to other licensed operators located in other jurisdictions.

18. The method of claim 14, wherein a payout amount for occurrence of a first future event and a payout amount for non-occurrence of the first future event comprises a potential win amount of a first ETB offered by a first licensed operator if the prediction is successful.

19. The method of claim 12, further comprising:

providing, by the central exchange server, at least some of the plurality of tables to at least some of the licensed operators for distribution to the punters located in the respective jurisdictions.

20. The method of claim 13, further comprising:

maintaining, by the central exchange server, a plurality of inter-operator transactions, each associated with a particular licensed operator, as the buy orders and the sell orders are executed.

21. The method of claim 12, wherein executing the buy orders and the sell orders comprises:

matching, by the central exchange server, a highest bid price of each of the buy orders associated with each particular event, respectively, with a lowest ask price of each of the sell orders associated with the same particular future event, respectively.

22. The method of claim 13, further comprising:

enabling, by the licensed operators, punters to create punter-created ETBs;

receive the punter-created ETBs from the punters; and providing the punter-created ETBs to other punters for acceptance.

23. A central exchange server for trading already-placed bets, comprising:

a network interface for communicating with licensed operators over a wide-area network;

a non-transitory memory for storing processor-executable instructions; and a processor, coupled to the network interface and the non-transitory memory, for executing the processor-executable instructions that causes the central exchange server to:

receive buy orders and sell orders over time from licensed operators in a first jurisdiction, the first jurisdiction comprising a country, wherein the buy orders and the sell orders are accepted only from licensed operators in the first jurisdiction authorized to place the buy orders and the sell orders with the central exchange server;

construct a plurality of tables, each table comprising a hierarchy of the buy orders and the sell orders associated with particular events, respectively, each of the buy orders comprising a quantity and a bid price and each of the sell orders comprising a second quantity and an ask price;

dynamically maintain the plurality of tables as new buy and sell orders are received; and execute the buy orders and the sell orders when a best ask price of a buy order matches a best bid price of a sell order of a respective event.

* * * * *